US011184167B1

(12) United States Patent
Miller

(10) Patent No.: US 11,184,167 B1
(45) Date of Patent: Nov. 23, 2021

(54) SYSTEM FOR GENERATION OF REAL-TIME GATHERING PARTNER CREDENTIALS

(71) Applicant: Catherine R Miller, Raleigh, NC (US)

(72) Inventor: Catherine R Miller, Raleigh, NC (US)

( * ) Notice: Subject to any disclaimer, the term of this patent is extended or adjusted under 35 U.S.C. 154(b) by 364 days.

(21) Appl. No.: 16/354,378

(22) Filed: Mar. 15, 2019

(51) Int. Cl.
*H04L 9/08* (2006.01)
*G06F 16/9535* (2019.01)
*H04L 29/08* (2006.01)

(52) U.S. Cl.
CPC ........ *H04L 9/0872* (2013.01); *G06F 16/9535* (2019.01); *H04L 9/0866* (2013.01); *H04L 67/306* (2013.01)

(58) Field of Classification Search
CPC ... H04L 9/0872; H04L 9/0866; H04L 67/306; G06F 16/9535
See application file for complete search history.

(56) References Cited

U.S. PATENT DOCUMENTS

| | | | |
|---|---|---|---|
| 6,269,369 B1 | 7/2001 | Robertson | |
| 6,714,916 B1 | 3/2004 | Robertson et al. | |
| 7,194,419 B2 | 3/2007 | Robertson et al. | |
| 7,386,464 B2 | 6/2008 | Robertson et al. | |
| 7,739,139 B2 | 6/2010 | Robertson et al. | |
| 8,341,162 B2 | 12/2012 | Abercrombie, III et al. | |
| 8,380,796 B2 | 2/2013 | Robertson et al. | |
| 8,751,509 B1 | 6/2014 | Abercrombie, III et al. | |
| 8,762,471 B2 | 6/2014 | Robertson et al. | |
| 9,118,724 B1 | 8/2015 | Sooriyan et al. | |
| 9,294,428 B2 | 3/2016 | Nordstrom et al. | |
| 9,325,755 B1 | 4/2016 | Abercrombie, III et al. | |
| 9,537,909 B2 | 1/2017 | Robertson et al. | |
| 9,584,464 B2 | 2/2017 | Nordstrom et al. | |
| 9,692,795 B2 | 6/2017 | Chattopadhyay et al. | |
| 9,715,532 B1 | 7/2017 | Hall et al. | |
| 9,733,811 B2 | 8/2017 | Rad et al. | |
| 9,763,070 B2 | 9/2017 | Nordstrom et al. | |
| 10,009,301 B1 * | 6/2018 | Cheng | H04L 51/20 |
| 10,019,769 B1 * | 7/2018 | Hodge | G06Q 50/26 |

(Continued)

*Primary Examiner* — Darren B Schwartz
(74) *Attorney, Agent, or Firm* — Jay M. Brown

(57) ABSTRACT

System generating real-time gathering partner credentials. Processor provides network-based access to user interface registering and maintaining first and second users' accounts. Processor communicates with first and second mobile communication devices in possession of users. Processor executes processor commands of users. Data repository is coupled with processor for storing first and second account data of user accounts. Account data include URIs to be accessed for dynamic collection of real-time first and second user credentials information. Account data are associated with first and second unique usernames of users. Processor includes geolocation facility determining indication of real-time geolocation proximity between mobile communication devices. Processor includes account data-collection facility responsive in real-time to processor command of first user dynamically collecting real-time second user credentials information. Processor causes real-time gathering partner credentials of second user, including indication of real-time geolocation proximity and real-time second user credentials information, to be displayed by first mobile communication device.

32 Claims, 14 Drawing Sheets

(56) References Cited

U.S. PATENT DOCUMENTS

| | | | |
|---|---|---|---|
| 10,349,223 B1* | 7/2019 | Yoo | G06Q 50/30 |
| 10,387,487 B1* | 8/2019 | Svendsen | G06F 16/9535 |
| 10,397,391 B1* | 8/2019 | Czajka | H04M 1/72484 |
| 10,621,598 B1* | 4/2020 | Greenwald | G06Q 30/0201 |
| 10,855,664 B1* | 12/2020 | Ziraknejad | H04W 4/021 |
| 11,025,573 B1* | 6/2021 | Czajka, II | H04L 51/20 |
| 2002/0091556 A1 | 7/2002 | Fiala et al. | |
| 2002/0091568 A1 | 7/2002 | Kraft et al. | |
| 2003/0037131 A1* | 2/2003 | Verma | H04L 67/22 |
| | | | 709/223 |
| 2007/0030824 A1* | 2/2007 | Ribaudo | H04L 51/38 |
| | | | 370/328 |
| 2008/0182589 A1* | 7/2008 | Buccieri | H04L 67/24 |
| | | | 455/456.3 |
| 2012/0215865 A1* | 8/2012 | Sacks | G06Q 50/01 |
| | | | 709/206 |
| 2013/0217365 A1* | 8/2013 | Ramnani | H04L 67/306 |
| | | | 455/414.1 |
| 2013/0321388 A1* | 12/2013 | Locke | G06F 16/9535 |
| | | | 345/418 |
| 2014/0057667 A1* | 2/2014 | Blankenship | H04W 4/023 |
| | | | 455/500 |
| 2014/0059132 A1 | 2/2014 | Shelton et al. | |
| 2014/0096215 A1* | 4/2014 | Hessler | H04W 12/06 |
| | | | 726/7 |
| 2014/0123249 A1* | 5/2014 | Davis | H04W 12/06 |
| | | | 726/5 |
| 2014/0244744 A1* | 8/2014 | Lyren | G06Q 50/01 |
| | | | 709/204 |
| 2014/0258346 A1* | 9/2014 | Meltzer | G06F 16/16 |
| | | | 707/822 |
| 2015/0019982 A1* | 1/2015 | Petitt, Jr. | G08B 5/36 |
| | | | 715/738 |
| 2016/0179454 A1* | 6/2016 | Liu | G06F 3/0481 |
| | | | 715/747 |
| 2016/0265928 A1* | 9/2016 | Samuel | G01C 21/3438 |
| 2016/0285982 A1 | 9/2016 | Abercrombie, III et al. | |
| 2016/0342693 A1* | 11/2016 | Samuel | G06Q 50/01 |
| 2017/0093952 A1* | 3/2017 | Kumar | H04L 51/18 |
| 2017/0235454 A1* | 8/2017 | Selfridge | G06F 3/0484 |
| | | | 715/744 |
| 2017/0332220 A1 | 11/2017 | Nordstrom et al. | |
| 2018/0019964 A1* | 1/2018 | Larson | H04W 4/023 |
| 2018/0107746 A1* | 4/2018 | Jackson | G06F 16/955 |
| 2018/0184236 A1* | 6/2018 | Faraone | G09B 29/007 |
| 2019/0173965 A1* | 6/2019 | Diem | H04L 67/24 |

\* cited by examiner

SYSTEM FOR GENERATION OF REAL-TIME GATHERING PARTNER CREDENTIALS

BACKGROUND OF THE INVENTION

1. Field of the Invention

The present invention relates to the field of generation and distribution of personal credentials.

2. Background of the Invention

Systems and processes have been developed for generating and distributing personal credentials for utilization by end-users. Despite the existence of these systems and processes, further improvements are still needed in systems and processes for generating and distributing personal credentials for utilization by end-users.

SUMMARY

In an example of an implementation, a system for generation of real-time gathering partner credentials is provided, including a processor and a data repository. In the example of the system, the processor provides network-based access to a user interface for registering and maintaining a first user account of a first user and for registering and maintaining a second user account of a second user. The processor in the example of the system is in communication with a first mobile communication device being in the possession of the first user and in communication with a second mobile communication device being in the possession of the second user. In the example of the system, the processor is for executing processor commands of the first user and for executing processor commands of the second user. The data repository in the example of the system is coupled with the processor for storing first account data of the first user account and for storing second account data of the second user account. In the example of the system, the first account data includes a Uniform Resource Identifier ("URI") of a Domain Name being designated to be accessed for dynamic collection of real-time first user credentials information; and the second account data includes another URI of another Domain Name being designated to be accessed for dynamic collection of real-time second user credentials information. Further in the example of the system, the first account data is associated with a first unique username of the first user, and the second account data is associated with a second unique username of the second user. The processor in the example of the system includes a geolocation facility for determining an indication of a real-time geolocation proximity between the first mobile communication device and the second mobile communication device. The processor in the example of the system also includes an account data-collection facility being responsive in real-time to a processor command of the first user for dynamically collecting the real-time second user credentials information. In the example of the system, the processor is for causing real-time gathering partner credentials of the second user, including the indication of the real-time geolocation proximity and the real-time second user credentials information, to be displayed by the first mobile communication device.

In further examples of the system, the processor may be responsive in real-time to a processor command of the first user for causing the real-time gathering partner credentials of the second user to be displayed by the first mobile communication device.

In additional examples of the system, the processor as being for causing the real-time gathering partner credentials of the second user to be displayed may include being for causing the indication of the real-time geolocation proximity and the real-time second user credentials information to be displayed as being integrated together by the first mobile communication device.

In other examples of the system, the processor as being for causing the real-time gathering partner credentials of the second user to be displayed may include being for causing a first marker indicating a real-time first geolocation of the first mobile communication device to be displayed at a first position on the first mobile communication device, and further may include being for causing a second marker indicating a real-time second geolocation of the second mobile communication device to be displayed at a second position on the first mobile communication device.

In some examples of the system, the processor as being for causing the indication of the real-time geolocation proximity to be displayed may include being for causing the first marker indicating the real-time first geolocation to be displayed at the first position on the first mobile communication device, and further may include being for causing the second marker indicating the real-time second geolocation to be displayed at the second position on the first mobile communication device.

In further examples of the system, the processor as being for causing the second marker indicating the real-time second geolocation of the second mobile communication device to be displayed at the second position on the first mobile communication device may include being for causing the real-time second user credentials information to be displayed at the second position.

In additional examples of the system, the account data-collection facility being responsive to the processor command of the first user for the dynamically collecting the real-time second user credentials information may be subject to prior authorization by a processor command of the second user.

In other examples of the system, the account data-collection facility being subject to the prior authorization by the processor command of the second user for the dynamically collecting the real-time second user credentials information further may enable the second user to select a tier of the real-time second user credentials information to be displayed from a selectable plurality of tiers of the real-time second user credentials information.

In some examples of the system, the processor may be further for executing processor commands of the second user for registering and maintaining the second user account with the second account data as including a business description of the second user.

In further examples of the system, the processor as being for causing the real-time gathering partner credentials of the second user to be displayed may include being for causing the business description of the second user to be displayed by the first mobile communication device.

In additional examples of the system, the processor may be for executing the processor commands for registering and maintaining the second user account with the business description of the second user as including a business description element being selected from a pre-defined listing of selectable business description elements displayed by the second mobile communication device.

In other examples of the system, the processor may be for executing the processor commands for registering and maintaining the second user account with the pre-defined listing of selectable business description elements as including business sectors, knowledge bases, skills, business interests, professions, or business goals.

In some examples of the system, the processor may be for executing the processor commands for registering and maintaining the second user account with the business description as including a rating by the second user as to their level of experience or interest in the selected business description element.

In further examples of the system, the geolocation facility may be responsive to a processor command of the first user for causing the indication of the real-time geolocation proximity between the first and second mobile communication devices to be displayed by the first mobile communication device.

In additional examples of the system, the geolocation facility may be further responsive to the processor command of the first user as being for causing the indication of the real-time geolocation proximity to be displayed subject to the first and second mobile communication devices as being within a limited maximum proximity distance.

In other examples of the system, the processor may be responsive to a processor command of the first user for dynamically collecting the real-time second user credentials information or the indication of the real-time geolocation proximity.

In some examples of the system, the processor may be responsive in real-time to a processor command of the first user for causing to be displayed by the first mobile communication device, prior to the causing the real-time gathering partner credentials of the second user to be displayed, the indication of the real-time geolocation proximity integrated with a business description of the second user.

In further examples of the system, the geolocation facility may be responsive to a processor command of the first user for causing the indication of the real-time geolocation proximity to be displayed by the first mobile communication device in a text format or in a map format.

In additional examples of the system, the geolocation facility may be responsive to a processor command of the first user for causing the indication of the real-time geolocation proximity to be periodically updated and displayed by the first mobile communication device.

In other examples of the system, the processor may include the account data-collection facility as being responsive in real-time to a processor command of the second user for dynamically collecting the real-time first user credentials information, and the processor may be for causing real-time gathering partner credentials of the first user, including the indication of the real-time geolocation proximity and the real-time first user credentials information, to be displayed by the second mobile communication device.

In some examples of the system, the processor may be responsive in real-time to a processor command of the second user for causing the real-time gathering partner credentials of the first user to be displayed by the second mobile communication device.

In further examples of the system, the processor as being for causing the real-time gathering partner credentials of the first user to be displayed may include being for causing the indication of the real-time geolocation proximity and the real-time first user credentials information to be displayed as being integrated together by the second mobile communication device.

In additional examples of the system, the processor as being for causing the real-time gathering partner credentials of the first user to be displayed may include being for causing a first marker indicating a real-time first geolocation of the first mobile communication device to be displayed at a first position on the second mobile communication device, and further may include being for causing a second marker indicating a real-time second geolocation of the second mobile communication device to be displayed at a second position on the second mobile communication device.

In other examples of the system, the processor as being for causing the indication of the real-time geolocation proximity to be displayed may include being for causing the first marker indicating the real-time first geolocation to be displayed at the first position on the second mobile communication device, and further may include being for causing the second marker indicating the real-time second geolocation to be displayed at the second position on the second mobile communication device.

In some examples of the system, the processor as being for causing the first marker indicating the real-time first geolocation of the first mobile communication device to be displayed at the first position on the second mobile communication device may include being for causing the real-time first user credentials information to be displayed at the first position.

In further examples of the system, the account data-collection facility being responsive to the processor command of the second user for the dynamically collecting the real-time first user credentials information may be subject to prior authorization by a processor command of the first user.

In additional examples of the system, the account data-collection facility being subject to the prior authorization by the processor command of the first user for the dynamically collecting the real-time first user credentials information further may enable the first user to select a tier of the real-time first user credentials information to be displayed from a selectable plurality of tiers of the real-time first user credentials information.

In other examples of the system, the processor may be further for executing processor commands of the first user for registering and maintaining the first user account with the first account data as including a business description of the first user.

In some examples of the system, the processor as being for causing the real-time gathering partner credentials of the first user to be displayed may include being for causing the business description of the first user to be displayed by the second mobile communication device.

In further examples of the system, the processor may be for executing the processor commands for registering and maintaining the first user account with the business description of the first user as including a business description element being selected from a pre-defined listing of selectable business description elements displayed by the first mobile communication device.

In additional examples of the system, the processor may be for executing the processor commands for registering and maintaining the first user account with the pre-defined listing of selectable business description elements as including business sectors, knowledge bases, skills, business interests, professions, or business goals.

In other examples of the system, the processor may be for executing the processor commands for registering and maintaining the first user account with the business description as including a rating by the first user as to their level of experience or interest in the selected business description element.

In some examples of the system, the geolocation facility may be responsive to a processor command of the second user for causing the indication of the real-time geolocation proximity between the first and second mobile communication devices to be displayed by the second mobile communication device.

In further examples of the system, the geolocation facility may be further responsive to the processor command of the second user as being for causing the indication of the real-time geolocation proximity to be displayed subject to the first and second mobile communication devices as being within a limited maximum proximity distance.

In additional examples of the system, the processor may be responsive to a processor command of the second user for dynamically collecting the real-time first user credentials information or the indication of the real-time geolocation proximity.

In other examples of the system, the processor may be responsive in real-time to a processor command of the second user for causing to be displayed by the second mobile communication device, prior to the causing the real-time gathering partner credentials of the first user to be displayed, the indication of the real-time geolocation proximity integrated with a business description of the first user.

In some examples of the system, the geolocation facility may be responsive to a processor command of the second user for the causing the indication of the real-time geolocation proximity to be displayed by the second mobile communication device in a text format or in a map format.

In further examples of the system, the geolocation facility may be responsive to a processor command of the second user for causing the indication of the real-time geolocation proximity to be periodically updated and displayed by the second mobile communication device.

In additional examples of the system, the processor may provide network-based access to the user interface for registering and maintaining a third user account of a third user, the processor being in communication with a third mobile communication device being in the possession of the third user, and the processor being for executing processor commands of the third user. Further in those examples of the system, the data repository may be further for storing third account data of the third user account, the third account data including a further URI of a further Domain Name being designated to be accessed for dynamic collection of real-time third user credentials information, the third account data being associated with a third unique username of the third user. Additionally in those examples of the system, the geolocation facility may be for determining an indication of another real-time geolocation proximity between the first mobile communication device and the third mobile communication device. Also in those examples of the system, the account data-collection facility may be responsive in real-time to a processor command of the first user for dynamically collecting the real-time third user credentials information. Further in those examples of the system, the processor may be for causing real-time gathering partner credentials of the third user, including the indication of the another real-time geolocation proximity and the real-time third user credentials information, to be displayed by the first mobile communication device.

In other examples of the system, the processor as being for causing the real-time gathering partner credentials of the third user to be displayed may include: being for causing the indication of the real-time geolocation proximity and the real-time second user credentials information to be displayed as being integrated together by the first mobile communication device; and being for causing the indication of the another real-time geolocation proximity and the real-time third user credentials information to be displayed as being integrated together by the first mobile communication device.

In some examples of the system, the processor as being for causing the real-time gathering partner credentials of the third user to be displayed may include: being for causing a first marker indicating a real-time first geolocation of the first mobile communication device to be displayed at a first position on the first mobile communication device; and being for causing a second marker indicating a real-time second geolocation of the second mobile communication device to be displayed at a second position on the first mobile communication device; and being for causing a third marker indicating a real-time third geolocation of the third mobile communication device to be displayed at a third position on the first mobile communication device.

In further examples of the system, the processor as being for causing the indication of the real-time geolocation proximity to be displayed may include being for causing the first marker indicating the real-time first geolocation to be displayed at the first position on the first mobile communication device, and further may include being for causing the second marker indicating the real-time second geolocation to be displayed at the second position on the first mobile communication device; and also may include being for causing the third marker indicating the real-time third geolocation to be displayed at the third position on the first mobile communication device.

In additional examples of the system, the processor as being for causing the third marker indicating the real-time third geolocation of the third mobile communication device to be displayed at the third position on the first mobile communication device may include being for causing the real-time third user credentials information to be displayed at the third position.

In other examples of the system, the account data-collection facility being responsive to the processor command of the first user for the dynamically collecting the real-time third user credentials information may be subject to prior authorization by a processor command of the third user.

In some examples of the system, the account data-collection facility being subject to the prior authorization by the processor command of the third user for the dynamically collecting the real-time third user credentials information further may enable the third user to select a tier of the real-time third user credentials information to be displayed from a selectable plurality of tiers of the real-time third user credentials information.

In further examples of the system, the processor may be further for executing processor commands of the third user for registering and maintaining the third user account with the third account data as including a business description of the third user.

In additional examples of the system, the processor as being for causing the real-time gathering partner credentials of the third user to be displayed may include being for causing the business description of the third user to be displayed by the first mobile communication device.

In other examples of the system, the processor may be for executing the processor commands for registering and maintaining the third user account with the business description of the third user as including a business description element being selected from a pre-defined listing of selectable business description elements displayed by the third mobile communication device.

In some examples of the system, the processor may be for executing the processor commands for registering and maintaining the third user account with the pre-defined listing of selectable business description elements as including business sectors, knowledge bases, skills, business interests, professions, or business goals.

In further examples of the system, the processor may be for executing the processor commands for registering and maintaining the third user account with the business description as including a rating by the third user as to their level of experience or interest in the selected business description element.

In additional examples of the system, the geolocation facility may be responsive to a processor command of the first user for: causing the indication of the real-time geolocation proximity between the first and second mobile communication devices to be displayed by the first mobile communication device; and causing the indication of the another real-time geolocation proximity between the first and third mobile communication devices to be displayed by the first mobile communication device.

In other examples of the system, the geolocation facility may be further responsive to the processor command of the first user as: being for causing the indication of the real-time geolocation proximity to be displayed subject to the first and second mobile communication devices as being within a limited maximum proximity distance; and being for causing the indication of the another real-time geolocation proximity to be displayed subject to the first and third mobile communication devices as being within the limited maximum proximity distance.

In some examples of the system, the processor may be responsive to a processor command of the first user for dynamically collecting either the real-time third user credentials information, or the indication of the another real-time geolocation proximity.

In further examples of the system, the processor may be responsive in real-time to a processor command of the first user for causing to be displayed by the first mobile communication device, prior to the causing the real-time gathering partner credentials of the third user to be displayed, the indication of the another real-time geolocation proximity integrated with a business description of the third user.

In additional examples of the system, the geolocation facility may be responsive to a processor command of the first user for causing the indication of the real-time geolocation proximity and the indication of the another real-time geolocation proximity to both be displayed by the first mobile communication device in a text format or in a map format.

In other examples of the system, the geolocation facility may be responsive to a processor command of the first user for causing the indication of the real-time geolocation proximity and the indication of the another real-time geolocation proximity to be periodically updated and displayed by the first mobile communication device.

In some examples of the system, the geolocation facility may be further responsive to the processor command of the first user as being for causing the indication of the real-time geolocation proximity and the another real-time geolocation proximity to both be displayed by the first mobile communication device, provided that each of the second and third mobile communication devices may be within a limited maximum proximity distance of the first mobile communication device.

In further examples of the system, the processor may include an account data vetting facility for performing a validation of the real-time second user credentials information.

In additional examples of the system, the processor may require the second account data to include an additional URI of an additional Domain Name as being designated to be accessed for the dynamic collection of the real-time second user credentials information; and the processor may include the account data vetting facility as further being for comparing real-time second user credentials information posted at the another Domain Name with real-time second user credentials information posted at the additional Domain Name.

In other examples of the system, the processor may include the account data vetting facility as being for periodically collecting and generating a historical record of the real-time second user credentials information posted at the another Domain Name, and as being for comparing the historical record with the real-time second user credentials information being collected in real-time.

In some examples of the system, the processor may include an account data vetting facility for performing a validation of the second account data.

In further examples of the system, the processor may include the account data vetting facility as being for performing a validation of the another URI of the another Domain Name being designated for dynamic collection of the real-time second user credentials information.

In additional examples of the system, the processor may include the account data vetting facility as being for comparing, with a roster of legitimate URIs of Domain Names, the another URI of the another Domain Name being designated for dynamic collection of the real-time second user credentials information.

In other examples of the system, the processor may include the account data vetting facility as further being for performing a validation of the real-time first user credentials information.

In some examples of the system, the processor may require the first account data to include a further URI of a further Domain Name as being designated to be accessed for the dynamic collection of the real-time first user credentials information; and the processor may include the account data vetting facility as further being for comparing real-time first user credentials information posted at the Domain Name with real-time first user credentials information posted at the further Domain Name.

In further examples of the system, the processor may include the account data vetting facility as being for periodically collecting and generating a historical record of the real-time first user credentials information posted at the Domain Name, and as being for comparing the historical record with the real-time first user credentials information being collected in real-time.

In additional examples of the system, the processor may include the account data vetting facility as being for performing a validation of the first account data.

In other examples of the system, the processor may include the account data vetting facility as being for performing a validation of the URI of the Domain Name being designated for dynamic collection of the real-time first user credentials information.

In some examples of the system, the processor may include the account data vetting facility as being for comparing, with a roster of legitimate URIs of Domain Names, the URI of the Domain Name being designated for dynamic collection of the real-time first user credentials information.

In additional examples of the system, the dynamically collecting by the account data-collection facility and the causing of the real-time second user credentials information to be displayed by the first mobile communication device may be controlled by an initiation of the processor command of the first user.

In further examples of the system, the dynamically collecting by the account data-collection facility and the causing of the real-time first user credentials information to be displayed by the second mobile communication device may be controlled by another initiation of the processor command of the second user.

In additional examples of the system, the processor may be responsive to a processor command of the first user for selection of the URI of the Domain Name.

In other examples of the system, the processor may require the Domain Name URI being designated for the dynamic collection of the real-time first user credentials information to be a URI of a third-party-controlled Domain Name.

In some examples of the system, the processor may require the first account data to include a plurality of URIs of third-party-controlled Domain Names being selected from a pre-defined listing of selectable URIs of Domain Names as being displayed by the first mobile communication device.

In further examples of the system, the processor may require the first account data to include a further URI of a further Domain Name as being designated to be accessed for the dynamic collection by the processor of the real-time first user credentials information.

In additional examples of the system, the processor may require the first account data to include both the URI of the Domain Name and the further URI of the further Domain Name as being designated for the dynamic collection of the real-time first user credentials information.

In other examples of the system, the processor may block the first account data from including any URI of a Domain Name matching a pre-defined listing of excluded URIs of Domain Names.

In some examples of the system, the processor may be responsive to a processor command of the first user for designating the URI of the Domain Name as being confidential.

In further examples of the system, the processor may be responsive to a processor command by the second user for causing access to real-time first user credentials information posted at the confidential URI of the Domain Name to be subject to prior authorization by a processor command of the first user.

In additional examples of the system, the processor may be responsive to a processor command of the second user for selection of the another URI of the another Domain Name.

In other examples of the system, the processor may require the another URI being designated for the dynamic collection of the real-time second user credentials information to be another URI of a third-party-controlled Domain Name.

In some examples of the system, the processor may require the second account data to include a plurality of URIs of third-party-controlled Domain Names being selected from a pre-defined listing of selectable URIs of Domain Names as being displayed by the second mobile communication device.

In further examples of the system, the processor may require the second account data to include an additional URI of an additional Domain Name as being designated to be accessed for the dynamic collection by the processor of the real-time second user credentials information.

In additional examples of the system, the processor may require the second account data to include both the another URI of the another Domain Name and the additional URI of the additional Domain Name as being designated for the dynamic collection of the real-time second user credentials information.

In other examples of the system, the processor may block the second account data from including any URI of a Domain Name matching a pre-defined listing of excluded URIs of Domain Names.

In some examples of the system, the processor may be responsive to a processor command of the second user for designating the another URI of the another Domain Name as being confidential.

In further examples of the system, the processor may be responsive to a processor command by the first user for causing access to real-time second user credentials information posted at the confidential another URI of the another Domain Name to be subject to prior authorization by a processor command of the second user.

In additional examples of the system, the processor may be responsive to a processor command of the first user being for causing the real-time second user credentials information or the real-time gathering partner credentials of the second user to be blocked from being displayed by the first mobile communication device unless the second account data include a specific another URI of a specific another Domain Name being designated in a processor command of the first user.

In other examples of the system, the processor being for causing the real-time gathering partner credentials of the second user to be displayed by the first mobile communication device may be subject to prior authorization by a processor command of the second user.

In some examples of the system, the processor being for causing the indication of the real-time geolocation proximity to be displayed by the first mobile communication device may be subject to prior authorization by a processor command of the second user.

In further examples of the system, the processor may include the geolocation facility as tracking a real-time first geolocation of the first mobile communication device.

In additional examples of the system, the geolocation facility as tracking the real-time first geolocation of the first mobile communication device may be subject to prior authorization by a processor command of the first user.

In other examples of the system, the geolocation facility may be further for causing the first unique username of the first user to be displayed by the second mobile communication device as being included in the indication of the real-time geolocation proximity.

In some examples of the system, the geolocation facility may be further for causing the first unique username and a business description of the first user to be displayed by the second mobile communication device as being included in the indication of the real-time geolocation proximity.

In further examples of the system, the processor may be responsive to a processor command of the second user being for causing the real-time first user credentials information or the real-time gathering partner credentials of the first user to be blocked from being displayed by the second mobile communication device unless the first account data include a specific URI of a specific Domain Name being designated in a processor command of the second user.

In additional examples of the system, the processor being for causing the real-time gathering partner credentials of the first user to be displayed by the second mobile communication device may be subject to prior authorization by a processor command of the first user.

In other examples of the system, the processor being for causing the indication of the real-time geolocation proximity to be displayed by the second mobile communication device may be subject to prior authorization by a processor command of the first user.

In some examples of the system, the processor may include the geolocation facility as tracking a real-time second geolocation of the second mobile communication device.

In further examples of the system, the geolocation facility as tracking the real-time second geolocation of the second mobile communication device may be subject to prior authorization by a processor command of the second user.

In additional examples of the system, the geolocation facility may be further for causing the second unique username of the second user to be displayed by the first mobile communication device as being included in the indication of the real-time geolocation proximity.

In other examples of the system, the geolocation facility may be further for causing the second unique username and a business description of the second user to be displayed by the first mobile communication device as being included in the indication of the real-time geolocation proximity.

In some examples of the system, the processor may be responsive to a processor command of the first user for establishing two-way communications between the first and second mobile communication devices.

In further examples of the system, the being responsive of the processor to the processor command of the first user for establishing the two-way communications between the first and second mobile communication devices may be subject to prior authorization by a processor command from the second user.

In additional examples of the system, the processor may be responsive to a processor command of the second user for establishing two-way communications between the first and second mobile communication devices.

In other examples of the system, the being responsive of the processor to the processor command of the second user for establishing the two-way communications between the first and second mobile communication devices may be subject to prior authorization by a processor command from the first user.

In some examples of the system, the processor may include a business meeting arrangement facility for enabling communication between the first user and the second user of an invitation to attend a potential business meeting.

In further examples of the system, the processor may include a business referral facility being responsive to a processor command of the first user for causing an introduction of the second user to the third user to be displayed by the second mobile communication device.

In additional examples of the system, the being responsive to the processor command of the first user for causing the introduction to be displayed by the second mobile communication device may include the business referral facility as being for causing the introduction to include a personalized recommendation for a business referral discussion between the second user and the third user.

In other examples of the system, the data repository may be further for storing the third account data of the third user as including contact information of the third user.

In some examples of the system, the processor may be responsive to a processor command of the first user for causing the contact information of the third user to be displayed by the second mobile communication device.

In further examples of the system, the being responsive to the processor command of the first user for causing the introduction to be displayed by the second mobile communication device may include the business referral facility as being for causing a commission payment commitment for execution by the second user to be displayed by the second mobile communication device.

In additional examples of the system, the being responsive to the processor command of the first user for causing the commission payment commitment to be displayed may include the business referral facility as being for causing the commission payment commitment to be displayed by the first mobile communication device upon execution by the second user.

In other examples of the system, the being responsive to the processor command of the first user for causing the commission payment commitment to be displayed may include the business referral facility as storing the commission payment commitment in the first account data upon execution by the second user.

In some examples of the system, the processor may include the business referral facility as being responsive to a processor command of the second user for causing another introduction of the first user to the third user to be displayed by the first mobile communication device.

In further examples of the system, the being responsive to the processor command of the second user for causing the another introduction to be displayed by the first mobile communication device may include the business referral facility as being for causing the another introduction to include a personalized recommendation for a business referral discussion between the first user and the third user.

In additional examples of the system, the data repository may be further for storing the third account data of the third user as including contact information of the third user.

In other examples of the system, the processor may be responsive to a processor command of the second user for causing the contact information of the third user to be displayed by the first mobile communication device.

In some examples of the system, the being responsive to the processor command of the second user for causing the another introduction to be displayed by the first mobile communication device may include the business referral facility as being for causing another commission payment commitment for execution by the first user to be displayed by the first mobile communication device.

In further examples of the system, the being responsive to the processor command of the second user for causing the another commission payment commitment to be displayed may include the business referral facility as being for causing the another commission payment commitment to be displayed by the second mobile communication device upon execution by the first user.

In additional examples of the system, the being responsive to the processor command of the second user for causing the another commission payment commitment to be displayed may include the business referral facility as storing the another commission payment commitment in the second account data upon execution by the first user.

In other examples of the system, the processor may include a business networking facility being responsive to a processor command of the first user for causing a business description of the first user to be displayed by the second mobile communication device.

In some examples of the system, the business networking facility being responsive to the processor command for causing the business description of the first user to be displayed may include the business description as having a business description element selected from a pre-defined listing of selectable business description elements as being displayed by the first mobile communication device.

In further examples of the system, the business networking facility being responsive to the processor command for causing the business description of the first user to be displayed may include the pre-defined listing of selectable business description elements as including business sectors, knowledge bases, skills, business interests, professions, or business goals.

In additional examples of the system, the business networking facility being responsive to the processor command for causing the business description of the first user to be displayed by the second mobile communication device may be subject to prior authorization by a processor command of the second user.

In other examples of the system, the processor may include the business networking facility as being responsive to a processor command of the second user for causing another business description of the second user to be displayed by the first mobile communication device.

In some examples of the system, the business networking facility being responsive to the processor command for causing the another business description of the second user to be displayed may include the another business description as having another business description element selected from the pre-defined listing of selectable business description elements as being displayed by the second mobile communication device.

In further examples of the system, the business networking facility being responsive to the processor command for causing the another business description of the second user to be displayed may include the pre-defined listing of selectable business description elements as including business sectors, knowledge bases, skills, business interests, professions, or business goals.

In additional examples of the system, the business networking facility being responsive to the processor command for causing the another business description of the second user to be displayed by the first mobile communication device may be subject to prior authorization by a processor command of the first user.

In other examples of the system, the processor may include a business agreement facility being responsive to a processor command of the first user for causing a business agreement form for execution by the second user to be displayed by the second mobile communication device.

In some examples of the system, the being responsive to the processor command of the first user for causing the business agreement form to be displayed may include the business agreement facility as being for causing the business agreement form to be displayed by the first mobile communication device upon execution by the second user.

In further examples of the system, the being responsive to the processor command of the first user for causing the business agreement form to be displayed by the second mobile communication device may include the business agreement facility as storing the business agreement form in the first account data upon execution by the second user.

In additional examples of the system, the being responsive to the processor command of the first user for causing the business agreement form to be displayed by the second mobile communication device may include the business agreement facility as storing the business agreement form in the second account data upon execution by the second user.

In other examples of the system, the being responsive to the processor command of the first user for causing the business agreement form to be displayed may include the business agreement facility as obtaining the business agreement form from a business agreement forms database.

In some examples, the system may further include a business agreement forms database as being coupled with the processor.

In further examples of the system, the business agreement forms database may include a partnership agreement form, or a non-disclosure agreement form, or a joint development agreement form, or a non-binding letter-of-intent agreement form, or a commercial purchase agreement form, or a consulting agreement form.

In additional examples of the system, the processor may include the business agreement facility as being responsive to a processor command of the second user for causing the business agreement form to be displayed by the first mobile communication device for execution by the first user after execution by the second user.

In other examples of the system, the being responsive to the processor command of the second user for causing the business agreement form to be displayed by the first mobile communication device for execution by the first user may include the business agreement facility as storing the business agreement form in the second account data upon execution by the first user.

In some examples of the system, the processor may include the business agreement facility as being responsive to a processor command of the second user for causing another business agreement form for execution by the first user to be displayed by the first mobile communication device.

In further examples of the system, the being responsive to the processor command of the second user for causing the another business agreement form to be displayed may include the business agreement facility as being for causing the another business agreement form to be displayed by the second mobile communication device upon execution by the first user.

In additional examples of the system, the being responsive to the processor command of the second user for causing the another business agreement form to be displayed by the first mobile communication device may include the business agreement facility as storing the another business agreement form in the second account data upon execution by the first user.

In other examples of the system, the being responsive to the processor command of the second user for causing the another business agreement form to be displayed by the first mobile communication device may include the business agreement facility as storing the another business agreement form in the first account data upon execution by the first user.

In some examples of the system, the being responsive to the processor command of the second user for causing the another business agreement form to be displayed may include the business agreement facility as obtaining the another business agreement form from a business agreement forms database.

In further examples of the system, the URI of the Domain Name may be designated to also be accessed for collection of contact information of the first user, and the another URI of the another Domain Name may be designated to also be accessed for collection of contact information of the second user.

In additional examples of the system, the account data-collection facility may be responsive to a processor command of the first user for collecting the contact information of the second user, and the account data-collection facility may be responsive to a processor command of the second user for collecting the contact information of the first user.

In other examples of the system, the data repository may be for: storing the first account data of the first user as including the contact information of the first user; and storing the second account data of the second user as including the contact information of the second user.

In some examples of the system, the URI of the Domain Name may be designated to also be accessed for collection of contact information of the first user, and the another URI of the another Domain Name may be designated to also be accessed for collection of contact information of the second user, and the further URI of the further Domain Name may be designated to also be accessed for collection of contact information of the third user.

In further examples of the system, the account data-collection facility may be responsive to a processor command of the first user for collecting the contact information of the second user and of the third user, and the account data-collection facility may be responsive to a processor command of the second user for collecting the contact information of the first user and of the third user, and the account data-collection facility may be responsive to a processor command of the third user for collecting the contact information of the first user and of the second user.

In additional examples of the system, the data repository may be for: storing first account data of the first user including the contact information of the first user; and storing second account data of the second user including the contact information of the second user; and storing third account data of the third user including the contact information of the third user.

In other examples of the system, the processor may be responsive to a processor command of the first user or to a processor command of the second user or to a processor command of the third user, for causing the contact information of the first user or for causing the contact information of the second user or for causing the contact information of the third user to be received by the first mobile communication device or by the second mobile communication device or by the third mobile communication device.

In some examples of the system, the processor may be responsive to a processor command of the first user or to a processor command of the second user or to a processor command of the third user, for causing the contact information of the first, second or third user to be updated.

In further examples of the system, the processor may be responsive to a processor command of the first user or to a processor command of the second user or to a processor command of the third user, for causing the contact information of the first, second or third user to be automatically updated on an ongoing periodic basis.

In other examples of the system, the processor may be responsive to a processor command of the first user or to a processor command of the second user or to a processor command of the third user, for causing the contact information of the first, second or third user to be categorized into a defined group.

In some examples of the system, the processor may be responsive to a processor command of the first user or to a processor command of the second user or to a processor command of the third user, for causing a message, announcement, or other information to be sent, utilizing the contact information, to the users being included in such a categorized group.

In some examples of the system, the data repository may be coupled with the processor for storing the first account data as including a Uniform Resource Locator ("URL") of an Internet Domain Name being designated to be accessed for dynamic collection of the real-time first user credentials information and for storing the second account data as including another URL of another Internet Domain Name being designated to be accessed for dynamic collection of the real-time second user credentials information.

In an example of another implementation, a process for generation of real-time gathering partner credentials is provided, that includes providing a processor and providing a data repository being coupled with the processor. The example of the process includes providing the processor as having a geolocation facility and an account data-collection facility. In the example of the process, the processor is enabled for network-based access to a user interface for registering and maintaining a first user account of a first user and a second user account of a second user. The processor in the example of the process enables communication with a first mobile communication device in the possession of the first user and enables communication with a second mobile communication device in the possession of the second user. In the example of the process, the processor is enabled for executing processor commands of the first user and for executing processor commands of the second user. The example of the process includes causing the data repository to store first account data of the first user account and to store second account data of the second user account. In the example of the process, the first account data includes a Uniform Resource Identifier ("URI") of a Domain Name being designated to be accessed for dynamic collection of real-time first user credentials information, and the second account data includes another URI of another Domain Name being designated to be accessed for dynamic collection of real-time second user credentials information. Also in the example of the process, the first account data is associated with a first unique username of the first user, and the second account data is associated with a second unique username of the second user. The example of the process further includes causing the geolocation facility to determine an indication of a real-time geolocation proximity between the first mobile communication device and the second mobile communication device. The example of the process additionally includes causing the account data-collection facility to respond in real-time to a processor command of the first user for dynamically collecting the real-time second user credentials information. Further, the example of the process includes causing real-time gathering partner credentials of the second user, including the indication of the real-time geolocation proximity and the real-time second user credentials information, to be displayed by the first mobile communication device.

In further examples of the process, causing the real-time gathering partner credentials of the second user to be displayed by the first mobile communication device may include the processor being responsive in real-time to a processor command of the first user.

In additional examples of the process, the processor causing the real-time gathering partner credentials of the second user to be displayed may include the processor causing the indication of the real-time geolocation proximity and the real-time second user credentials information to be displayed as being integrated together by the first mobile communication device.

In other examples of the process, the processor causing the real-time gathering partner credentials of the second user to be displayed may include the processor causing a first marker indicating a real-time first geolocation of the first mobile communication device to be displayed at a first position on the first mobile communication device, and further may include the processor causing a second marker indicating a real-time second geolocation of the second mobile communication device to be displayed at a second position on the first mobile communication device.

In some examples of the process, the processor causing the indication of the real-time geolocation proximity to be displayed may include the processor causing the first marker indicating the real-time first geolocation to be displayed at the first position on the first mobile communication device, and further may include the processor causing the second marker indicating the real-time second geolocation to be displayed at the second position on the first mobile communication device.

In further examples of the process, the processor causing the second marker indicating the real-time second geolocation of the second mobile communication device to be displayed at the second position on the first mobile communication device may include the processor causing the real-time second user credentials information to be displayed at the second position.

In additional examples of the process, the account data-collection facility being responsive to the processor command of the first user for the dynamically collecting the real-time second user credentials information may be subject to prior authorization by a processor command of the second user.

In other examples of the process, the account data-collection facility being subject to the prior authorization by the processor command of the second user for the dynamically collecting the real-time second user credentials information further may enable the second user to select a tier of the real-time second user credentials information to be displayed from a selectable plurality of tiers of the real-time second user credentials information.

In some examples of the process, the processor executing processor commands of the second user may include registering and maintaining the second user account with the second account data as including a business description of the second user.

In further examples of the process, the processor causing the real-time gathering partner credentials of the second user to be displayed may include the processor causing the business description of the second user to be displayed by the first mobile communication device.

In additional examples of the process, the processor executing the processor commands for registering and maintaining the second user account may include the business description of the second user as including a business description element being selected from a pre-defined listing of selectable business description elements displayed by the second mobile communication device.

In other examples of the process, the processor executing the processor commands for registering and maintaining the second user account may include the pre-defined listing of selectable business description elements as including business sectors, knowledge bases, skills, business interests, professions, or business goals.

In some examples of the process, the processor executing the processor commands for registering and maintaining the second user account may include the business description as including a rating by the second user as to their level of experience or interest in the selected business description element.

In further examples of the process, the geolocation facility determining the indication of the real-time geolocation proximity may include being responsive to a processor command of the first user for causing the indication of the real-time geolocation proximity between the first and second mobile communication devices to be displayed by the first mobile communication device.

In additional examples of the process, the geolocation facility determining the indication of the real-time geolocation proximity may include being responsive to the processor command of the first user for causing the indication of the real-time geolocation proximity to be displayed as being subject to the first and second mobile communication devices as being within a limited maximum proximity distance.

In other examples of the process, the processor being responsive to a processor command of the first user may include the processor as dynamically collecting the real-time second user credentials information or the indication of the real-time geolocation proximity.

In some examples of the process, the processor being responsive to processor commands of the first user may include the processor responding in real-time to a processor command of the first user for causing to be displayed by the first mobile communication device, prior to the causing the real-time gathering partner credentials of the second user to be displayed, the indication of the real-time geolocation proximity integrated with a business description of the second user.

In further examples of the process, the geolocation facility being responsive to processor commands of the first user may include the processor responding to a processor command for causing the indication of the real-time geolocation proximity to be displayed by the first mobile communication device in a text format or in a map format.

In additional examples of the process, the geolocation facility being responsive to processor commands of the first user may include the geolocation facility responding to a processor command for causing the indication of the real-time geolocation proximity to be periodically updated and displayed by the first mobile communication device.

In other examples, the process may further include: causing the account data-collection facility to respond in real-time to a processor command of the second user for dynamically collecting the real-time first user credentials information; and causing real-time gathering partner credentials of the first user, including the indication of the real-time geolocation proximity and the real-time first user credentials information, to be displayed by the second mobile communication device.

In some examples of the process, causing the real-time gathering partner credentials of the first user to be displayed by the second mobile communication device may include the processor being responsive in real-time to a processor command of the second user.

In further examples of the process, the processor causing the real-time gathering partner credentials of the first user to be displayed may include the processor causing the indication of the real-time geolocation proximity and the real-time first user credentials information to be displayed as being integrated together by the second mobile communication device.

In additional examples of the process, the processor causing the real-time gathering partner credentials of the first user to be displayed may include the processor causing a first marker indicating a real-time first geolocation of the first mobile communication device to be displayed at a first position on the second mobile communication device, and further may include the processor causing a second marker indicating a real-time second geolocation of the second mobile communication device to be displayed at a second position on the second mobile communication device.

In other examples of the process, the processor causing the indication of the real-time geolocation proximity to be displayed may include the processor causing the first marker indicating the real-time first geolocation to be displayed at the first position on the second mobile communication device, and further may include the processor causing the second marker indicating the real-time second geolocation to be displayed at the second position on the second mobile communication device.

In some examples of the process, the processor causing the second marker indicating the real-time second geolocation of the second mobile communication device to be displayed at the second position on the second mobile communication device may include the processor causing the real-time second user credentials information to be displayed at the second position.

In further examples of the process, the account data-collection facility being responsive to the processor command of the second user for the dynamically collecting the real-time first user credentials information may be subject to prior authorization by a processor command of the first user.

In additional examples of the process, the account data-collection facility being subject to the prior authorization by the processor command of the first user for the dynamically collecting the real-time first user credentials information further may enable the first user to select a tier of the real-time first user credentials information to be displayed from a selectable plurality of tiers of the real-time first user credentials information.

In other examples of the process, the processor executing processor commands of the first user may include registering and maintaining the first user account with the first account data as including a business description of the first user.

In some examples of the process, the processor causing the real-time gathering partner credentials of the first user to be displayed may include the processor causing the business description of the first user to be displayed by the second mobile communication device.

In further examples of the process, the processor executing the processor commands for registering and maintaining the first user account may include the business description of the first user as including a business description element being selected from a pre-defined listing of selectable business description elements displayed by the second mobile communication device.

In additional examples of the process, the processor executing the processor commands for registering and maintaining the first user account may include the pre-defined listing of selectable business description elements as including business sectors, knowledge bases, skills, business interests, professions, or business goals.

In other examples of the process, the processor executing the processor commands for registering and maintaining the first user account may include the business description as including a rating by the first user as to their level of experience or interest in the selected business description element.

In some examples of the process, the geolocation facility determining the indication of the real-time geolocation proximity may include being responsive to a processor command of the second user for causing the indication of the real-time geolocation proximity between the first and second mobile communication devices to be displayed by the second mobile communication device.

In further examples of the process, the geolocation facility determining the indication of the real-time geolocation proximity may include being responsive to the processor command of the second user for causing the indication of the real-time geolocation proximity to be displayed as being subject to the first and second mobile communication devices as being within a limited maximum proximity distance.

In additional examples of the process, the processor being responsive to a processor command of the second user may include the processor as dynamically collecting the real-time first user credentials information or the indication of the real-time geolocation proximity.

In other examples of the process, the processor being responsive to processor commands of the second user may include the processor responding in real-time to a processor command of the second user for causing to be displayed by the second mobile communication device, prior to the causing the real-time gathering partner credentials of the first user to be displayed, the indication of the real-time geolocation proximity integrated with a business description of the first user.

In some examples of the process, the geolocation facility being responsive to processor commands of the second user may include the processor responding to a processor command for causing the indication of the real-time geolocation proximity to be displayed by the second mobile communication device in a text format or in a map format.

In further examples of the process, the geolocation facility being responsive to processor commands of the second user may include the geolocation facility responding to a processor command for causing the indication of the real-time geolocation proximity to be periodically updated and displayed by the second mobile communication device.

In additional examples of the process, providing the processor may include the processor being enabled for network-based access to the user interface for registering and maintaining a third user account of a third user. Further in the additional examples of the process, the processor may enable communication with a third mobile communication device being in the possession of the third user, and the processor may be enabled for executing processor commands of the third user. The additional examples of the process may include causing the data repository to store third account data of the third user account, the third account data including a further URI of a further Domain Name being designated to be accessed for dynamic collection of real-time third user credentials information. In the additional examples of the process, the third account data may be associated with a third unique username of the third user. The additional examples of the process may include causing the geolocation facility to determine an indication of another real-time geolocation proximity between the first mobile communication device and the third mobile communication device. The additional examples of the process may also include causing the account data-collection facility to respond in real-time to a processor command of the first user for dynamically collecting the real-time third user credentials information. Also, the additional examples of the process may include causing real-time gathering partner credentials of the third user, including the indication of the another real-time geolocation proximity and the real-time third user credentials information, to be displayed by the first mobile communication device.

In other examples of the process, the processor causing the real-time gathering partner credentials of the third user to be displayed may include: the processor causing the indication of the real-time geolocation proximity and the real-time second user credentials information to be displayed as being integrated together by the first mobile communication device; and may include the processor causing the indication of the another real-time geolocation proximity and the real-time third user credentials information to be displayed as being integrated together by the first mobile communication device.

In some examples of the process, the processor causing the real-time gathering partner credentials of the third user to be displayed may include: the processor causing a first marker indicating a real-time first geolocation of the first mobile communication device to be displayed at a first position on the first mobile communication device; and the processor causing a second marker indicating a real-time second geolocation of the second mobile communication device to be displayed at a second position on the first mobile communication device; and the processor causing a third marker indicating a real-time third geolocation of the third mobile communication device to be displayed at a third position on the first mobile communication device.

In further examples of the process, the processor causing the indication of the real-time geolocation proximity to be displayed may include the processor causing the first marker indicating the real-time first geolocation to be displayed at the first position on the first mobile communication device, and further may include the processor causing the second marker indicating the real-time second geolocation to be displayed at the second position on the first mobile communication device; and also may include the processor causing the third marker indicating the real-time third geolocation to be displayed at the third position on the first mobile communication device.

In additional examples of the process, the processor causing the third marker indicating the real-time third geolocation of the third mobile communication device to be displayed at the third position on the first mobile communication device may include the processor causing the real-time third user credentials information to be displayed at the third position.

In other examples of the process, the account data-collection facility being responsive to the processor command of the first user for the dynamically collecting the real-time third user credentials information may be subject to prior authorization by a processor command of the third user.

In some examples of the process, the account data-collection facility being subject to the prior authorization by the processor command of the third user for the dynamically collecting the real-time third user credentials information further may enable the third user to select a tier of the real-time third user credentials information to be displayed from a selectable plurality of tiers of the real-time third user credentials information.

In further examples of the process, the processor executing processor commands of the third user for registering and maintaining the third user account may include the third account data as including a business description of the third user.

In additional examples of the process, the processor causing the real-time gathering partner credentials of the third user to be displayed may include the processor causing the business description of the third user to be displayed by the first mobile communication device.

In other examples of the process, the processor executing the processor commands for registering and maintaining the third user account may include the business description of the third user as including a business description element being selected from a pre-defined listing of selectable business description elements displayed by the third mobile communication device.

In some examples of the process, the processor executing the processor commands for registering and maintaining the third user account may include the pre-defined listing of selectable business description elements as including business sectors, knowledge bases, skills, business interests, professions, or business goals.

In further examples of the process, the processor executing the processor commands for registering and maintaining the third user account may include the business description as including a rating by the third user as to their level of experience or interest in the selected business description element.

In additional examples of the process, the geolocation facility determining the indication of the real-time geolocation proximity may include: being responsive to a processor command of the first user for causing the indication of the real-time geolocation proximity between the first and second mobile communication devices to be displayed by the first mobile communication device; and being responsive to a processor command of the first user for causing the indication of the another real-time geolocation proximity between the first and third mobile communication devices to be displayed by the first mobile communication device.

In other examples of the process, the geolocation facility determining the indication of the real-time geolocation proximity may include: being responsive to the processor command of the first user for causing the indication of the real-time geolocation proximity to be displayed as being subject to the first and second mobile communication devices as being within a limited maximum proximity distance; and being responsive to the processor command of the first user for causing the indication of the another real-time geolocation proximity to be displayed subject to the first and third mobile communication devices as being within the limited maximum proximity distance.

In some examples of the process, the processor being responsive to a processor command of the first user may include the processor as dynamically collecting the real-time third user credentials information or the indication of the another real-time geolocation proximity.

In further examples of the process, the processor being responsive to processor commands of the first user may include the processor responding in real-time to a processor command of the first user for causing to be displayed by the first mobile communication device, prior to the causing the real-time gathering partner credentials of the third user to be displayed, the indication of the another real-time geolocation proximity integrated with a business description of the third user.

In additional examples of the process, the geolocation facility being responsive to processor commands of the first user may include the processor responding to a processor command of the first user for causing the indication of the real-time geolocation proximity and the indication of the another real-time geolocation proximity to both be displayed by the first mobile communication device in a text format or in a map format.

In other examples of the process, the geolocation facility being responsive to processor commands of the first user may include the geolocation facility responding to a processor command of the first user for causing the indication of the real-time geolocation proximity and the indication of the another real-time geolocation proximity to be periodically updated and displayed by the first mobile communication device.

In some examples of the process, the geolocation facility being responsive to processor commands of the first user may include the geolocation facility responding to a processor command of the first user for causing the indication of the real-time geolocation proximity and the another real-time geolocation proximity to both be displayed by the first mobile communication device, provided that each of the second and third mobile communication devices may be within a limited maximum proximity distance of the first mobile communication device.

In further examples of the process, providing the processor may include providing an account data vetting facility, and dynamically collecting the real-time second user credentials information may include performing a validation of the real-time second user credentials information.

In additional examples of the process, dynamically collecting the real-time second user credentials information may include performing a validation of the second account data.

In other examples of the process, dynamically collecting the real-time first user credentials information may include performing a validation of the real-time first user credentials information.

In some examples of the process, dynamically collecting the real-time first user credentials information may include performing a validation of the first account data.

In further examples of the process, causing the data repository to store first account data may include the URI of the Domain Name as being designated to also be accessed for collection of contact information of the first user, and causing the data repository to store second account data may include the another URI of the another Domain Name as being designated to also be accessed for collection of contact information of the second user.

In additional examples, the process may include causing the account data-collection facility to respond to a processor command of the first user for collecting the contact information of the second user, and may include causing the account data-collection facility to respond to a processor command of the second user for collecting the contact information of the first user.

In other examples of the process, causing the data repository to store first account data may include causing the data repository to store the first account data of the first user as including the contact information of the first user; and causing the data repository to store second account data may include causing the data repository to store the second account data of the second user as including the contact information of the second user.

In some examples of the process, causing the data repository to store first account data may include the URI of the Domain Name as being designated to also be accessed for collection of contact information of the first user, and causing the data repository to store second account data may include the another URI of the another Domain Name as being designated to also be accessed for collection of contact information of the second user, and causing the data repository to store third account data may include the further URI of the further Domain Name as being designated to also be accessed for collection of contact information of the third user.

In further examples, the process may further include causing the account data-collection facility to respond to a processor command of the first user for collecting the contact information of the second user and of the third user, and may further include causing the account data-collection facility to respond to a processor command of the second user for collecting the contact information of the first user and of the third user, and may further include causing the account data-collection facility to respond to a processor command of the third user for collecting the contact information of the first user and of the second user.

In additional examples, the process may further include causing the account data-collection facility to: store first account data of the first user including the contact information of the first user; and store second account data of the second user including the contact information of the second user; and store third account data of the third user including the contact information of the third user.

In other examples, the process may further include causing the processor to respond to a processor command of the first user or to a processor command of the second user or to a processor command of the third user, for causing the contact information of the first user or for causing the contact information of the second user or for causing the contact information of the third user to be received by the first mobile communication device or by the second mobile communication device or by the third mobile communication device.

In some examples, the process may include causing the processor to respond to a processor command of the first user or to a processor command of the second user or to a processor command of the third user, for causing the contact information of the first, second or third user to be updated.

In further examples, the process may further include causing the processor to respond to a processor command of the first user or to a processor command of the second user or to a processor command of the third user, for causing the contact information of the first, second or third user to be automatically updated on an ongoing periodic basis.

In additional examples, the process may include causing the processor to respond to a processor command of the first user or to a processor command of the second user or to a processor command of the third user, for causing the contact information of the first, second or third user to be categorized into a defined group.

In some examples, the process may further include causing the processor to respond to a processor command of the first user or to a processor command of the second user or to a processor command of the third user, for causing a message, announcement, or other information to be sent, utilizing the contact information, to the users being included in such a categorized group.

In further examples of the process, causing the data repository to store the first account data may include the URI of the Domain Name as being a Uniform Resource Locator ("URL") of an Internet Domain Name being designated to be accessed for dynamic collection of the real-time first user credentials information, and causing the data repository to store the second account data may include the another URI as being another URL of another Internet Domain Name being designated to be accessed for dynamic collection of the real-time second user credentials information.

In an example of a further implementation, a non-transitory computer storage medium is provided, having stored executable program instructions that direct the performance by a network-based computing system having a processor coupled with a data repository to perform a process that includes causing the processor to provide a geolocation facility and an account data-collection facility. In the example of the non-transitory computer storage medium, the process includes causing the processor to provide network-based access to a user interface for registering and maintaining a first user account of a first user and a second user account of a second user. Also in the example of the non-transitory computer storage medium, the process includes causing the processor to provide communication with a first mobile communication device in the possession of the first user and to provide communication with a second mobile communication device in the possession of the second user. The process in the example of the non-transitory computer storage medium further includes causing the processor to execute processor commands of the first user and of the second user. In the example of the non-transitory computer storage medium, the process further includes causing the data repository to be coupled with the processor. Additionally, the process in the example of the non-transitory computer storage medium includes causing the data repository to store first account data of the first user account and to store second account data of the second user account, the first account data including a Uniform Resource Identifier ("URI") of a Domain Name being designated to be accessed for dynamic collection of real-time first user credentials information and the second account data including another URI of another Domain Name being designated to be accessed for dynamic collection of real-time second user credentials information. In the example of the non-transitory computer storage medium, the process includes the first account data as being associated with a first unique username of the first user and the second account data as being associated with a second unique username of the second user. The process in the example of the non-transitory computer storage medium further includes causing the geolocation facility to determine an indication of a real-time geolocation proximity between the first mobile communication device and the second mobile communication device. In addition, the process in the example of the non-transitory computer storage medium includes causing the account data-collection facility to respond in real-time to a processor command of the first user for dynamically collecting the real-time second user credentials information. In the example of the non-transitory computer storage medium, the process also includes causing real-time gathering partner credentials of the second user, including the indication of the real-time geolocation proximity and the real-time second user credentials information, to be displayed by the first mobile communication device.

In some examples of the non-transitory computer storage medium, the process may further include causing the processor to provide the network-based access to the user interface for registering and maintaining a third user account of a third user. Additionally in those examples of the non-transitory computer storage medium, the process may include causing the processor to provide communication with a third mobile communication device in the possession of the third user. Furthermore in the example of the non-transitory computer storage medium, the process may include causing the processor to execute processor commands of the third user. In those examples of the non-transitory computer storage medium, the process may include causing the data repository to store third account data of the third user account, the third account data including a further URI of a further Domain Name being designated to be accessed for dynamic collection of real-time third user credentials information. Also in those examples of the non-transitory computer storage medium, the third account data may be associated with a third unique username of the third user. The process in those examples of the non-transitory computer storage medium may further include causing the geolocation facility to determine an indication of another real-time geolocation proximity between the first mobile communication device and the third mobile communication device. Additionally in those examples of the non-transitory computer storage medium, the process may include causing the account data-collection facility to respond in real-time to a processor command of the first user for dynamically collecting the real-time third user credentials information. In those examples of the non-transitory computer storage medium, the process may also include causing real-time gathering partner credentials of the third user, including the indication of the another real-time geolocation proximity and the real-time third user credentials information, to be displayed by the first mobile communication device.

Other systems, devices, processes, features and advantages of the invention will be or will become apparent to one with skill in the art upon examination of the following figures and detailed description. It is intended that all such additional systems, devices, processes, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
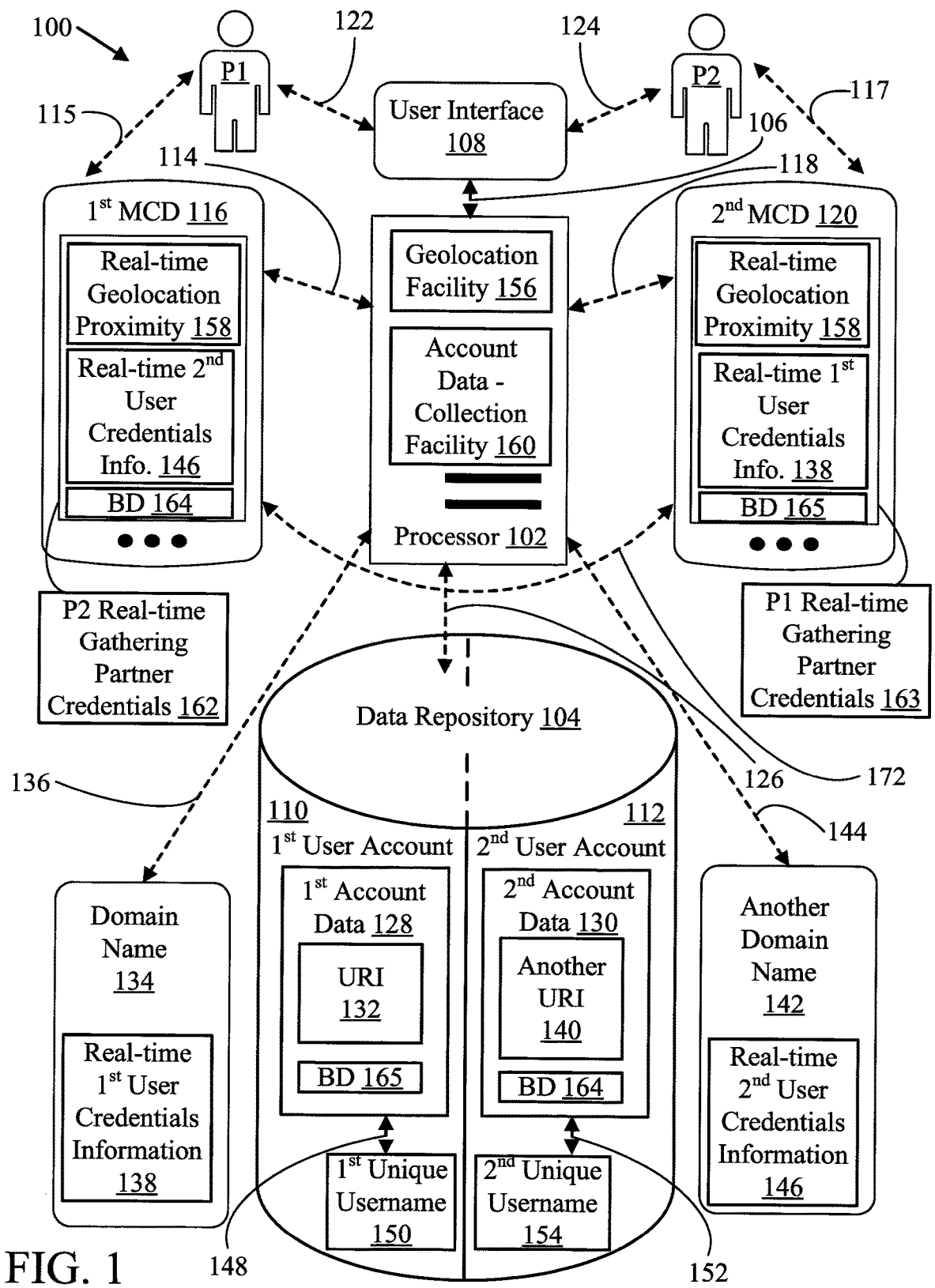
FIG. 1 is a schematic diagram showing examples [100] of an implementation of a system for generation of real-time gathering partner credentials.

Various systems and processes have been developed for generation and distribution of information regarding potential business networking partners. However, the enduring shortfalls of such information include, as examples, unreliability, information staleness, systemic biases, and applicability to a limited subset of real-life situations. For example, someone who is away from home may be contemplating a boring restaurant meal while sitting alone. As another example, someone who is home but whose business networking associates are out of town may likewise be contemplating a boring meal while sitting alone. For some people, the thought of meeting up with random strangers for a discussion of business and pursuit of professional networking opportunities is exciting. Many others, however, dread the thought of trying to start and maintain a conversation with strangers about whom they know nothing.

In these and myriad other circumstances, it would be advantageous to provide information combining the identification of people who happen to be in real-time geolocation proximity together with business credentials information about such people, being collected in real-time from on-line sources for increased reliability. If the business credentials information is obtained on a real-time basis from on-line sources, its reliability is increased because false or misleading on-line information may tend to damage the professional business reputation of the offending person. Furthermore, if a person seeking safe, worthwhile, spontaneous professional interaction with strangers can obtain real-time gathering partner credentials information regarding strangers who happen to be nearby "right now," such a person may be more likely to utilize such information "right now" as being both trustworthy and timely and while such strangers remain nearby. Accordingly, in an example, a system for generation of real-time gathering partner credentials is provided, including a processor and a data repository. In this example, the processor provides network-based access to a user interface for registering and maintaining a first user account of a first user and for registering and maintaining a second user account of a second user. The processor in this example of the system is in communication with a first mobile communication device being in the possession of the first user and in communication with a second mobile communication device being in the possession of the second user. In this example, the processor is for executing processor commands of the first user and for executing processor commands of the second user. The data repository in this example of the system is coupled with the processor for storing first account data of the first user account and for storing second account data of the second user account. In this example, the first account data includes a Uniform Resource Identifier ("URI") of a Domain Name being designated to be accessed for dynamic collection of real-time first user credentials information; and the second account data includes another URI of another Domain Name being designated to be accessed for dynamic collection of real-time second user credentials information. Further in this example of the system, the first account data is associated with a first unique username of the first user, and the second account data is associated with a second unique username of the second user. The processor in this example includes a geolocation facility for determining an indication of a real-time geolocation proximity between the first mobile communication device and the second mobile communication device. The processor in this example of the system also includes an account data-collection facility being responsive in real-time to a processor command of the first user for dynamically collecting the real-time second user credentials information. In this example, the processor is for causing real-time gathering partner credentials of the second user, including the indication of the real-time geolocation proximity and the real-time second user credentials information, to be displayed by the first mobile communication device.

In another example, a process for generation of real-time gathering partner credentials is accordingly provided, that includes providing a processor and providing a data repository being coupled with the processor. This example of the process further includes providing the processor as having a geolocation facility and an account data-collection facility. Further aspects of this example of the process are discussed herein. In a further example, a non-transitory computer storage medium is accordingly provided, having stored executable program instructions that direct the performance by a network-based computing system having a processor coupled with a data repository to perform a process that includes causing the processor to provide a geolocation facility and an account data-collection facility. Further examples of the system, the process, and the non-transitory computer storage medium are also discussed herein.

The following definitions of terms, being stated as applying "throughout this specification", are hereby deemed to be incorporated throughout this specification, including but not limited to the Summary, Brief Description of the Figures, Detailed Description, and Claims.

Throughout this specification, the term "Internet" (being a contraction of "interconnected network"), also referred to as the World Wide Web, is the global system of interconnected computer networks that use the Internet protocol suite to link devices worldwide.

Throughout this specification, the term "Uniform Resource Identifier" (URI), also referred to as a "network address", identifies a computer network resource by specifying its location on a computer network and by specifying a mechanism for retrieving that resource.

Throughout this specification, the term "Uniform Resource Locator" (URL), also referred to as a "web address" is a Uniform Resource Identifier that identifies a computer network resource by specifying its location on the Internet and by specifying a mechanism for retrieving that resource.

Throughout this specification, the term "Domain Name" identifies a network destination corresponding to a Uniform Resource Identifier.

Throughout this specification, the term "third-party-controlled Domain Name" means a Domain Name being owned by or controlled by a party other than a user, for example [P1], whose Real-time User Credentials Information is posted at the Domain Name. As examples, a third-party-controlled Domain Name may include: a professional association Domain Name, a professional licensing authority Domain Name, an employer (of a user) Domain Name, or a business networking platform Domain Name (such as, for example, LinkedIn or Voray).

Throughout this specification, the term "Internet Domain Name" identifies an Internet network destination corresponding to a Uniform Resource Locator.

Throughout this specification, the term "mobile communication device" (also referred to herein as a "MCD") means any portable device, including any device attachments for the display or printing of information, being suitable for being carried by a person and being enabled to send and receive information in exchange with cellular telephone or paging systems, the Internet, or any similar communication system.

Throughout this specification, the term "user interface" means a human-machine interface (HMI) that receives information inputs from a user by physical hardware such keyboards, mice, and touch pads, and/or that provides information outputs to the user by physical hardware such as computer monitors, speakers, and printers.

Throughout this specification, the term "username" means an identification used by a person having access to a computer, network, mobile communication device, or other online service.

Throughout this specification, the term "processor" means an electronic circuit that performs operations on a data source; and may include, as examples, a central processing unit and/or a specialized processor.

Throughout this specification, the term "real-time" means taking place in the present.

Throughout this specification, the term "credentials" means "business credentials", being substantive information relating to a person's business, including as examples, job history, career, current business position, education, professional certifications, character, ethics, reputation, and credit record.

Throughout this specification, the term "map format" means any form of geographical layout, such as a Global Positioning Satellite "GPS" layout.

Throughout this specification, the term "geolocation" means the identification or estimation of the real-world geographic location of an object, such as a person or a mobile communication device.

It is understood throughout this specification that numbering of the names of elements as being "first", "second" etcetera, is solely for purposes of clarity in referring to such elements in connection with various examples of lighting systems.

Figure 2:
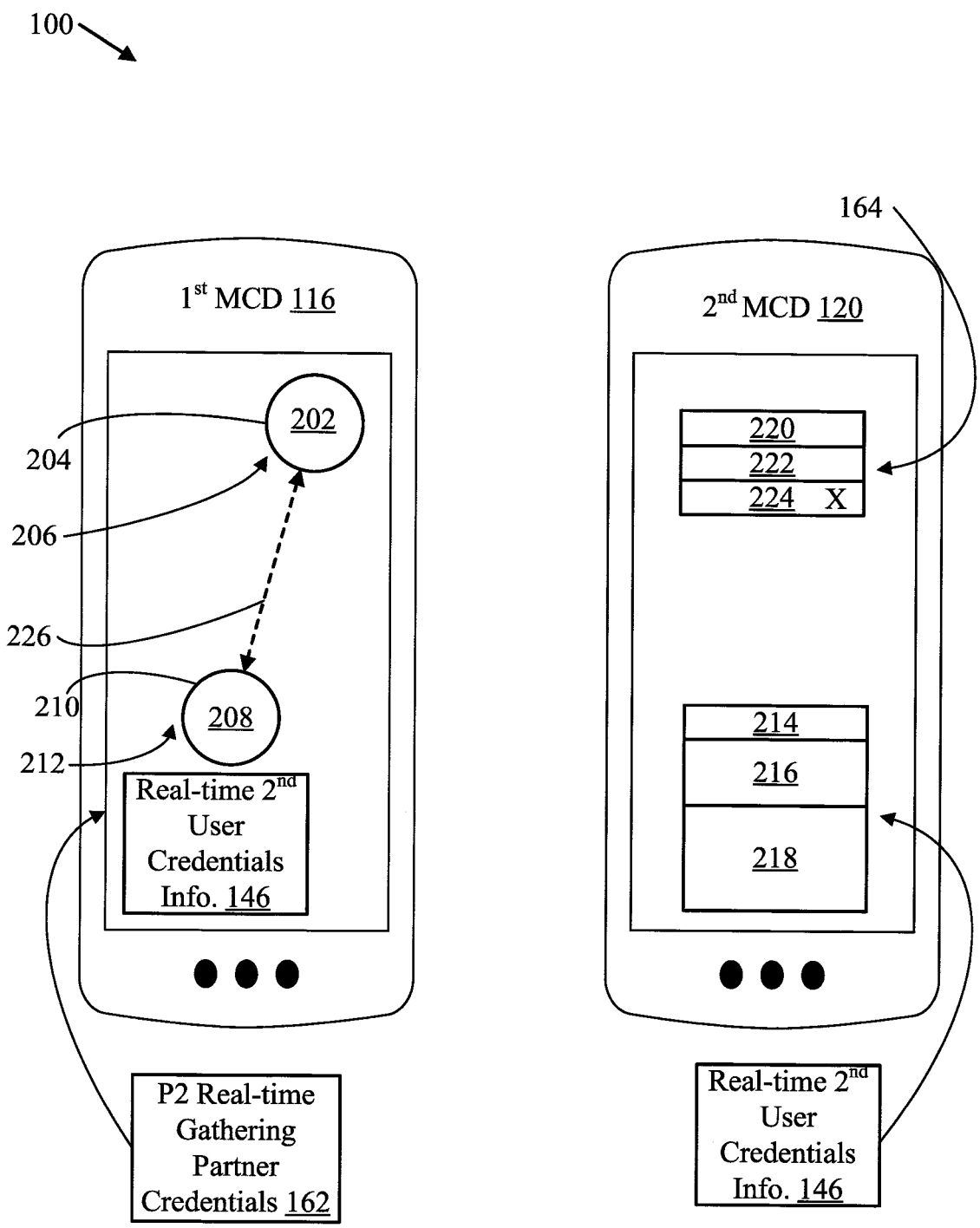
FIG. 2 is another schematic diagram showing features that may be included in some of the examples [100] of the implementation of a system for generation of real-time gathering partner credentials.
Figure 3:
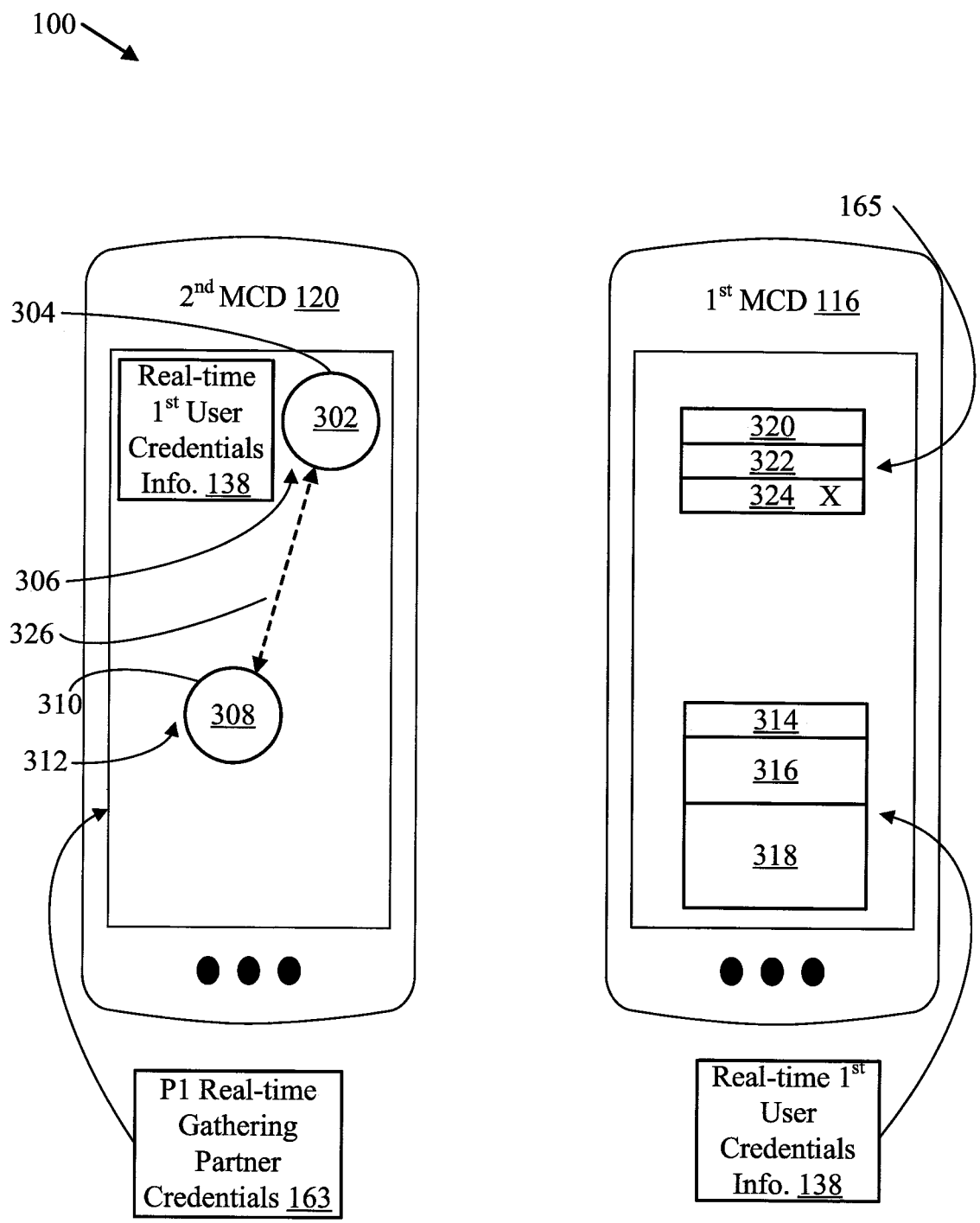
FIG. 3 is a further schematic diagram showing further features that may be included in some of the examples [100] of the implementation of a system for generation of real-time gathering partner credentials.
Figure 4:
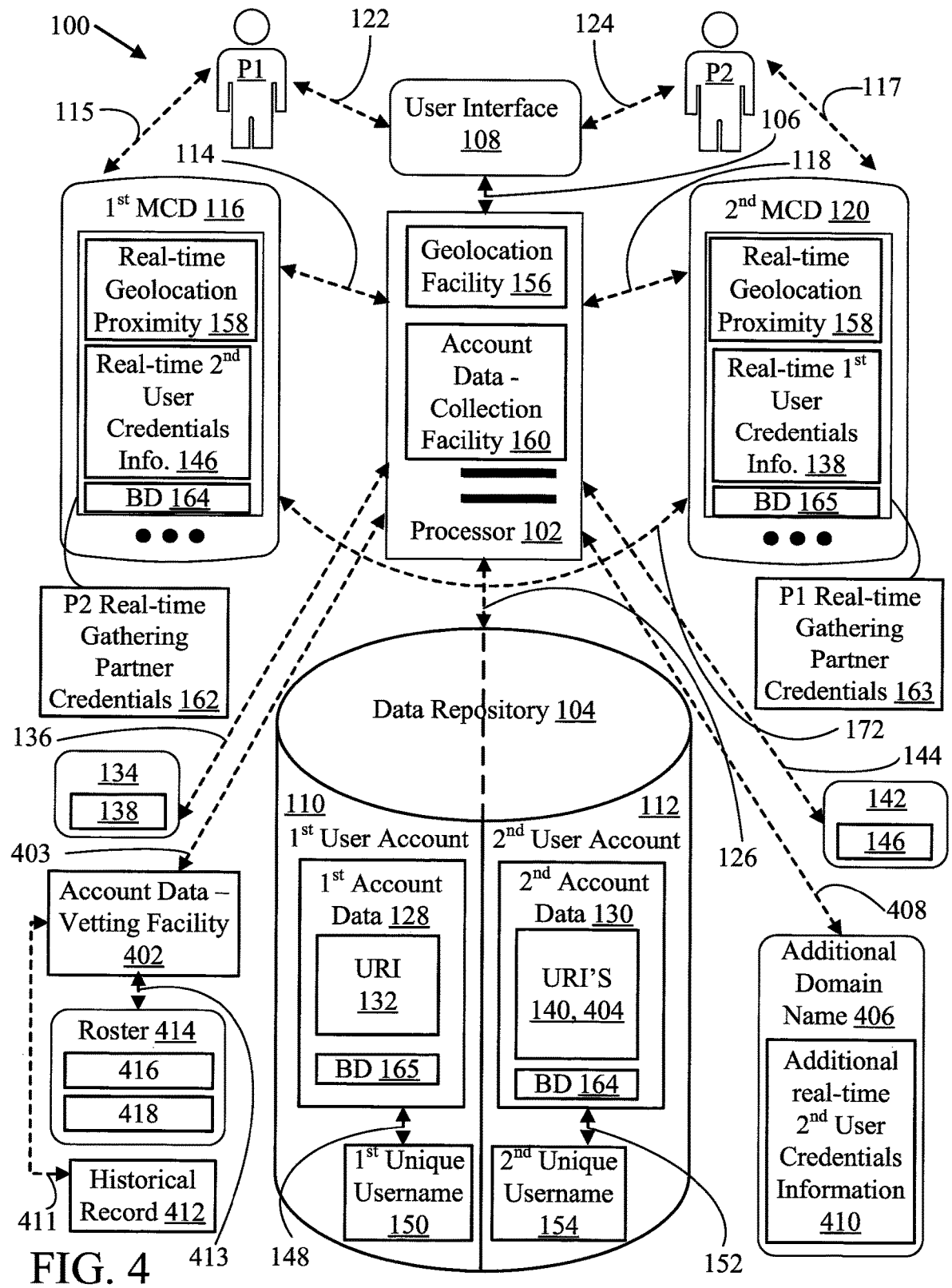
FIG. 4 is an additional schematic diagram showing additional features that may be included in some of the examples [100] of the implementation of a system for generation of real-time gathering partner credentials, which may include an account data vetting facility.
Figure 5:
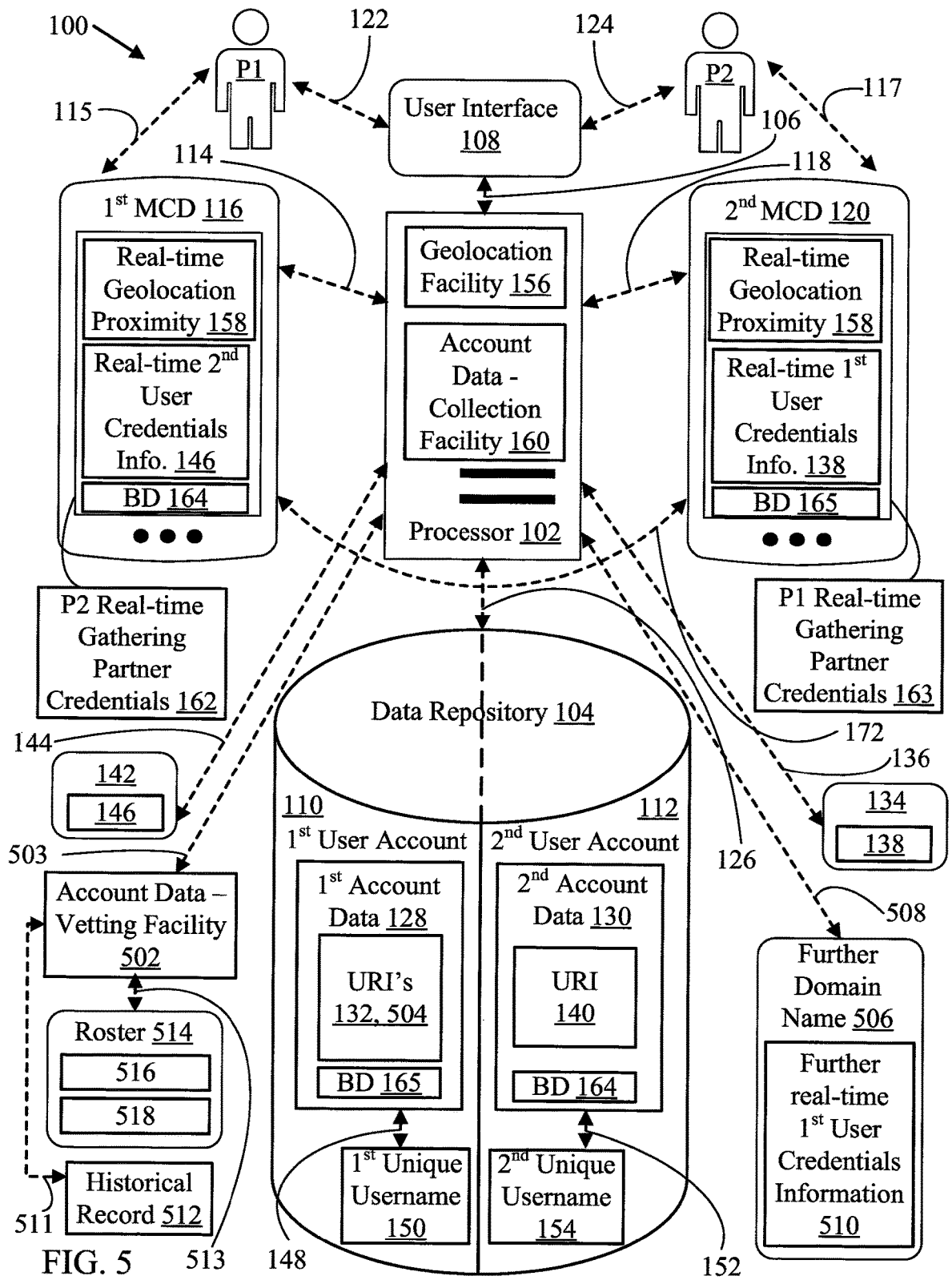
FIG. 5 is yet another schematic diagram showing features that may be included in some of the examples [100] of the implementation of a system for generation of real-time gathering partner credentials, which may include an account data vetting facility.
Figure 6:
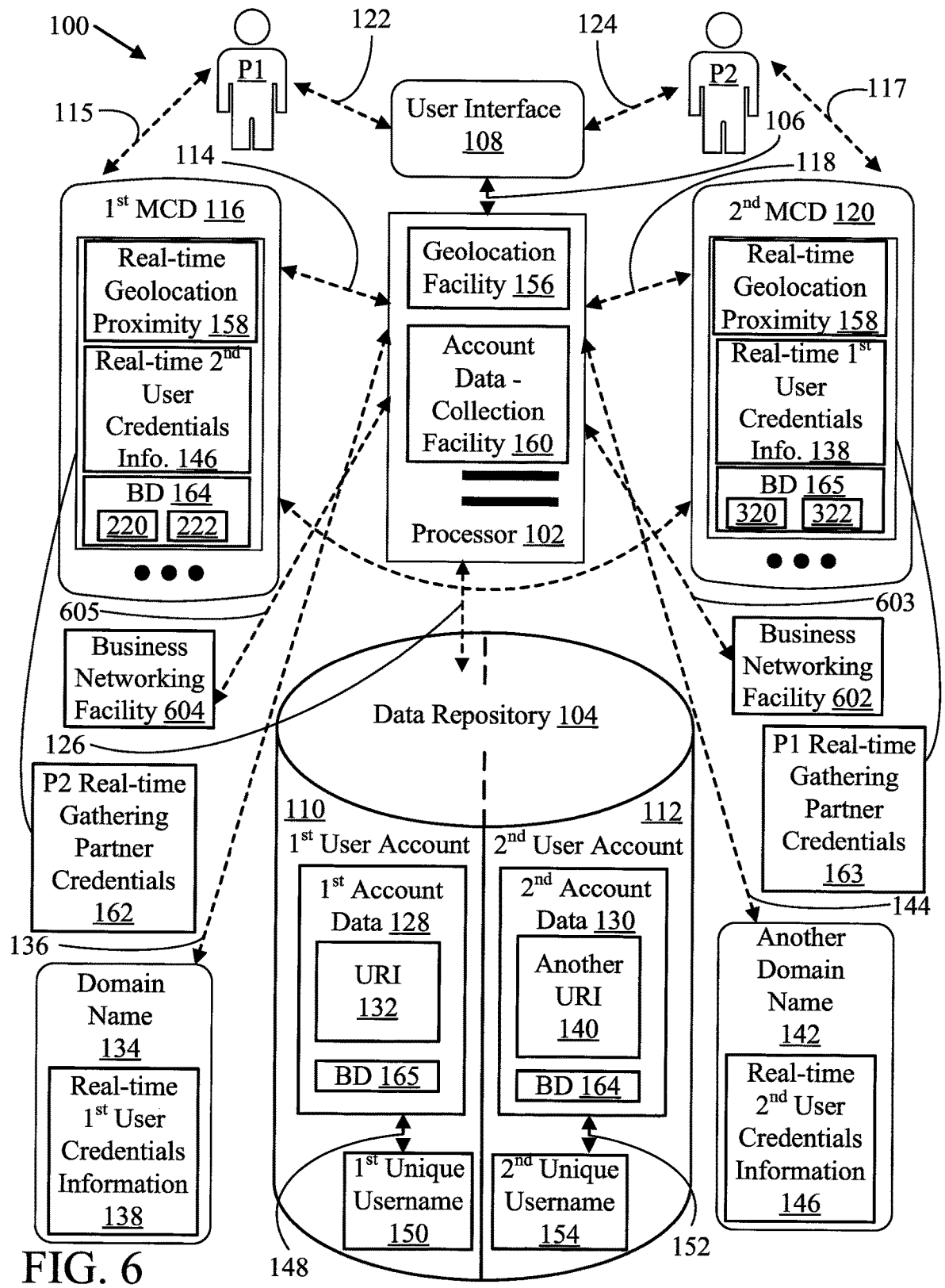
FIG. 6 is a schematic diagram showing a business networking facility that may be included in some of the examples [100] of the implementation of a system for generation of real-time gathering partner credentials.
Figure 7:
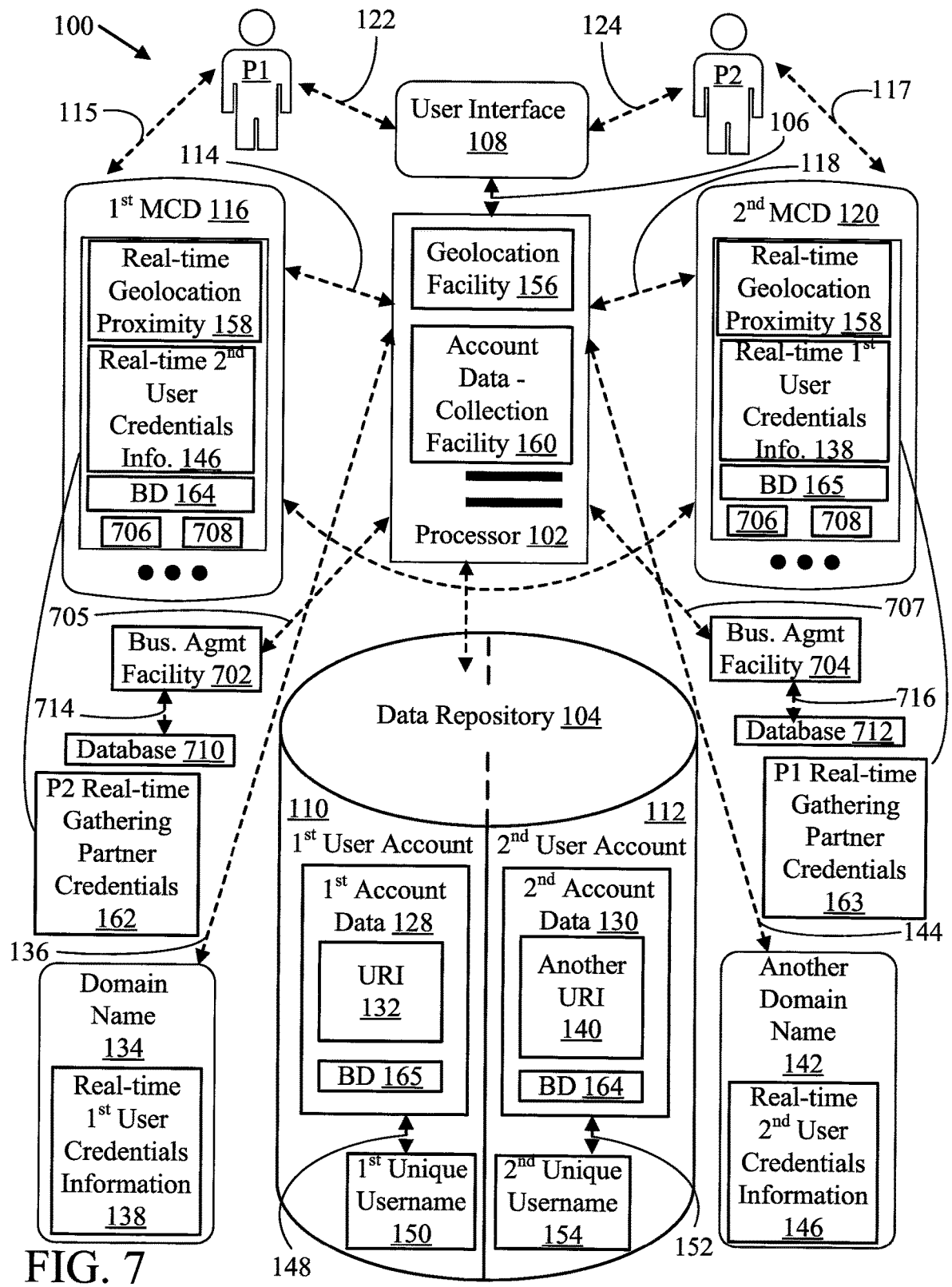
FIG. 7 is a schematic diagram showing a business agreement facility that may be included in some of the examples [100] of the implementation of a system for generation of real-time gathering partner credentials.

FIG. 1 is a schematic diagram showing examples [100] of an implementation of a system for generation of real-time gathering partner credentials. FIG. 2 is another schematic diagram showing features that may be included in some of the examples [100] of the implementation of a system for generation of real-time gathering partner credentials. FIG. 3 is a further schematic diagram showing further features that may be included in some of the examples [100] of the implementation of a system for generation of real-time gathering partner credentials. FIG. 4 is an additional schematic diagram showing additional features that may be included in some of the examples [100] of the implementation of a system for generation of real-time gathering partner credentials, which may include an account data vetting facility. FIG. 5 is yet another schematic diagram showing features that may be included in some of the examples [100] of the implementation of a system for generation of real-time gathering partner credentials, which may include an account data vetting facility. FIG. 6 is a schematic diagram showing a business networking facility that may be included in some of the examples [100] of the implementation of a system for generation of real-time gathering partner credentials. FIG. 7 is a schematic diagram showing a business agreement facility that may be included in some of the examples [100] of the implementation of a system for generation of real-time gathering partner credentials.

It is understood throughout this specification that an example [100] of a system for generation of real-time gathering partner credentials may include any combination of the features that are discussed herein in connection with the examples [100], [800] of systems for generation of real-time gathering partner credentials, or that are discussed herein in connection with the examples [1300] of processes for generation of real-time gathering partner credentials, or that are discussed herein in connection with the examples [1400] of processes for generation of real-time gathering partner credentials. Accordingly, the entireties of the discussions herein of the other examples [800] of systems, and of the examples [1300] and [1400] of the processes, are hereby incorporated in this discussion of the examples [100] of the system for generation of real-time gathering partner credentials.

As shown in FIG. 1, the example [100] of the implementation of the system for generation of real-time gathering partner credentials includes a processor [102] and a data repository [104]. In the example [100] of the system, the processor [102] provides network-based access, as represented by an arrow [106], to a user interface [108]. The user interface [108] in the example [100] of the system is for registering and maintaining a first user account [110] of a first user [P1] and for registering and maintaining a second user account [112] of a second user [P2]. In the example [100] of the system, the processor [102] is in communication as represented by an arrow [114] with a first mobile communication device [116] being in the possession of the first user [P1] as represented by an arrow [115], and is in communication as represented by an arrow [118] with a second mobile communication device [120] being in the possession of the second user [P2] as represented by an arrow [117]. The processor [102] in the example [100] of the system is further for executing processor commands, being represented by an arrow [122], of the first user [P1]; and for executing processor commands, being represented by an arrow [124], of the second user [P2]. In the example [100] of the system, the data repository [104] is coupled as represented by an arrow [126] with the processor [102]. Further in the example [100] of the system, the data repository [104] is for storing first account data [128] of the first user account [110] and for storing second account data [130] of the second user account [112]. In the example [100] of the system, the first account data [128] includes a Uniform Resource Identifier ("URI") [132] of a Domain Name [134] being designated to be accessed as represented by an arrow [136] for dynamic collection of real-time first user credentials information [138]. Further in the example [100] of the system, the second account data [130] includes another URI [140] of another Domain Name [142] being designated to be accessed as represented by an arrow [144] for dynamic collection of real-time second user credentials information [146]. In the example [100] of the system, the first account data [128] is associated as represented by an arrow [148] with a first unique username [150] of the first user [P1], and the second account data [130] is associated as represented by an arrow [152] with a second unique username [154] of the second user [P2]. In the example [100] of the system, the processor [102] also includes a geolocation facility [156] for determining an indication of a real-time geolocation proximity [158] between the first mobile communication device [116] and the second mobile communication device [120]. The processor [102] in the example [100] of the system additionally includes an account data-collection facility [160] being responsive in real-time to a processor command [122] of the first user [P1] for dynamically collecting, as represented by the arrow [144], the real-time second user credentials information [146]. In the example [100] of the system, the processor [102] is also for causing real-time gathering partner credentials [162] of the second user [P2], including the indication of the real-time geolocation proximity [158] and the real-time second user credentials information [146], to be displayed by the first mobile communication device [116].

It is understood throughout this specification that an example [100] of the system may include any quantity of additional users [P3], [P4] . . . . In some examples [100] of the system, the data repository [104] may be coupled with the processor [102] for storing the first account data [128] as including a Uniform Resource Locator ("URL") [132] of an Internet Domain Name [134] being designated to be accessed for dynamic collection of the real-time first user credentials information [138] and the second account data [130] as including another URL [140] of another Internet Domain Name [142] being designated to be accessed for dynamic collection of the real-time second user credentials information [146]. In some examples [100] of the system, the processor [102] may be responsive in real-time to a processor command [122] of the first user [P1] for causing the real-time gathering partner credentials [162] of the second user [P2] to be displayed by the first mobile communication device [116]. In additional examples [100] of the system, the processor [102] as causing the real-time gathering partner credentials [162] of the second user [P2] to be displayed may include causing the indication of the real-time geolocation proximity [158] and the real-time second user credentials information [146] to be displayed as being integrated together by the first mobile communication device [116]. In further examples [100] of the system, the processor [102] as causing the real-time gathering partner credentials [162] of the second user [P2] to be displayed may include: causing a first marker [202] indicating a real-time first geolocation [204] of the first mobile communication device [116] to be displayed at a first position indicated by an arrow [206] on the first mobile communication device [116]; and causing a second marker [208] indicating a real-time second geolocation [210] of the second mobile communication device [120] to be displayed at a second position indicated by an arrow [212] on the first mobile communication device [116]. In some of those further examples [100] of the system, the processor [102] as causing the indication of the real-time geolocation proximity [158] to be displayed may include: causing the first marker [202] indicating the real-time first geolocation [204] to be displayed at the first position [206] on the first mobile communication device [116]; and causing the second marker [208] indicating the real-time second geolocation [210] to be displayed at the second position [212] on the first mobile communication device [116]. In others of those further examples [100] of the system, the processor [102] as causing the second marker [208] indicating the real-time second geolocation [210] of the second mobile communication device [120] to be displayed at the second position [212] on the first mobile communication device [116] may include causing the real-time second user credentials information [146] to be displayed at the second position [212]. In some examples [100] of the system, the processor [102] may be responsive to a processor command [122] of the first user [P1] causing the real-time second user credentials information [146] or the real-time gathering partner credentials [162] of the second user [P2] to be blocked from being displayed by the first mobile communication device [116] unless the second account data [130] include a specific another URI [140] of a specific another Domain Name [142] being designated in a processor command [122] of the first user [P1]. In additional examples [100] of the system, the processor [102] causing the real-time gathering partner credentials [162] of the second user [P2] to be displayed by the first mobile communication device [116] may be subject to prior authorization by a processor command [124] of the second user [P2]. In further examples [100] of the system, the processor [102] causing the indication of the real-time geolocation proximity [158] to be displayed by the first mobile communication device [116] may be subject to prior authorization by a processor command [124] of the second user [P2]. In some examples [100] of the system, the processor [102] may include the geolocation facility [156] as tracking a real-time second geolocation [210] of the second mobile communication device [120]. Further in those examples [100] of the system, the geolocation facility [156] as tracking the real-time second geolocation [210] of the second mobile communication device [120] may be subject to prior authorization by a processor command [124] of the second user [P2].

In additional examples [100] of the system, the account data-collection facility [160] being responsive to the processor command [122] of the first user [P1] for the dynamically collecting, as represented by the arrow [144], the real-time second user credentials information [146], may be subject to prior authorization by a processor command [124] of the second user [P2]. In some of those additional examples [100] of the system, the account data-collection facility [160] as being subject to such prior authorization by the processor command [124] of the second user [P2] may enable the second user [P2] to select a tier [214] of the real-time second user credentials information [146] to be displayed on the second mobile communication device [120] for selection by the second user [P2] from a selectable plurality of tiers [214], [216], [218] of the real-time second user credentials information [146]. In some of the additional examples [100] of the system, the real-time second user credentials information [146] may include the tier [216] as including more information than may be included in the tier [214]; and, for example, the real-time second user credentials information [146] may further include the tier [218] as including more information than may be included in the tier [216].

In further examples [100] of the system, the processor [102] may further be for executing processor commands [124] of the second user [P2] for registering and maintaining the second user account [112] with the second account data [130] as including a business description [164] of the second user [P2]. In some of those further examples [100] of the system, the processor [102] as causing the real-time gathering partner credentials [162] of the second user [P2] to be displayed may include causing the business description [164] of the second user [P2] to be displayed by the first mobile communication device [116]. Also in some of those further examples [100] of the system, the processor [102] may be for executing the processor commands [124] for registering and maintaining the second user account [112] with the business description [164] of the second user [P2] as including a business description element [220], [222] being selected from a pre-defined listing of selectable business description elements [220], [222], displayed for selection by the second user [P2] on the second mobile communication device [120]. In examples [100] of the system, the processor [102] may be for executing the processor commands [124] for registering and maintaining the second user account [112] with the pre-defined listing of selectable business description elements [220], [222], as including (not shown) business sectors, knowledge bases, skills, business interests, professions, or business goals. As further examples [100] of the system, the processor [102] may be for executing the processor commands [124] for registering and maintaining the second user account [112] with the business description [164] of the second user [P2] as including a rating [224] by the second user [P2] as to their level of experience or interest in the selected business description element [220], [222]. In some examples [100] of the system, the rating [224] by the second user [P2] as to their level of experience or interest in the selected business description element [220], [222], may be expressed as a numerical or alphabetical rating "X" on a corresponding numerical or alphabetical scale.

In examples [100] of the system, the geolocation facility [156] may be responsive to a processor command [122] of the first user [P1] for causing the indication of the real-time geolocation proximity [158] between the first and second mobile communication devices [116], [120] to be displayed by the first mobile communication device [116]. Further in those examples [100] of the system, the geolocation facility [156] may be responsive to the processor command [100] of the first user [P1] as causing the indication of the real-time geolocation proximity [158] to be displayed subject to the first and second mobile communication devices [116], [120] as being within a limited maximum proximity distance being represented by an arrow [226]. In some examples [100] of the system, the geolocation facility [156] may be for causing the second unique username [154] of the second user [P2] to be displayed by the first mobile communication device [116] as being included in the indication of the real-time geolocation proximity [158]. Further in those examples [100] of the system, the geolocation facility [156] may additionally be for causing the second unique username [154] and the business description [164] of the second user [P2] to be displayed by the first mobile communication device [116] as being included in the indication of the real-time geolocation proximity [158]. In additional examples [100] of the system, the processor [102] may be responsive to a processor command [122] of the first user [P1] as causing the indication of the real-time geolocation proximity [158] to be displayed as being integrated together with, as examples: the business description [164] of the second user [P2]; or the business description element [220], [222] of the second user [P2]; or the business description element [220], [222] of the second user [P2] accompanied by the rating [224] by the second user [P2]. Further in those examples [100] of the system, the processor [102] may be responsive to a processor command [122] of the first user [P1] for dynamically collecting, as represented by the arrow [144], either the real-time second user credentials information [146], or the indication of the real-time geolocation proximity [158], which may as examples be displayed as being integrated together with the business description [164] of the second user [P2], the business description element [220], [222] of the second user [P2], and/or the rating [224] by the second user [P2]. Further in those examples [100] of the system, the processor [102] may be responsive in real-time to a processor command [122] of the first user [P1] for causing to be displayed by the first mobile communication device [116], prior to the causing the real-time gathering partner credentials [162] of the second user [P2] to be displayed, the indication of the real-time geolocation proximity [158] integrated with the business description [164] of the second user [P2], the business description element [220], [222] of the second user [P2], and/or the rating [224] by the second user [P2]. Additionally in those examples [100] of the system, the geolocation facility [156] may be responsive to a processor command [122] of the first user [P1] for causing the indication of the real-time geolocation proximity [158] to be displayed by the first mobile communication device [116] in a text format or in a map format. Also in those examples [100] of the system, the geolocation facility [156] may be responsive to a processor command [122] of the first user [P1] for causing the indication of the real-time geolocation proximity [158] to be periodically updated and displayed by the first mobile communication device [116]. In examples [100] of the system, the processor [102] may be responsive to a processor command [122] of the first user [P1] for establishing direct two-way communications, being represented by a dashed arrow [172], between the first and second mobile communication devices [116], [120]. In some of those examples [100] of the system, the being responsive of the processor [102] to the processor command [122] of the first user [P1] for establishing the direct two-way communications between the first and second mobile communication devices [116], [120] may be subject to prior authorization by a processor command [124] from the second user [P2].

In some examples [100] of the system, the processor [102] may include the account data-collection facility [160] as being responsive in real-time to a processor command [124] of the second user [P2] for dynamically collecting, as represented by the arrow [136], the real-time first user credentials information [138]. Further in those examples [100], the processor [102] may be for causing real-time gathering partner credentials [163] of the first user [P1], including the indication of the real-time geolocation proximity [158] and the real-time first user credentials information [138], to be displayed by the second mobile communication device [120]. In some examples [100] of the system, the processor [102] may be responsive in real-time to a processor command [124] of the second user [P2] for causing the real-time gathering partner credentials [163] of the first user [P1] to be displayed by the second mobile communication device [120]. In some examples [100] of the system, the processor [102] as causing the real-time gathering partner credentials [163] of the first user [P1] to be displayed may include causing the indication of the real-time geolocation proximity [158] and the real-time first user credentials information [138] to be displayed as being integrated together by the second mobile communication device [120]. In further examples [100] of the system, the processor [102] as causing the real-time gathering partner credentials [163] of the first user [P1] to be displayed may include: causing a second marker [308] indicating a real-time second geolocation [310] of the second mobile communication device [120] to be displayed at a second position indicated by an arrow [312] on the second mobile communication device [120]; and may further include causing a first marker [302] indicating a real-time first geolocation [304] of the first mobile communication device [116] to be displayed at a first position indicated by an arrow [306] on the second mobile communication device [120]. In some of those further examples [100] of the system, the processor [102] as causing the indication of the real-time geolocation proximity [158] to be displayed may include causing the first marker [302] indicating the real-time first geolocation [304] to be displayed at the first position [306] on the second mobile communication device [120], and may further include causing the second marker [308] indicating the real-time second geolocation [310] to be displayed at the second position [312] on the second mobile communication device [120]. In others of those further examples [100] of the system, the processor [102] as causing the second marker [308] indicating the real-time second geolocation [310] of the second mobile communication device [120] to be displayed at the second position [312] on the second mobile communication device [120] may include causing the real-time first user credentials information [138] to be displayed at the first position [306]. In some examples [100] of the system, the processor [102] may be responsive to a processor command [124] of the second user [P2] causing the real-time first user credentials information [138] or the real-time gathering partner credentials [163] of the first user [P1] to be blocked from being displayed by the second mobile communication device [120] unless the first account data [128] include a specific URI [132] of a specific Domain Name [134] being designated in a processor command [124] of the second user [P2]. In additional examples [100] of the system, the processor [102] causing the real-time gathering partner credentials [163] of the first user [P1] to be displayed by the second mobile communication device [120] may be subject to prior authorization by a processor command [122] of the first user [P1]. In further examples [100] of the system, the processor [102] causing the indication of the real-time geolocation proximity [158] to be displayed by the second mobile communication device [120] may be subject to prior authorization by a processor command [122] of the first user [P1]. In some examples [100] of the system, the processor [102] may include the geolocation facility [156] as tracking a real-time first geolocation [304] of the first mobile communication device [116]. Further in those examples [100] of the system, the geolocation facility [156] as tracking the real-time first geolocation [304] of the first mobile communication device [116] may be subject to prior authorization by a processor command [122] of the first user [P1].

In additional examples [100] of the system, the account data-collection facility [160] being responsive to the processor command [124] of the second user [P2] for the dynamically collecting, as represented by the arrow [136], the real-time first user credentials information [138], may be subject to prior authorization by a processor command [122] of the first user [P1]. In some of those additional examples [100] of the system, the account data-collection facility [160] as being subject to such prior authorization by the processor command [122] of the first user [P1] may enable the first user [P1] to select a tier [314] of the real-time first user credentials information [138] to be displayed on the first mobile communication device [116] for selection by the first user [P1] from a selectable plurality of tiers [314], [316], [318] of the real-time first user credentials information [138]. In some of the additional examples [100] of the system, the real-time first user credentials information [138] may include the tier [316] as including more information than may be included in the tier [314]; and, for example, the real-time first user credentials information [138] may further include the tier [318] as including more information than may be included in the tier [316].

In further examples [100] of the system, the processor [102] may further be for executing processor commands [122] of the first user [P1] for registering and maintaining the first user account [110] with the first account data [128] as including a business description [165] of the first user [P1]. In some of those further examples [100] of the system, the processor [102] as causing the real-time gathering partner credentials [163] of the first user [P1] to be displayed may include causing the business description [165] of the first user [P1] to be displayed by the second mobile communication device [120]. Also in some of those further examples [100] of the system, the processor [102] may be for executing the processor commands [122] for registering and maintaining the first user account [110] with the business description [165] of the first user [P1] as including a business description element [320], [322] being selected from a pre-defined listing of selectable business description elements [320], [322], displayed for selection by the first user [P1] on the first mobile communication device [116]. In examples [100] of the system, the processor [102] may be for executing the processor commands [122] for registering and maintaining the first user account [110] with the pre-defined listing of selectable business description elements [320], [322], as including (not shown) business sectors, knowledge bases, skills, business interests, professions, or business goals. As further examples [100] of the system, the processor [102] may be for executing the processor commands [122] for registering and maintaining the first user account [110] with the business description [165] of the first user [P1] as including a rating [324] by the first user [P1] as to their level of experience or interest in the selected business description element [320], [322]. For example, the rating [324] by the first user [P1] as to their level of experience or interest in the selected business description element [320], [322], may be expressed as a numerical or alphabetical rating "X" on a corresponding numerical or alphabetical scale.

In examples [100] of the system, the geolocation facility [156] may be responsive to a processor command [124] of the second user [P2] for causing the indication of the real-time geolocation proximity [158] between the first and first mobile communication devices [116], [120] to be displayed by the second mobile communication device [120]. Further in those examples [100] of the system, the geolocation facility [156] may be responsive to the processor command [124] of the second user [P2] as causing the indication of the real-time geolocation proximity [158] to be displayed subject to the first and second mobile communication devices [116], [120] as being within a limited maximum proximity distance being represented by an arrow [326]. In some examples [100] of the system, the geolocation facility [156] may be for causing the first unique username [150] of the first user [P1] to be displayed by the second mobile communication device [120] as being included in the indication of the real-time geolocation proximity [158]. Further in those examples [100] of the system, the geolocation facility [156] may additionally be for causing the first unique username [150] and the business description [165] of the first user [P1] to be displayed by the second mobile communication device [120] as being included in the indication of the real-time geolocation proximity [158]. In additional examples [100] of the system, the processor [102] may be responsive to a processor command [124] of the second user [P2] as causing the indication of the real-time geolocation proximity [158] to be displayed as being integrated together with, as examples: the business description [165] of the first user [P1]; or the business description element [320], [322] of the first user [P1]; or the business description element [320], [322] of the first user [P1] accompanied by the rating [324] by the first user [P1]. Further in those examples [100] of the system, the processor [102] may be responsive to a processor command [124] of the second user [P2] for dynamically collecting, as represented by the arrow [136], either the real-time first user credentials information [138], or the indication of the real-time geolocation proximity [158] which may as examples be displayed as being integrated together with the business description [165] of the first user [P1], the business description element [320], [322] of the first user [P1], and/or the rating [324] by the first user [P1]. Further in those examples [100] of the system, the processor [102] may be responsive in real-time to a processor command [124] of the second user [P2] for causing to be displayed by the second mobile communication device [120], prior to the causing the real-time gathering partner credentials [163] of the first user [P1] to be displayed, the indication of the real-time geolocation proximity [158] integrated with the business description [165] of the first user [P1], the business description element [320], [322] of the first user [P1], and/or the rating [324] by the first user [P1]. Additionally in those examples [100] of the system, the geolocation facility [156] may be responsive to a processor command [124] of the second user [P2] for causing the indication of the real-time geolocation proximity [158] to be displayed by the second mobile communication device [120] in a text format or in a map format. Also in those examples [100] of the system, the geolocation facility [156] may be responsive to a processor command [124] of the second user [P2] for causing the indication of the real-time geolocation proximity [158] to be periodically updated and displayed by the second mobile communication device [120]. In examples [100] of the system, the processor [102] may be responsive to a processor command [124] of the second user [P2] for establishing direct two-way communications, being represented by the dashed arrow [172], between the first and second mobile communication devices [116], [120]. In some of those examples [100] of the system, the being responsive of the processor [102] to the processor command [124] of the second user [P2] for establishing the direct two-way communications between the first and second mobile communication devices [116], [120] may be subject to prior authorization by a processor command [122] from the first user [P1].

In some examples [100] of the system, the processor [102] may be responsive to a processor command [124] of the second user [P2] for selection of the another URI [140] of the another Domain Name [142]. In additional examples [100] of the system, the processor [102] may be responsive to a processor command [124] of the second user [P2] for designating the another URI [140] of the another Domain Name [142] as being confidential. Also in those additional examples [100] of the system, the processor [102] may be responsive to a processor command [124] by the second user [P2] for causing access to real-time second user credentials information [146] posted at the confidential another URI [140] of the another Domain Name [142] to be subject to prior authorization by a processor command [124] of the second user [P2].

In further examples [100] of the system, the processor [102] may include an account data vetting facility [402] for performing a validation of the real-time second user credentials information [146]. As examples [100] of the system, the processor [102] may be coupled with the account data vetting facility [402] as represented by an arrow [403]. In some of those further examples [100] of the system, the processor [102] may require the second account data [130] to include an additional URI [404] of an additional Domain Name [406] as being designated to be accessed as represented by an arrow [408] for the dynamic collection of additional real-time second user credentials information [410]. Further in those examples [100] of the system, the processor [102] may require the second account data [130] to include both the another URI [140] of the another Domain Name [142] and the additional URI [404] of the additional Domain Name [406] as being designated for the dynamic collection of the real-time second user credentials information [146], [410]. In other examples [100] of the system, the processor [102] may require the another URI [140] of the another Domain Name [142] being designated for the dynamic collection of the real-time second user credentials information [146] to be another URI [140] of a third-party-controlled another Domain Name [142]. Further in those other examples [100] of the system, the processor [102] may require the second account data [130] to include a plurality of URIs [140], [404] of third-party-controlled Domain Names [142], [406] being selected from a pre-defined listing of selectable URIs [140], [404] of Domain Names [142], [406] as being displayed for selection by the second user [P2] on the second mobile communication device [120]. In additional examples [100] of the system, the processor [102] may be for blocking the second account data [130] from including any URI [140], [404] of a Domain Name [142], [406] matching a pre-defined listing of excluded URIs of Domain Names. Also in those further examples [100] of the system, the processor [102] may include the account data vetting facility [402] as additionally being for comparing the real-time second user credentials information [146] posted at the another Domain Name [142] with additional real-time second user credentials information [410] posted at the additional Domain Name [406]. In some of the further examples [100] of the system, the processor [102] may include the account data vetting facility [402] as being for periodically collecting, and generating a historical record [412] of, the real-time second user credentials information [146] posted at the designated another Domain Name [142]; and for comparing the historical record [412] with the real-time second user credentials information [146] being collected in real-time. As examples [100] of the system, the account data vetting facility [402] may be coupled with the historical record [412] as represented by an arrow [411]. In examples [100] of the system, the historical record [412] of the real-time second user credentials information [146] may be stored by the data repository [104] as being included in the second account data [130] of the second user account [112]. In other examples [100] of the system, the processor [102] may include the account data vetting facility [402] as being for performing a validation of the second account data [130]. In some of those other examples [100] of the system, the processor [102] may include the account data vetting facility [402] as being for performing a validation of the another URI [140] of the another Domain Name [142] being designated for dynamic collection of the real-time second user credentials information [146]. As examples [100] of the system, the processor [102] may include the account data vetting facility [402] as being for comparing, with a roster [414] of legitimate URIs [416], [418] of Domain Names, the another URI [140] of the another Domain Name [142] being designated for dynamic collection of the real-time second user credentials information [146]. In examples [100] of the system, the account data vetting facility [402] may be coupled with the roster [414] as represented by an arrow [413].

In some examples [100] of the system, the processor [102] may be responsive to a processor command [122] of the first user [P1] for selection of the URI [132] of the Domain Name [134]. In additional examples [100] of the system, the processor [102] may be responsive to a processor command [122] of the first user [P1] for designating the URI [132] of the Domain Name [134] as being confidential. Also in those additional examples [100] of the system, the processor [102] may be responsive to a processor command [122] by the first user [P1] for causing access to real-time first user credentials information [138] posted at the confidential URI [132] of the Domain Name [134] to be subject to prior authorization by a processor command [122] of the first user [P1].

In further examples [100] of the system, the processor [102] may include an account data vetting facility [502] for performing a validation of the real-time first user credentials information [138]. As examples [100] of the system, the processor [102] may be coupled with the account data vetting facility [502] as represented by an arrow [503]. Some of those examples [100] of the system may also include the account data vetting facility [402] for performing the validation of the real-time second user credentials information [146]; and in those examples [100], the account data vetting facilities [402], [502] may either be separate facilities or integrated together. In some of those further examples [100] of the system, the processor [102] may require the first account data [128] to include a further URI [504] of a further Domain Name [506] as being designated to be accessed as represented by an arrow [508] for the dynamic collection of further real-time first user credentials information [510]. Further in those examples [100] of the system, the processor [102] may require the first account data [128] to include both the URI [132] of the Domain Name [134] and the further URI [504] of the further Domain Name [506] as being designated for the dynamic collection of the real-time first user credentials information [138], [510]. In other examples [100] of the system, the processor [102] may require the URI [132] of the Domain Name [134] being designated for the dynamic collection of the real-time first user credentials information [138] to be a URI [132] of a third-party-controlled Domain Name [134]. Further in those other examples [100] of the system, the processor [102] may require the first account data [128] to include a plurality of URIs [132], [504] of third-party-controlled Domain Names [134], [506] being selected from a pre-defined listing of selectable URIs [132], [504] of Domain Names [134], [506] as being displayed for selection by the first user [P1] on the first mobile communication device [116]. In additional examples [100] of the system, the processor [102] may be for blocking the first account data [128] from including any URI [132], [504] of a Domain Name [134], [506] matching a pre-defined listing of excluded URIs of Domain Names. Also in those further examples [100] of the system, the processor [102] may include the account data vetting facility [502] as additionally being for comparing the real-time first user credentials information [138] posted at the Domain Name [134] with further real-time first user credentials information [510] posted at the further Domain Name [506]. In some of the further examples [100] of the system, the processor [102] may include the account data vetting facility [502] as being for periodically collecting, and generating a historical record [512] of, the real-time first user credentials information [138] posted at the designated Domain Name [134]; and for comparing the historical record [512] with the real-time first user credentials information [138] being collected in real-time. As examples [100] of the system, the account data vetting facility [502] may be coupled with the historical record [512] as represented by an arrow [511]. In examples [100] of the system, the historical record [512] of the real-time first user credentials information [138] may be stored by the data repository [104] as being included in the first account data [128] of the first user account [110]. In other examples [100] of the system, the processor [102] may include the account data vetting facility [502] as being for performing a validation of the first account data [128]. In some of those other examples [100] of the system, the processor [102] may include the account data vetting facility [502] as being for performing a validation of the URI [132] of the Domain Name [134] being designated for dynamic collection of the real-time first user credentials information [138]. As examples [100] of the system, the processor [102] may include the account data vetting facility [502] as being for comparing, with a roster [514] of legitimate URIs [516], [518] of Domain Names, the URI [132] of the Domain Name [134] being designated for dynamic collection of the real-time first user credentials information [138]. In examples [100] of the system, the account data vetting facility [502] may be coupled with the roster [514] as represented by an arrow [513].

In some examples [100] of the system, the processor [102] may include a business networking facility [602] being responsive to a processor command [122] of the first user [P1] for causing the business description [165] of the first user [P1] to be displayed by the second mobile communication device [120]. In those examples [100] of the system, the processor [102] may, for example, be coupled with the business networking facility [602] as represented by an arrow [603]. Further in those examples [100] of the system, the business networking facility [602] may be for causing the business description [165] of the first user [P1] to include the business description element [320], [322], being selected from the pre-defined listing of selectable business description elements [320], [322], as being displayed for selection by the first user [P1] on the first mobile communication device [116]. Additionally in those examples [100] of the system, the business networking facility [602] may be for causing the business description [165] of the first user [P1] to be displayed with the pre-defined listing of selectable business description elements [320], [322], as including business sectors, knowledge bases, skills, business interests, professions, or business goals. Also in those additional examples [100] of the system, the business networking facility [602] may be responsive to a processor command [122] by the first user [P1] for making subject to prior authorization, by another processor command [122] by the first user [P1], the causing the business description [165] of the first user [P1] to be displayed by the second mobile communication device [120].

In further examples [100] of the system, the processor [102] may include another business networking facility [604] being responsive to a processor command [124] of the second user [P2] for causing the business description [164] of the second user [P2] to be displayed by the first mobile communication device [116]. In those examples [100] of the system, the processor [102] may, for example, be coupled with the business networking facility [604] as represented by an arrow [605]. In other examples [100] of the system (not shown), the business networking facility [602] and the business networking facility [604] may be integrated together. Also in the further examples [100] of the system, the business networking facility [604] may be for causing the business description [164] of the second user [P2] to include the business description element [220], [222], being selected from the pre-defined listing of selectable business description elements [220], [222], as being displayed for selection by the second user [P2] on the second mobile communication device [120]. Additionally in those examples [100] of the system, the business networking facility [604] may be for causing the business description [164] of the second user [P2] to be displayed with the pre-defined listing of selectable business description elements [220], [222], as including business sectors, knowledge bases, skills, business interests, professions, or business goals. Also in those additional examples [100] of the system, the business networking facility [604] may be responsive to a processor command [124] by the second user [P2] for making subject to prior authorization, by another processor command [124] by the second user [P2], the causing the business description [164] of the second user [P2] to be displayed by the first mobile communication device [116].

In additional examples [100] of the system, the processor [102] may include a business agreement facility [702] (also referred to herein as a "Bus. Agmt Facility") being responsive to a processor command [122] of the first user [P1] for causing a business agreement form [706] for execution by the second user [P2] to be displayed by the second mobile communication device [120]. In some of those examples [100] of the system, the processor [102] may be coupled with the business agreement facility [702] as represented by an arrow [705]. In some of the additional examples [100] of the system, the business agreement facility [702] may be for causing the business agreement form [706] to be displayed by the first mobile communication device [116] upon execution by the second user [P2]. In some of the additional examples [100] of the system, the business agreement facility [702] may also be for storing the business agreement form [706] in the first account data [128] upon execution by the second user [P2]. Additionally, in some of the additional examples [100] of the system, the business agreement facility [702] may also be for storing the business agreement form [706] in the second account data [130] upon execution by the second user [P2]. Also in some of the additional examples [100] of the system, the business agreement facility [702] may also be for obtaining the business agreement form [706] from a business agreement forms database [710].

Further in some of the additional examples [100] of the system, the business agreement forms database [710] may be coupled as represented by an arrow [714] with the business agreement facility [702]. In some of the additional examples [100] of the system, the business agreement forms database [710] may include (not shown): a partnership agreement form; or a non-disclosure agreement form; or a joint development agreement form; or a non-binding letter-of-intent agreement form; or a commercial purchase agreement form; or a consulting agreement form.

In additional examples [100] of the system, the processor [102] may include a business agreement facility [704] (also referred to herein as a "Bus. Agmt Facility") being responsive to a processor command [124] of the second user [P2] for causing a business agreement form [708] for execution by the first user [P1] to be displayed by the first mobile communication device [116]. In some of those examples [100] of the system, the processor [102] may be coupled with the business agreement facility [704] as represented by an arrow [707]. In other examples [100] of the system (not shown), the business agreement facility [702] and the business agreement facility [704] may be integrated together. In some of the additional examples [100] of the system, the business agreement facility [704] may be for causing the business agreement form [708] to be displayed by the second mobile communication device [120] upon execution by the first user [P1]. In some of the additional examples [100] of the system, the business agreement facility [704] may also be for storing the business agreement form [708] in the second account data [130] upon execution by the first user [P1]. Additionally, in some of the additional examples [100] of the system, the business agreement facility [704] may also be for storing the business agreement form [708] in the first account data [128] upon execution by the first user [P1]. Also in some of the additional examples [100] of the system, the business agreement facility [704] may also be for obtaining the business agreement form [708] from a business agreement forms database [712]. In other examples [100] of the system (not shown), the business agreement forms database [710] and the business agreement forms database [712] may be integrated together. Further in some of the additional examples [100] of the system, the business agreement forms database [712] may be coupled as represented by an arrow [716] with the business agreement facility [704]. In some of the additional examples [100] of the system, the business agreement forms database [712] may include (not shown): a partnership agreement form; or a non-disclosure agreement form; or a joint development agreement form; or a non-binding letter-of-intent agreement form; or a commercial purchase agreement form; or a consulting agreement form.

Figure 8:
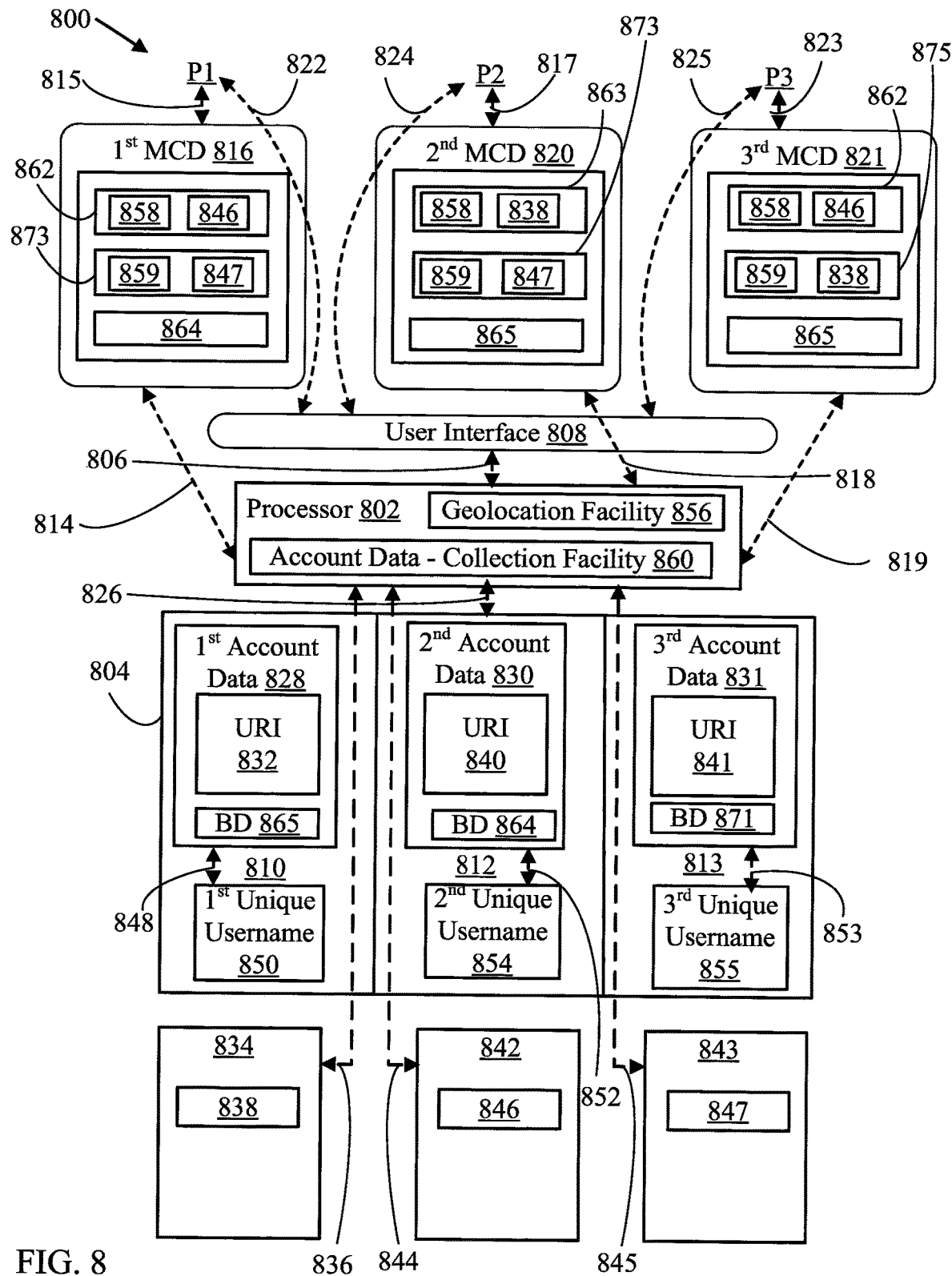
FIG. 8 is a schematic diagram showing examples [800] of another implementation of a system for generation of real-time gathering partner credentials.
Figure 9:
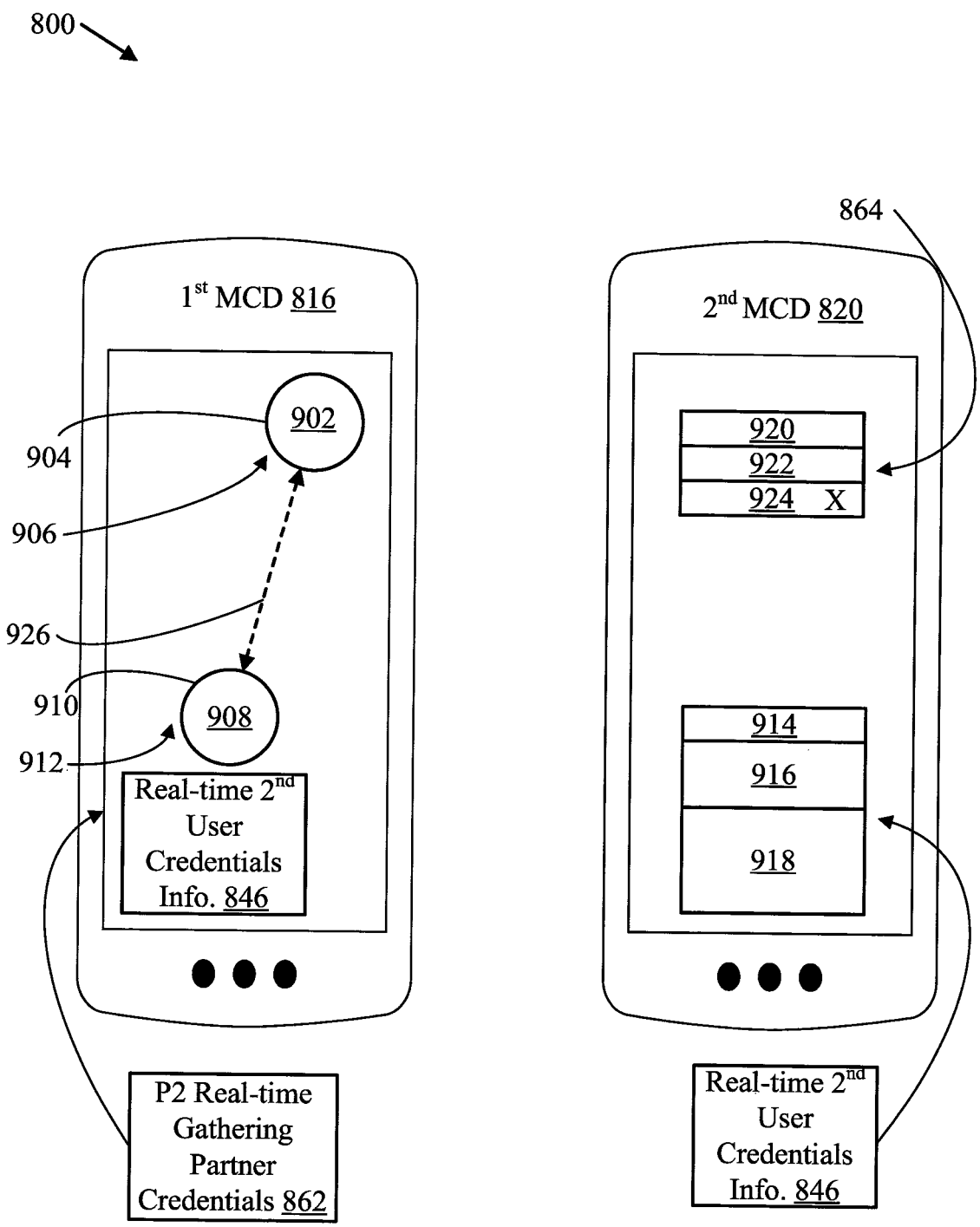
FIG. 9 is another schematic diagram showing features that may be included in some of the examples [800] of the another implementation of a system for generation of real-time gathering partner credentials.
Figure 10:
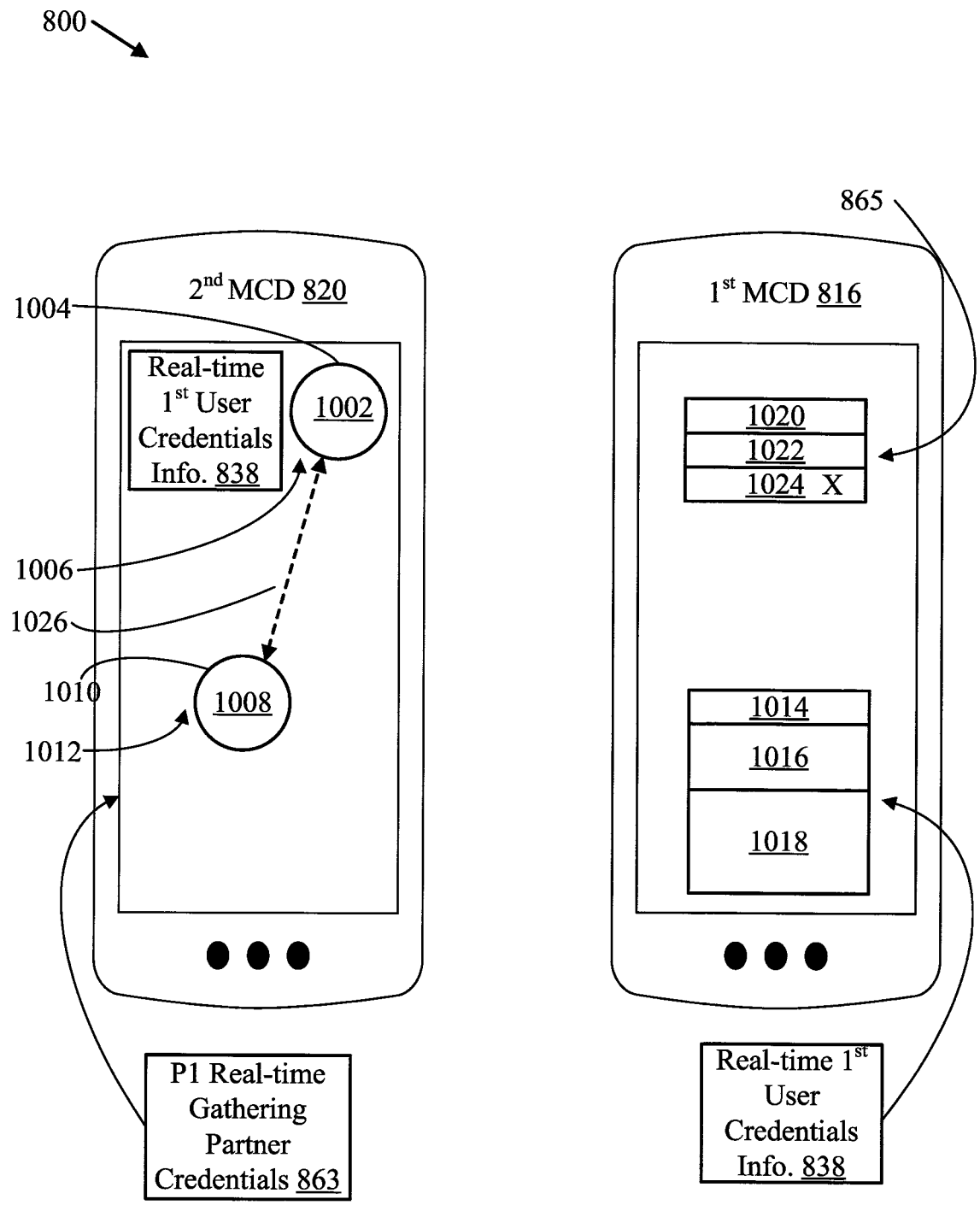
FIG. 10 is a further schematic diagram showing further features that may be included in some of the examples [800] of the another implementation of a system for generation of real-time gathering partner credentials.
Figure 11:
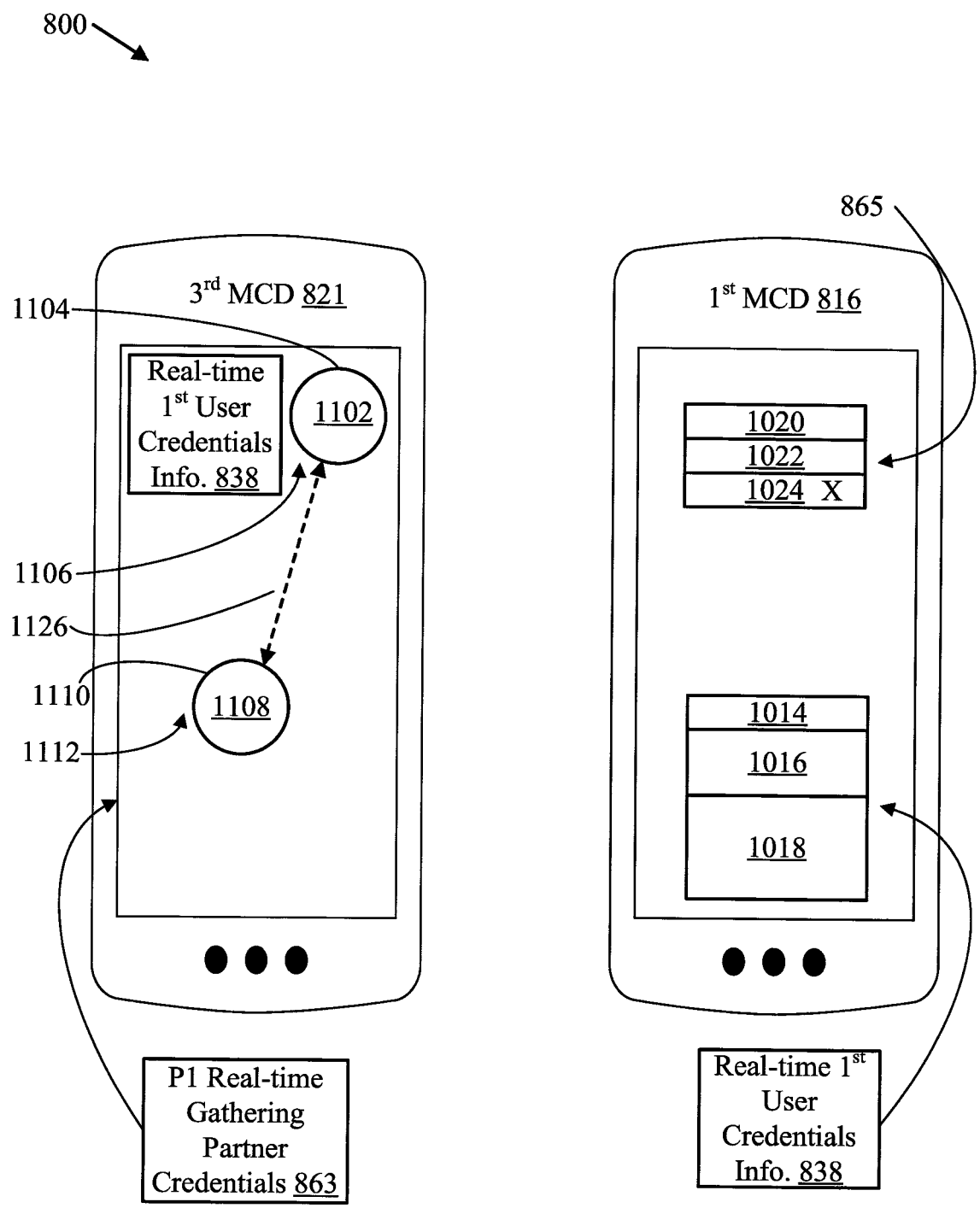
FIG. 11 is an additional schematic diagram showing additional features that may be included in some of the examples [800] of the another implementation of a system for generation of real-time gathering partner credentials.
Figure 12:
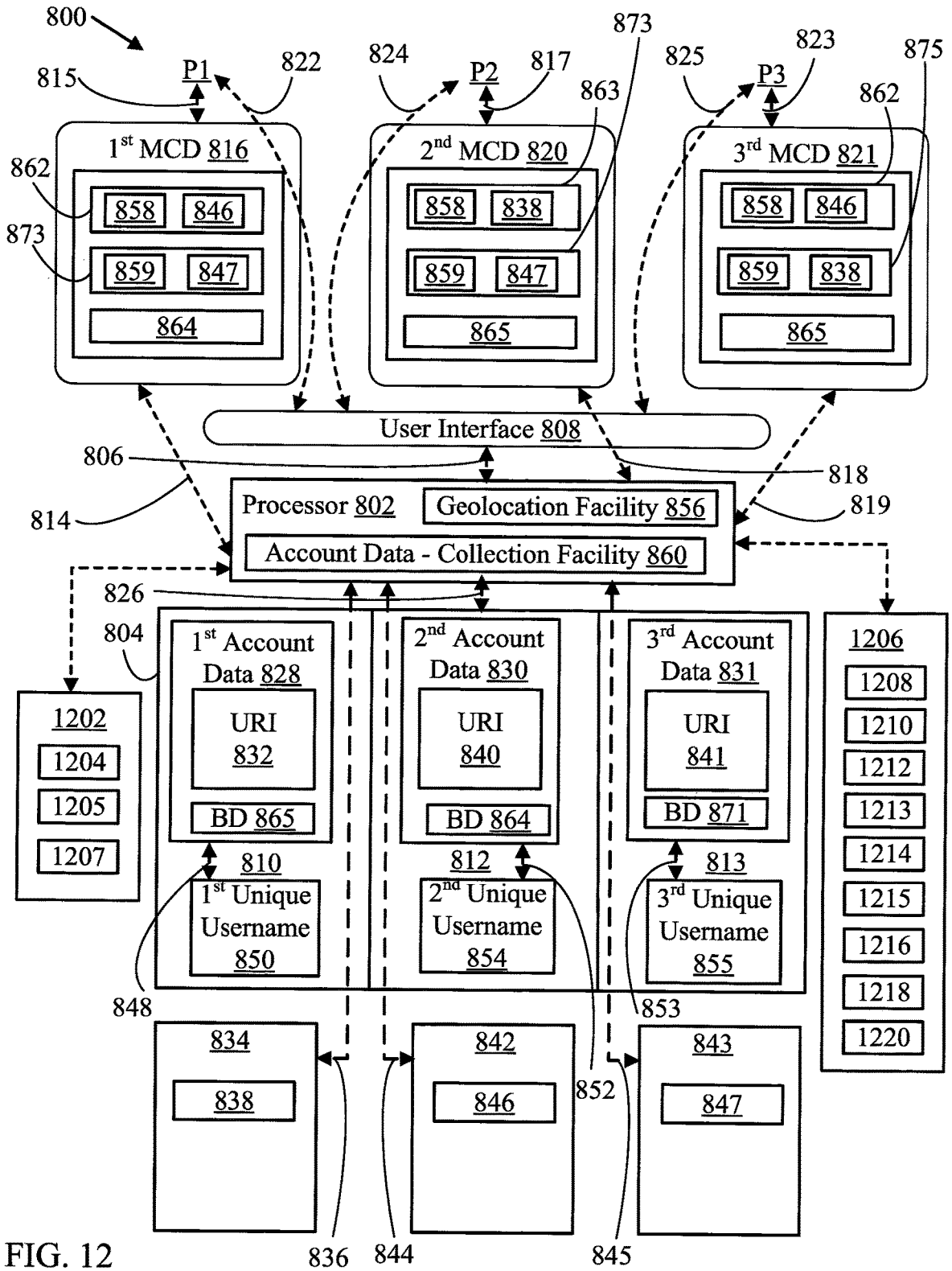
FIG. 12 is a schematic diagram showing features of a business meeting arrangement and referral facility that may be included in some of the examples [800] of the another implementation of a system for generation of real-time gathering partner credentials.

FIG. 8 is a schematic diagram showing examples [800] of another implementation of a system for generation of real-time gathering partner credentials. FIG. 9 is another schematic diagram showing features that may be included in some of the examples [800] of the another implementation of a system for generation of real-time gathering partner credentials. FIG. 10 is a further schematic diagram showing further features that may be included in some of the examples [800] of the another implementation of a system for generation of real-time gathering partner credentials. FIG. 11 is an additional schematic diagram showing additional features that may be included in some of the examples [800] of the another implementation of a system for generation of real-time gathering partner credentials. FIG. 12 is a schematic diagram showing features of a business meeting arrangement and referral facility that may be included in some of the examples [800] of the another implementation of a system for generation of real-time gathering partner credentials.

It is understood throughout this specification that an example [800] of a system for generation of real-time gathering partner credentials may include any combination of the features that are discussed herein in connection with the examples [100], [800] of systems for generation of real-time gathering partner credentials, or that are discussed herein in connection with the examples [1300] of processes for generation of real-time gathering partner credentials, or that are discussed herein in connection with the examples [1400] of processes for generation of real-time gathering partner credentials. Accordingly, the entireties of the discussions herein of the other examples [100] of systems, and of the examples [1300] and [1400] of the processes, are hereby incorporated in this discussion of the examples [800] of the system for generation of real-time gathering partner credentials.

As shown in FIG. 8, the example [800] of the implementation of the system for generation of real-time gathering partner credentials includes a processor [802] and a data repository [804]. In the example [800] of the system, the processor [802] provides network-based access, as represented by an arrow [806], to a user interface [808]. The user interface [808] in the example [800] of the system is for registering and maintaining a first user account [810] of a first user [P1], and for registering and maintaining a second user account [812] of a second user [P2], and for registering and maintaining a third user account [813] of a third user [P3]. In the example [800] of the system, the processor [802] is in communication as represented by an arrow [814] with a first mobile communication device [816] being in the possession of the first user [P1] as represented by an arrow [815], and in communication as represented by an arrow [818] with a second mobile communication device [820] being in the possession of the second user [P2] as represented by an arrow [817], and in communication as represented by an arrow [819] with a third mobile communication device [821] being in the possession of the third user [P3] as represented by an arrow [823]. The processor [802] in the example [800] of the system is further for executing processor commands, being represented by an arrow [822], of the first user [P1]; and for executing processor commands, being represented by an arrow [824], of the second user [P2]; and for executing processor commands, being represented by an arrow [825], of the third user [P3]. In the example [800] of the system, the data repository [804] is coupled as represented by an arrow [826] with the processor [802]. Further in the example [800] of the system, the data repository [804] is for storing first account data [828] of the first user account [810], and for storing second account data [830] of the second user account [812], and for storing third account data [831] of the third user account [813]. In the example [800] of the system, the first account data [828] includes a Uniform Resource Identifier ("URI") [832] of a Domain Name [834] being designated to be accessed as represented by an arrow [836] for dynamic collection of real-time first user credentials information [838]. Further in the example [800] of the system, the second account data [830] includes another URI [840] of another Domain Name [842] being designated to be accessed as represented by an arrow [844] for dynamic collection of real-time second user credentials information [846]. Additionally in the example [800] of the system, the third account data [831] includes a further URI [841] of a further Domain Name [843] being designated to be accessed as represented by an arrow [845] for dynamic collection of real-time third user credentials information [847]. In the example [800] of the system, the first account data [828] is associated as represented by an arrow [848] with a first unique username [850] of the first user [P1], and the second account data [830] is associated as represented by an arrow [852] with a second unique username [854] of the second user [P2], and the third account data [831] is associated as represented by an arrow [853] with a third unique username [855] of the third user [P3]. In the example [800] of the system, the processor [802] also includes a geolocation facility [856] for determining an indication of a real-time geolocation proximity [858] between the first mobile communication device [816] and the second mobile communication device [820], and for determining an indication of another real-time geolocation proximity [859] between the first mobile communication device [816] and the third mobile communication device [821]. The processor [802] in the example [800] of the system additionally includes an account data-collection facility [860] being responsive in real-time to a processor command [822] of the first user [P1] for dynamically collecting, as represented by the arrow [844], the real-time second user credentials information [846], and being responsive in real-time to a processor command [822] of the first user [P1] for dynamically collecting, as represented by the arrow [845], the real-time third user credentials information [847]. In the example [800] of the system, the processor [802] is also for causing real-time gathering partner credentials [862] of the second user [P2], including the indication of the real-time geolocation proximity [858] and the real-time second user credentials information [846], to be displayed by the first mobile communication device [816]. In the example [800] of the system, the processor [802] is additionally for causing real-time gathering partner credentials [873] of the third user [P3], including the indication of the another real-time geolocation proximity [859] and the real-time third user credentials information [847], to be displayed by the first mobile communication device [816].

It is understood throughout this specification that an example [800] of the system may include any quantity of additional users [P4], [P5] . . . . In some examples [800] of the system, the data repository [804] may be coupled with the processor [802] for storing the first account data [828] as including a Uniform Resource Locator ("URL") [832] of an Internet Domain Name [834] being designated to be accessed for dynamic collection of the real-time first user credentials information [838] and the second account data [830] as including another URL [840] of another Internet Domain Name [842] being designated to be accessed for dynamic collection of the real-time second user credentials information [846], and the third account data [831] as including a further URL [841] of a further Internet Domain Name [843] being designated to be accessed for dynamic collection of the real-time third user credentials information [847]. In further examples [800] of the system, the processor [802] may also be for causing the real-time gathering partner credentials [862] of the second user [P2], including the indication of the real-time geolocation proximity [858] and the real-time second user credentials information [846], to be displayed by the third mobile communication device [821]. In additional examples [800] of the system, the processor [802] may be for causing real-time gathering partner credentials [873] of the third user [P3], including the indication of the another real-time geolocation proximity [859] and the real-time third user credentials information [847], to be displayed by the second mobile communication device [820]. In some examples [800] of the system, the processor [802] may be for causing real-time gathering partner credentials [863] of the first user [P1], including the indication of the real-time geolocation proximity [858] and the real-time first user credentials information [838], to be displayed by the second mobile communication device [820]. In other examples [800] of the system, the processor [802] may be for causing additional real-time gathering partner credentials [875] of the first user [P1], including the indication of the real-time geolocation proximity [859] and the real-time first user credentials information [838], to be displayed by the third mobile communication device [821].

In some examples [800] of the system, the processor [802] may be responsive in real-time to a processor command [822] of the first user [P1] for causing the real-time gathering partner credentials [862] of the second user [P2] to be displayed by the first mobile communication device [816]. In additional examples [800] of the system, the processor [802] as causing the real-time gathering partner credentials [862] of the second user [P2] to be displayed may include causing the indication of the real-time geolocation proximity [858] and the real-time second user credentials information [846] to be displayed as being integrated together by the first mobile communication device [816]. In further examples [800] of the system, the processor [802] as causing the real-time gathering partner credentials [862] of the second user [P2] to be displayed may include: causing a first marker [902] indicating a real-time first geolocation [904] of the first mobile communication device [816] to be displayed at a first position indicated by an arrow [906] on the first mobile communication device [816]; and may further include causing a second marker [908] indicating a real-time second geolocation [910] of the second mobile communication device [820] to be displayed at a second position indicated by an arrow [912] on the first mobile communication device [816]. In some of those further examples [800] of the system, the processor [802] as causing the indication of the real-time geolocation proximity [858] to be displayed may include causing the first marker [902] indicating the real-time first geolocation [904] to be displayed at the first position [906] on the first mobile communication device [816], and may further include causing the second marker [908] indicating the real-time second geolocation [910] to be displayed at the second position [912] on the first mobile communication device [816]. In others of those further examples [800] of the system, the processor [802] as causing the second marker [908] indicating the real-time second geolocation [910] of the second mobile communication device [820] to be displayed at the second position [912] on the first mobile communication device [816] may include causing the real-time second user credentials information [846] to be displayed at the second position [912].

In additional examples [800] of the system, the processor [802] causing the real-time gathering partner credentials [862] of the second user [P2] to be displayed by the first mobile communication device [816] may be subject to prior authorization by a processor command [824] of the second user [P2]. In further examples [800] of the system, the processor [802] causing the indication of the real-time geolocation proximity [858] to be displayed by the first mobile communication device [816] may be subject to prior authorization by a processor command [824] of the second user [P2]. In some examples [800] of the system, the processor [802] may include the geolocation facility [856] as tracking a real-time second geolocation [910] of the second mobile communication device [820]. In additional examples [800] of the system, the account data-collection facility [860] being responsive to the processor command [822] of the first user [P1] for the dynamically collecting, as represented by the arrow [844], the real-time second user credentials information [846], may be subject to prior authorization by a processor command [824] of the second user [P2]. In some of those additional examples [800] of the system, the account data-collection facility [860] as being subject to such prior authorization by the processor command [824] of the second user [P2] may enable the second user [P2] to select a tier [914] of the real-time second user credentials information [846] to be displayed from a selectable plurality of tiers [914], [916], [918] of the real-time second user credentials information [846].

In further examples [800] of the system, the processor [802] may further be for executing processor commands [824] of the second user [P2] for registering and maintaining the second user account [812] with the second account data [830] as including a business description [864] of the second user [P2]. In some of those further examples [800] of the system, the processor [802] as causing the real-time gathering partner credentials [862] of the second user [P2] to be displayed may include causing the business description [864] of the second user [P2] to be displayed by the first mobile communication device [816]. Also in some of those further examples [800] of the system, the processor [802] may be for executing the processor commands [824] for registering and maintaining the second user account [812] with the business description [864] of the second user [P2] as including a business description element [920], [922] being selected from a pre-defined listing of selectable business description elements [920], [922], displayed by the second mobile communication device [820]. In examples [800] of the system, the processor [802] may be for executing the processor commands [824] for registering and maintaining the second user account [812] with the pre-defined listing of selectable business description elements [920], [922], as including (not shown) business sectors, knowledge bases, skills, business interests, professions, or business goals. As further examples [800] of the system, the processor [802] may be for executing the processor commands [824] for registering and maintaining the second user account [812] with the business description [864] of the second user [P2] as including a rating [924] by the second user [P2] as to their level of experience or interest in the selected business description element [920], [922].

In examples [800] of the system, the geolocation facility [856] may be responsive to a processor command [822] of the first user [P1] for causing the indication of the real-time geolocation proximity [858] between the first and second mobile communication devices [816], [820] to be displayed by the first mobile communication device [816]. Further in those examples [800] of the system, the geolocation facility [856] may be responsive to the processor command [822] of the first user [P1] as causing the indication of the real-time geolocation proximity [858] to be displayed subject to the first and second mobile communication devices [816], [820] as being within a limited maximum proximity distance being represented by an arrow [926]. In some examples [800] of the system, the geolocation facility [856] may be for causing the second unique username [854] of the second user [P2] to be displayed by the first mobile communication device [816] as being included in the indication of the real-time geolocation proximity [858]. Further in those examples [800] of the system, the geolocation facility [856] may additionally be for causing the second unique username [854] and the business description [864] of the second user [P2] to be displayed by the first mobile communication device [816] as being included in the indication of the real-time geolocation proximity [858]. In additional examples [800] of the system, the processor [802] may be responsive to a processor command [822] of the first user [P1] as causing the indication of the real-time geolocation proximity [858] to be displayed as being integrated together with, as examples: the business description [864] of the second user [P2]; or the business description element [920], [922] of the second user [P2]; or the business description element [920], [922] of the second user [P2] accompanied by the rating [924] by the second user [P2]. Further in those examples [800] of the system, the processor [802] may be responsive to a processor command [822] of the first user [P1] for dynamically collecting, as represented by the arrow [844], either the real-time second user credentials information [846], or the indication of the real-time geolocation proximity [858], which may as examples be displayed as being integrated together with the business description [864] of the second user [P2], the business description element [920], [922] of the second user [P2], and/or the rating [924] by the second user [P2]. Further in those examples [800] of the system, the processor [802] may be responsive in real-time to a processor command [822] of the first user [P1] for causing to be displayed by the first mobile communication device [816], prior to the causing the real-time gathering partner credentials [862] of the second user [P2] to be displayed, the indication of the real-time geolocation proximity [858] integrated with the business description [864] of the second user [P2], the business description element [920], [922] of the second user [P2], and/or the rating [924] by the second user [P2]. Additionally in those examples [800] of the system, the geolocation facility [856] may be responsive to a processor command [822] of the first user [P1] for causing the indication of the real-time geolocation proximity [858] to be displayed by the first mobile communication device [816] in a text format or in a map format. Also in those examples [800] of the system, the geolocation facility [856] may be responsive to a processor command [822] of the first user [P1] for causing the indication of the real-time geolocation proximity [858] to be periodically updated and displayed by the first mobile communication device [816].

In some examples [800] of the system, the processor [802] may be responsive in real-time to a processor command [824] of the second user [P2] for causing real-time gathering partner credentials [863] of the first user [P1], including the indication of the real-time geolocation proximity [858] and the real-time first user credentials information [838], to be displayed by the second mobile communication device [820]. In additional examples [800] of the system, the processor [802] as causing the real-time gathering partner credentials [863] of the first user [P1] to be displayed may include causing the indication of the real-time geolocation proximity [858] and the real-time first user credentials information [838] to be displayed as being integrated together by the second mobile communication device [820]. In further examples [800] of the system, the processor [802] as causing the real-time gathering partner credentials [863] of the first user [P1] to be displayed may include: causing a second marker [1008] indicating a real-time second geolocation [1010] of the second mobile communication device [820] to be displayed at a second position indicated by an arrow [1012] on the second mobile communication device [820]; and may further include causing a first marker [1002] indicating a real-time first geolocation [1004] of the first mobile communication device [816] to be displayed at a first position indicated by an arrow [1006] on the second mobile communication device [820]. In some of those further examples [800] of the system, the processor [802] as causing the indication of the real-time geolocation proximity [858] to be displayed may include causing the second marker [1008] indicating the real-time second geolocation [1010] to be displayed at the second position [1012] on the second mobile communication device [820], and may further include causing the first marker [1002] indicating the real-time first geolocation [1004] to be displayed at the first position [1006] on the second mobile communication device [820]. In others of those further examples [800] of the system, the processor [802] as causing the first marker [1002] indicating the real-time first geolocation [1004] of the first mobile communication device [816] to be displayed at the first position [1006] on the second mobile communication device [820] may include causing the real-time first user credentials information [838] to be displayed at the first position [1006].

In additional examples [800] of the system, the processor [802] causing the real-time gathering partner credentials [863] of the first user [P1] to be displayed by the second mobile communication device [820] may be subject to prior authorization by a processor command [822] of the first user [P1]. In further examples [800] of the system, the processor [802] causing the indication of the real-time geolocation proximity [858] to be displayed by the second mobile communication device [820] may be subject to prior authorization by a processor command [822] of the first user [P1]. In some examples [800] of the system, the processor [802] may include the geolocation facility [856] as tracking a real-time first geolocation [1004] of the first mobile communication device [816]. In additional examples [800] of the system, the account data-collection facility [860] being responsive to the processor command [824] of the second user [P2] for the dynamically collecting, as represented by the arrow [836], the real-time first user credentials information [838], may be subject to prior authorization by a processor command [822] of the first user [P1]. In some of those additional examples [800] of the system, the account data-collection facility [860] as being subject to such prior authorization by the processor command [822] of the first user [P1] may enable the first user [P1] to select a tier [1014] of the real-time first user credentials information [838] to be displayed from a selectable plurality of tiers [1014], [1016], [1018] of the real-time first user credentials information [838].

In further examples [800] of the system, the processor [802] may further be for executing processor commands [822] of the first user [P1] for registering and maintaining the first user account [810] with the first account data [828] as including a business description [865] of the first user [P1]. In some of those further examples [800] of the system, the processor [802] as causing the real-time gathering partner credentials [863] of the first user [P1] to be displayed may include causing the business description [865] of the first user [P1] to be displayed by the second mobile communication device [820]. Also in some of those further examples [800] of the system, the processor [802] may be for executing the processor commands [822] for registering and maintaining the first user account [810] with the business description [865] of the first user [P1] as including a business description element [1020], [1022] being selected from a pre-defined listing of selectable business description elements [1020], [1022], displayed by the first mobile communication device [816]. In examples [800] of the system, the processor [802] may be for executing the processor commands [822] for registering and maintaining the first user account [810] with the pre-defined listing of selectable business description elements [1020], [1022], as including (not shown) business sectors, knowledge bases, skills, business interests, professions, or business goals. As further examples [800] of the system, the processor [802] may be for executing the processor commands [822] for registering and maintaining the first user account [810] with the business description [865] of the first user [P1] as including a rating [1024] by the first user [P1] as to their level of experience or interest in the selected business description element [1020], [1022].

In examples [800] of the system, the geolocation facility [856] may be responsive to a processor command [824] of the second user [P2] for causing the indication of the real-time geolocation proximity [858] between the second and first mobile communication devices [816], [820] to be displayed by the second mobile communication device [820]. Further in those examples [800] of the system, the geolocation facility [856] may be responsive to the processor command [824] of the second user [P2] as causing the indication of the real-time geolocation proximity [858] to be displayed subject to the second and first mobile communication devices [816], [820] as being within a limited maximum proximity distance being represented by the arrow [1026]. In some examples [800] of the system, the geolocation facility [856] may be for causing the first unique username [850] of the first user [P1] to be displayed by the second mobile communication device [820] as being included in the indication of the real-time geolocation proximity [858]. Further in those examples [800] of the system, the geolocation facility [856] may additionally be for causing the first unique username [850] and the business description [865] of the first user [P1] to be displayed by the second mobile communication device [820] as being included in the indication of the real-time geolocation proximity [858]. In additional examples [800] of the system, the processor [802] may be responsive to a processor command [824] of the second user [P2] as causing the indication of the real-time geolocation proximity [858] to be displayed as being integrated together with, as examples: the business description [865] of the first user [P1]; or the business description element [1020], [1022] of the first user [P1]; or the business description element [1020], [1022] of the first user [P1] accompanied by the rating [1024] by the first user [P1]. Further in those examples [800] of the system, the processor [802] may be responsive to a processor command [824] of the second user [P2] for dynamically collecting, as represented by the arrow [836], either the real-time first user credentials information [838], or the indication of the real-time geolocation proximity [858], which may as examples be displayed as being integrated together with the business description [865] of the first user [P1], the business description element [1020], [1022] of the first user [P1], and/or the rating [1024] by the first user [P1]. Further in those examples [800] of the system, the processor [802] may be responsive in real-time to a processor command [824] of the second user [P2] for causing to be displayed by the second mobile communication device [820], prior to the causing the real-time gathering partner credentials [863] of the first user [P1] to be displayed, the indication of the real-time geolocation proximity [858] integrated with the business description [865] of the first user [P1], the business description element [1020], [1022] of the first user [P1], and/or the rating [1024] by the first user [P1]. Additionally in those examples [800] of the system, the geolocation facility [856] may be responsive to a processor command [824] of the second user [P2] for causing the indication of the real-time geolocation proximity [858] to be displayed by the second mobile communication device [820] in a text format or in a map format. Also in those examples [800] of the system, the geolocation facility [856] may be responsive to a processor command [824] of the second user [P2] for causing the indication of the real-time geolocation proximity [858] to be periodically updated and displayed by the second mobile communication device [820].

In some examples [800] of the system, the processor [802] may be responsive in real-time to a processor command [825] of the third user [P3] for causing the real-time gathering partner credentials [863] of the first user [P1] to be displayed by the third mobile communication device [821]. In additional examples [800] of the system, the processor [802] as causing the real-time gathering partner credentials [863] of the first user [P1] to be displayed may include causing the indication of the real-time geolocation proximity [858] and the real-time first user credentials information [838] to be displayed as being integrated together by the third mobile communication device [821]. In further examples [800] of the system, the processor [802] as causing the real-time gathering partner credentials [863] of the first user [P1] to be displayed may include: causing a third marker [1108] indicating a real-time third geolocation [1110] of the third mobile communication device [821] to be displayed at a third position indicated by an arrow [1112] on the third mobile communication device [821]; and may further include causing a first marker [1102] indicating a real-time first geolocation [1104] of the first mobile communication device [816] to be displayed at a first position indicated by an arrow [1106] on the third mobile communication device [821]. In some of those further examples [800] of the system, the processor [802] as causing the indication of the real-time geolocation proximity [858] to be displayed may include causing the third marker [1108] indicating the real-time third geolocation [1110] to be displayed at the third position [1112] on the third mobile communication device [821], and may further include causing the first marker [1102] indicating the real-time first geolocation [1104] to be displayed at the first position [1106] on the third mobile communication device [821]. In others of those further examples [800] of the system, the processor [802] as causing the first marker [1102] indicating the real-time first geolocation [1104] of the first mobile communication device [816] to be displayed at the first position [1106] on the third mobile communication device [821] may include causing the real-time first user credentials information [838] to be displayed at the first position [1106].

In additional examples [800] of the system, the processor [802] causing the real-time gathering partner credentials [863] of the first user [P1] to be displayed by the third mobile communication device [821] may be subject to prior authorization by a processor command [822] of the first user [P1]. In further examples [800] of the system, the processor [802] causing the indication of the real-time geolocation proximity [858] to be displayed by the third mobile communication device [821] may be subject to prior authorization by a processor command [822] of the first user [P1]. In some examples [800] of the system, the processor [802] may include the geolocation facility [856] as tracking a real-time first geolocation [1104] of the first mobile communication device [816]. In additional examples [800] of the system, the account data-collection facility [860] being responsive to the processor command [825] of the third user [P3] for the dynamically collecting, as represented by the arrow [836], the real-time first user credentials information [838], may be subject to prior authorization by a processor command [822] of the first user [P1]. In some of those additional examples [800] of the system, the account data-collection facility

[860] as being subject to such prior authorization by the processor command [822] of the first user [P1] may enable the first user [P1] to select a tier [1014] of the real-time first user credentials information [838] to be displayed from a selectable plurality of tiers [1014], [1016], [1018] of the real-time first user credentials information [838].

In further examples [800] of the system, the processor [802] may further be for executing processor commands [822] of the first user [P1] for registering and maintaining the first user account [810] with the first account data [828] as including a business description [865] of the first user [P1]. In some of those further examples [800] of the system, the processor [802] as causing the real-time gathering partner credentials [863] of the first user [P1] to be displayed may include causing the business description [865] of the first user [P1] to be displayed by the third mobile communication device [821]. Also in some of those further examples [800] of the system, the processor [802] may be for executing the processor commands [822] for registering and maintaining the first user account [810] with the business description [865] of the first user [P1] as including a business description element [1020], [1022] being selected from a pre-defined listing of selectable business description elements [1020], [1022], displayed by the first mobile communication device [816]. In examples [800] of the system, the processor [802] may be for executing the processor commands [822] for registering and maintaining the first user account [810] with the pre-defined listing of selectable business description elements [1020], [1022], as including (not shown) business sectors, knowledge bases, skills, business interests, professions, or business goals. As further examples [800] of the system, the processor [802] may be for executing the processor commands [822] for registering and maintaining the first user account [810] with the business description [865] of the first user [P1] as including a rating [1024] by the first user [P1] as to their level of experience or interest in the selected business description element [1020], [1022]. In further examples [800] of the system, the processor [802] may further be for executing processor commands [825] of the third user [P3] for registering and maintaining the third user account [813] with the third account data [831] as including a business description [871] of the third user [P3]. Also in some of those further examples [800] of the system, the processor [802] may be for executing the processor commands [825] for registering and maintaining the third user account [813] with the business description [871] of the third user [P3] as including a business description element being selected from a pre-defined listing of selectable business description elements. In examples [800] of the system, the processor [802] may be for executing the processor commands [825] for registering and maintaining the third user account [813] with the pre-defined listing of selectable business description elements as including (not shown) business sectors, knowledge bases, skills, business interests, professions, or business goals. As further examples [800] of the system, the processor [802] may be for executing the processor commands [825] for registering and maintaining the third user account [813] with the business description [871] of the third user [P3] as including a rating by the third user [P3] as to their level of experience or interest in the selected business description element.

In examples [800] of the system, the geolocation facility [856] may be responsive to a processor command [825] of the third user [P3] for causing the indication of the real-time geolocation proximity [859] between the third and first mobile communication devices [816], [821] to be displayed by the third mobile communication device [821]. Further in those examples [800] of the system, the geolocation facility [856] may be responsive to the processor command [825] of the third user [P3] as causing the indication of the real-time geolocation proximity [859] to be displayed subject to the third and first mobile communication devices [816], [821] as being within a limited maximum proximity distance being represented by an arrow [1126]. In some examples [800] of the system, the geolocation facility [856] may be for causing the first unique username [850] of the first user [P1] to be displayed by the third mobile communication device [821] as being included in the indication of the real-time geolocation proximity [859]. Further in those examples [800] of the system, the geolocation facility [856] may additionally be for causing the first unique username [850] and the business description [865] of the first user [P1] to be displayed by the third mobile communication device [821] as being included in the indication of the real-time geolocation proximity [859]. In additional examples [800] of the system, the processor [802] may be responsive to a processor command [825] of the third user [P3] as causing the indication of the real-time geolocation proximity [859] to be displayed as being integrated together with, as examples: or the business description [865] of the first user [P1]; or the business description element [1020], [1022] of the first user [P1]; or the business description element [1020], [1022] of the first user [P1] accompanied by the rating [1024] by the first user [P1]. Further in those examples [800] of the system, the processor [802] may be responsive to a processor command [825] of the third user [P3] for dynamically collecting, as represented by the arrow [836], either the real-time first user credentials information [838], or the indication of the real-time geolocation proximity [859], which may as examples be displayed as being integrated together with the business description [865] of the first user [P1], the business description element [1020], [1022] of the first user [P1], and/or the rating [1024] by the first user [P1]. Further in those examples [800] of the system, the processor [802] may be responsive in real-time to a processor command [825] of the third user [P3] for causing to be displayed by the third mobile communication device [821], prior to the causing the real-time gathering partner credentials [863] of the first user [P1] to be displayed, the indication of the real-time geolocation proximity [859] integrated with the business description [865] of the first user [P1], the business description element [1020], [1022] of the first user [P1], and/or the rating [1024] by the first user [P1]. Additionally in those examples [800] of the system, the geolocation facility [856] may be responsive to a processor command [825] of the third user [P3] for causing the indication of the real-time geolocation proximity [859] to be displayed by the third mobile communication device [821] in a text format or in a map format. Also in those examples [800] of the system, the geolocation facility [856] may be responsive to a processor command [825] of the third user [P3] for causing the indication of the real-time geolocation proximity [859] to be periodically updated and displayed by the third mobile communication device [821].

In further examples [800] of the system, the processor [802] may include an account data vetting facility (not shown) for performing: a validation of the real-time first user credentials information [838]; and a validation of the real-time second user credentials information [846]; and a validation of the real-time third user credentials information [847].

In some examples [800] of the system, the processor [802] may include a business meeting arrangement facility [1202]

for enabling communications being represented by arrows [822], [824] between the first user [P1] and the second user [P2] of an invitation [1204] to attend a potential business meeting. In further examples [800] of the system, the processor [802] may include the business meeting arrangement facility [1202] as being for enabling communications being represented by arrows [822], [825] between the first user [P1] and the third user [P3] of an invitation [1205] to attend a potential business meeting. In additional examples [800] of the system, the processor [802] may include the business meeting arrangement facility [1202] as being for enabling communications being represented by arrows [824], [825] between the second user [P2] and the third user [P3] of an invitation [1207] to attend a potential business meeting.

In some examples [800] of the system, the processor [802] may include a business referral facility [1206] being responsive to a processor command [822] of the first user [P1] for causing an introduction [1208] of the second user [P2] to a third user [P3] to be displayed by the second mobile communication device [820]. Also in those further examples [800] of the system, the business referral facility [1206] may be for causing the introduction [1208] to include a personalized recommendation [1210] for a business referral discussion between the second user [P2] and the third user [P3]. In the further examples [800] of the system, the data repository [804] may be further for storing third account data [831] of the third user [P3] including contact information [1212] of the third user [P3]. Additionally in the examples [800] of the system, the processor [802] may be responsive to a processor command [822] of the first user [P1] for causing the contact information [1212] of the third user [P3] to be displayed by the second mobile communication device [820]. In some examples [800] of the system, in addition to being responsive to a processor command [822] of the first user [P1] for causing the introduction [1208] to be displayed by the second mobile communication device [820], the business referral facility [1206] may be for causing a commission payment commitment [1214] for execution by the second user [P2] to be displayed by the second mobile communication device [820]. In further examples [800] of the system, in addition to being responsive to a processor command [822] of the first user [P1] for causing the introduction [1208] to be displayed by the second mobile communication device [820], the business referral facility [1206] may be for causing the commission payment commitment [1214] to be displayed by the first mobile communication device [816] upon execution by the second user [P2]; and may also be for storing the commission payment commitment [1214] in the first account data [828] upon execution by the second user [P2].

In further examples [800] of the system, the processor [802] may include the business referral facility [1206] as being responsive to a processor command [824] of the second user [P2] for causing an introduction [1216] of the first user [P1] to the third user [P3] to be displayed by the third mobile communication device [821]. Also in those further examples [800] of the system, the business referral facility [1206] may be for causing the introduction [1216] to include a personalized recommendation [1218] for a business referral discussion between the first user [P1] and the third user [P3]. In the further examples [800] of the system, the data repository [804] may be further for storing third account data [831] of the third user [P3] including the contact information [1212] of the third user [P3]. Additionally in the examples [800] of the system, the processor [802] may be responsive to a processor command [824] of the second user [P2] for causing the contact information [1212] of the third user [P3] to be displayed by the first mobile communication device [816]. In some examples [800] of the system, in addition to being responsive to a processor command [824] of the second user [P2] for causing the introduction [1216] to be displayed by the third mobile communication device [821], the business referral facility [1206] may be for causing a commission payment commitment [1220] for execution by the first user [P1] to be displayed by the first mobile communication device [816]. In further examples [800] of the system, in addition to being responsive to a processor command [824] of the second user [P2] for causing the introduction [1216] to be displayed by the first mobile communication device [816], the business referral facility [1206] may be for causing the commission payment commitment [1220] to be displayed by the second mobile communication device [820] upon execution by the first user [P1]; and may be for storing the commission payment commitment [1220] in the second account data [830] upon execution by the first user [P1].

In some examples [800] of the system, the URI [832] of the Domain Name [834] may be designated to also be accessed for collection of contact information [1213] of the first user [P1], and the another URI [840] of the another Domain Name [842] may be designated to also be accessed for collection of contact information [1215] of the second user [P2], and the further URI [841] of the further Domain Name [843] may be designated to also be accessed for collection of contact information [1212] of the third user [P3]. In further examples [800] of the system, the account data-collection facility [860] may be responsive to a processor command [822] of the first user [P1] for collecting the contact information [1215] of the second user and the contact information [1212] of the third user, and the account data-collection facility [860] may be responsive to a processor command [824] of the second user [P2] for collecting the contact information [1213] of the first user [P1] and the contact information [1212] of the third user [P3], and the account data-collection facility [860] may be responsive to a processor command [825] of the third user [P3] for collecting the contact information [1213] of the first user [P1] and the contact information [1215] of the second user [P2]. In additional examples [800] of the system, the data repository [804] may be for: storing the third account data [831] of the third user [P3] including contact information [1212] of the third user [P3]; and storing the first account data [828] of the first user [P1] including contact information [1213] of the first user [P1]. Further in those examples [800] of the system, the data repository [804] may be for storing the second account data [830] of the second user [P2] including contact information [1215] of the second user [P2]. In those examples [800] of the system, the processor [802] may be responsive to a processor command [822] of the first user [P1] or to a processor command [824] of the second user [P2] or to a processor command [825] of the third user [P3], for causing the contact information [1212] of the third user [P3] or for causing the contact information [1213] of the first user [P1] or for causing the contact information [1215] of the second user [P2] to be received by the first mobile communication device [816] or by the second mobile communication device [820] or by the third mobile communication device [821]. Further in those examples [800] of the system, the processor [802] may be responsive to a processor command [822] of the first user [P1] or to a processor command [824] of the second user [P2] or to a processor command [825] of the third user [P3], for causing the contact information [1212], [1213], and/or

[1215] to be updated. In those examples [800] of the system, the processor [802] may be responsive to a processor command [822], [824], [825] for causing such contact information [1212], [1213], and/or [1215] to be updated on an ongoing periodic basis, for example, whenever the contact information [1212], [1213], [1215] is updated in the account data [828], [830], [831] as stored in the data repository [804]. In some examples [800] of the system, the processor [802] may be responsive to a processor command [822] of the first user [P1] or to a processor command [824] of the second user [P2] or to a processor command [825] of the third user [P3], for causing the contact information [1212], [1213], and/or [1215] to be categorized into a defined group, such as, for example, a group being defined by a user [P1], [P2], [P3]. Further in those examples [800] of the system, the processor [802] may be responsive to a processor command [822] of the first user [P1] or to a processor command [824] of the second user [P2] or to a processor command [825] of the third user [P3], for causing a message, announcement, or other information to be sent to one or more users [P1], [P2], [P3] being included in such a categorized group.

Figure 13:
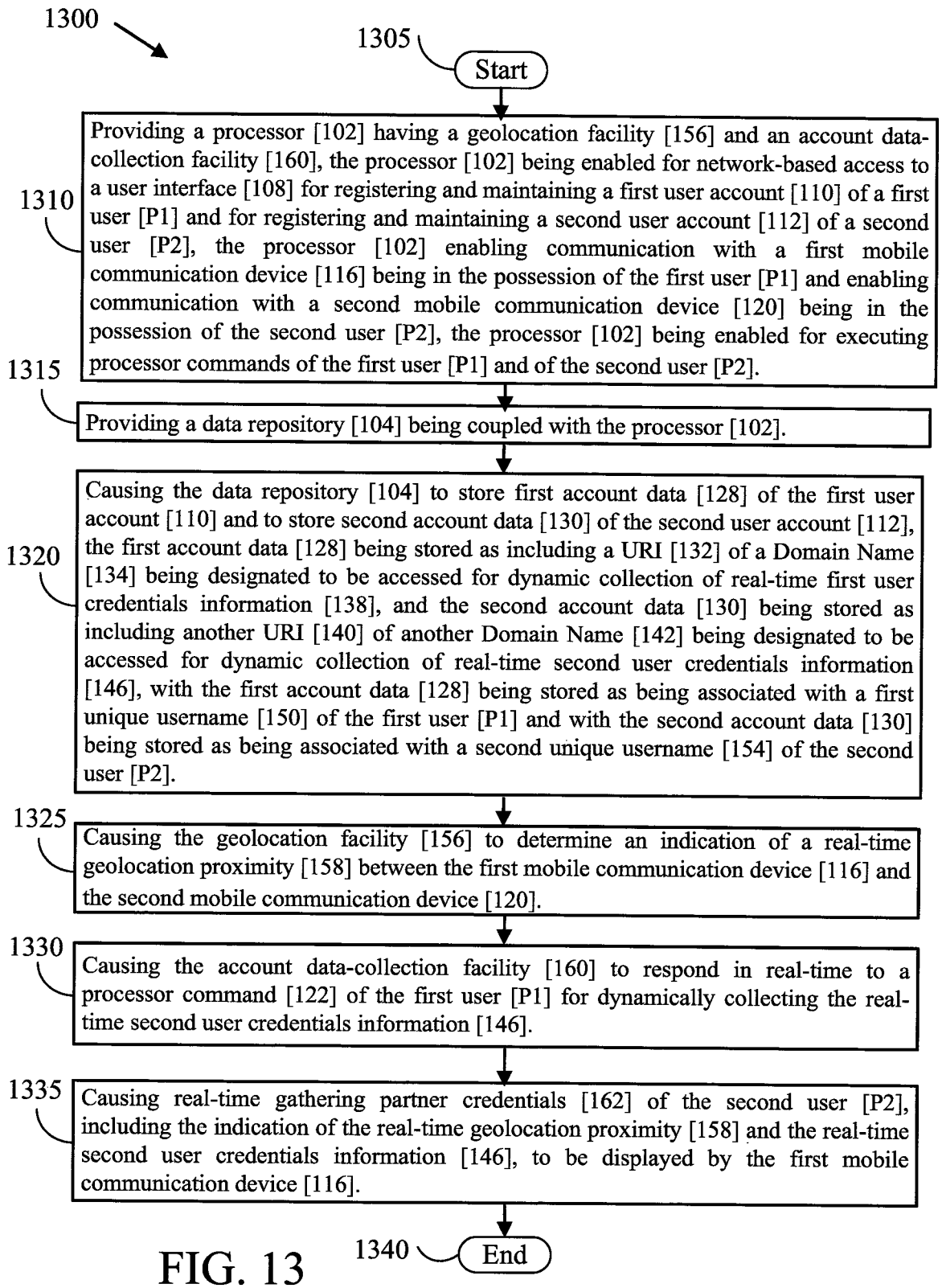
FIG. 13 is a flow chart showing examples [1300] of an implementation of a process for generation of real-time gathering partner credentials.

FIG. 13 is a flow chart showing examples [1300] of an implementation of a process for generation of real-time gathering partner credentials. In some examples, the process [1300] may include steps for providing some of the elements of the example [100] of the system as discussed in connection with FIGS. 1-7. However, it is understood throughout this specification that an example [1300] of a process for generation of real-time gathering partner credentials may include any combination of the features that are discussed herein in connection with the examples [100], [800] of systems for generation of real-time gathering partner credentials, or that are discussed herein in connection with the examples [1300] or [1400] of processes for generation of real-time gathering partner credentials. Accordingly, the entireties of the discussions herein of the examples [100], [800] of systems, and of the examples [1400] of the processes, are hereby incorporated in this discussion of the examples [1300] of the process for generation of real-time gathering partner credentials.

As shown in FIG. 13, the example [1300] of the implementation of the process for generation of real-time gathering partner credentials starts at step [1305], and then step [1310] includes providing a processor [102]. In the example [1300] of the process, providing the processor [102] includes providing a geolocation facility [156] and an account data-collection facility [160]. Step [1310] of the example [1300] of the process includes providing the processor [102] as being enabled for network-based access, as represented by an arrow [106], to a user interface [108] for registering and maintaining a first user account [110] of a first user [P1] and for registering and maintaining a second user account [112] of a second user [P2]. Step [1310] of the example [1300] of the process further includes providing the processor [102] as enabling communication as represented by an arrow [114] with a first mobile communication device [116] being in the possession of the first user [P1] and as enabling communication as represented by an arrow [118] with a second mobile communication device [120] being in the possession of the second user [P2]. Step [1310] of the example [1300] of the process also includes providing the processor [102] as being enabled for executing processor commands, being represented by an arrow [122], of the first user [P1]; and for executing processor commands, being represented by an arrow [124], of the second user [P2]. Step [1315] of the example [1300] of the process includes providing a data repository [104] being coupled as represented by an arrow [126] with the processor [102]. Step [1320] of the example [1300] of the process includes causing the data repository [104] to store first account data [128] of the first user account [110] and to store second account data [130] of the second user account [112]. In step [1320] of the example [1300] of the process, the first account data [128] is stored as including a Uniform Resource Identifier ("URI") [132] of a Domain Name [134] being designated to be accessed as represented by an arrow [136] for dynamic collection of real-time first user credentials information [138]. Further in step [1320] of the example [1300] of the process, the second account data [130] is stored as including another URI [140] of another Domain Name [142] being designated to be accessed as represented by an arrow [144] for dynamic collection of real-time second user credentials information [146]. Additionally in step [1320] of the example [1300] of the process, the first account data [128] is stored as being associated as represented by an arrow [148] with a first unique username [150] of the first user [P1], and the second account data [130] is stored as being associated as represented by an arrow [152] with a second unique username [154] of the second user [P2]. At step [1325] of the example [1300] of the process, the geolocation facility [156] is caused to determine an indication of a real-time geolocation proximity [158] between the first mobile communication device [116] and the second mobile communication device [120]. At step [1330] of the example [1300] of the process, the account data-collection facility [160] is caused to respond in real-time to a processor command [122] of the first user [P1] for dynamically collecting, as represented by the arrow [144], the real-time second user credentials information [146]. At step [1335] of the example [1300] of the process, the processor [102] causes real-time gathering partner credentials [162] of the second user [P2], including the indication of the real-time geolocation proximity [158] and the real-time second user credentials information [146], to be displayed by the first mobile communication device [116]. In some examples, the process [1300] may then end at step [1340].

It is understood throughout this specification that an example [1300] of the process may be carried out with any quantity of additional users [P3], [P4] . . . . As examples [1300] of the process, causing the data repository [104] to store the first account data [128] at step [1320] may include the URI of the Domain Name as being a Uniform Resource Locator ("URL") [132] of an Internet Domain Name [134] being designated to be accessed for dynamic collection of the real-time first user credentials information [138], and causing the data repository [104] to store the second account data [130] at step [1320] may include the another URI as being another URL [140] of another Internet Domain Name [142] being designated to be accessed for dynamic collection of the real-time second user credentials information [146]. In some examples [1300] of the process, step [1310] may include providing the processor [102] as being responsive in real-time to a processor command [122] of the first user [P1] for causing the real-time gathering partner credentials [162] of the second user [P2] to be displayed by the first mobile communication device [116]. In additional examples [1300] of the process, the processor [102] causing the real-time gathering partner credentials [162] of the second user [P2] to be displayed at step [1335] may include causing the indication of the real-time geolocation proximity [158] and the real-time second user credentials information [146] to be displayed as being integrated together by the first mobile communication device [116]. In further examples

[1300] of the process, the processor [102] causing the real-time gathering partner credentials [162] of the second user [P2] to be displayed at step [1335] may include: causing a first marker [202] indicating a real-time first geolocation [204] of the first mobile communication device [116] to be displayed at a first position indicated by an arrow [206] on the first mobile communication device [116]; and causing a second marker [208] indicating a real-time second geolocation [210] of the second mobile communication device [120] to be displayed at a second position indicated by an arrow [212] on the first mobile communication device [116]. In some of those further examples [1300] of the process, the processor [102] causing the indication of the real-time geolocation proximity [158] to be displayed at step [1335] may include causing the first marker [202] indicating the real-time first geolocation [204] to be displayed at the first position [206] on the first mobile communication device [116], and may further include causing the second marker [208] indicating the real-time second geolocation [210] to be displayed at the second position [212] on the first mobile communication device [116]. In others of those further examples [1300] of the process, the processor [102] causing the second marker [208] indicating the real-time second geolocation [210] of the second mobile communication device [120] to be displayed in step [1335] at the second position [212] on the first mobile communication device [116] may include causing the real-time second user credentials information [146] to be displayed at the second position [212]. In some examples [1300] of the process, step [1335] may include the processor [102] being responsive to a processor command [122] of the first user [P1] causing the real-time second user credentials information [146] or the real-time gathering partner credentials [162] of the second user [P2] to be blocked from being displayed by the first mobile communication device [116] unless the second account data [130] include a specific another URI [140] of a specific another Domain Name [142] being designated in a processor command [122] of the first user [P1]. In additional examples [1300] of the process, the processor [102] causing the real-time gathering partner credentials [162] of the second user [P2] to be displayed in step [1335] by the first mobile communication device [116] may be subject to prior authorization by a processor command [124] of the second user [P2]. In further examples [1300] of the process, the processor [102] causing the indication of the real-time geolocation proximity [158] to be displayed in step [1335] by the first mobile communication device [116] may be subject to prior authorization by a processor command [124] of the second user [P2]. In some examples [1300] of the process, step [1325] may include causing the geolocation facility [156] to track a real-time second geolocation [210] of the second mobile communication device [120]. Further in those examples [1300] of the process, step [1325] may include the tracking by the geolocation facility [156] of the real-time second geolocation [210] of the second mobile communication device [120] as being subject to prior authorization by a processor command [124] of the second user [P2].

In additional examples [1300] of the process, the account data-collection facility [160] being responsive at step [1330] to the processor command [122] of the first user [P1] for the dynamically collecting, as represented by the arrow [144], the real-time second user credentials information [146], may be subject to prior authorization by a processor command [124] of the second user [P2]. In some of those additional examples [1300] of the process, the account data-collection facility [160] as being subject at step [1330] to such prior authorization by the processor command [124] of the second user [P2] may enable the second user [P2] to select a tier [214] of the real-time second user credentials information [146] to be displayed on the second mobile communication device [120] from a selectable plurality of tiers [214], [216], [218] of the real-time second user credentials information [146]. In some of the additional examples [1300] of the process, at step [1330] the real-time second user credentials information [146] may include the tier [216] as including more information than may be included in the tier [214]; and, for example, the real-time second user credentials information [146] may further include the tier [218] as including more information than may be included in the tier [216].

In further examples [1300] of the process, step [1310] may include the processor [102] further being for executing processor commands [124] of the second user [P2] for registering and maintaining the second user account [112] with the second account data [130] at step [1320] as including a business description [164] of the second user [P2]. In some of those further examples [1300] of the process, the processor [102] causing the real-time gathering partner credentials [162] of the second user [P2] to be displayed at step [1335] may include causing the business description [164] of the second user [P2] to be displayed by the first mobile communication device [116]. Also in some of those further examples [1300] of the process, step [1310] may include providing the processor [102] as being for executing the processor commands [124] for registering and maintaining the second user account [112] with the business description [164] of the second user [P2] at step [1320] as including a business description element [220], [222] being selected from a pre-defined listing of selectable business description elements [220], [222], displayed for selection by the second user [P2] on the second mobile communication device [120]. In examples [1300] of the process, the processor [102] may be provided at step [1310] for executing the processor commands [124] for registering and maintaining the second user account [112] at step [1320] with the pre-defined listing of selectable business description elements [220], [222], as including (not shown) business sectors, knowledge bases, skills, business interests, professions, or business goals. As further examples [1300] of the process, the processor [102] may be provided at step [1310] for executing the processor commands [124] for registering and maintaining the second user account [112] at step [1320] with the business description [164] of the second user [P2] as including a rating [224] by the second user [P2] as to their level of experience or interest in the selected business description element [220], [222]. In some examples [1300] of the process, the rating [224] at step [1320] by the second user [P2] as to their level of experience or interest in the selected business description element [220], [222], may be expressed as a numerical or alphabetical rating "X" on a corresponding numerical or alphabetical scale.

In examples [1300] of the process, step [1325] may include the geolocation facility [156] being responsive to a processor command [122] of the first user [P1] for causing the indication of the real-time geolocation proximity [158] between the first and second mobile communication devices [116], [120] to be displayed by the first mobile communication device [116]. Further in those examples [1300] of the process, step [1325] may include the geolocation facility [156] being responsive to the processor command [122] of the first user [P1] as causing the indication of the real-time geolocation proximity [158] to be displayed subject to the first and second mobile communication devices [116], [120]

being within a limited maximum proximity distance being represented by the arrow [226]. In some examples [1300] of the process, step [1325] may include the geolocation facility [156] causing the second unique username [154] of the second user [P2] to be displayed by the first mobile communication device [116] as being included in the indication of the real-time geolocation proximity [158]. Further in those examples [1300] of the process, step [1325] may include the geolocation facility [156] causing the second unique username [154] and the business description [164] of the second user [P2] to be displayed by the first mobile communication device [116] as being included in the indication of the real-time geolocation proximity [158]. In additional examples [1300] of the process, step [1310] may include the processor [102] being responsive to a processor command [122] of the first user [P1] as causing the indication of the real-time geolocation proximity [158] to be displayed as being integrated together with, as examples: the business description [164] of the second user [P2]; or the business description element [220], [222] of the second user [P2]; or the business description element [220], [222] of the second user [P2] accompanied by the rating [224] by the second user [P2]. Further in those examples [1300] of the process, step [1310] may include the processor [102] being responsive to a processor command [122] of the first user [P1] for dynamically collecting, as represented by the arrow [144], either the real-time second user credentials information [146], or the indication of the real-time geolocation proximity [158], which may as examples be displayed as being integrated together with the business description [164] of the second user [P2], the business description element [220], [222] of the second user [P2], and/or the rating [224] by the second user [P2]. Further in those examples [1300] of the process, step [1310] may include the processor [102] being responsive in real-time to a processor command [122] of the first user [P1] for causing to be displayed by the first mobile communication device [116], prior to the causing the real-time gathering partner credentials [162] of the second user [P2] to be displayed at step [1335], the indication of the real-time geolocation proximity [158] integrated with the business description [164] of the second user [P2], the business description element [220], [222] of the second user [P2], and/or the rating [224] by the second user [P2]. Additionally in those examples [1300] of the process, step [1325] may include the geolocation facility [156] being responsive to a processor command [122] of the first user [P1] for causing the indication of the real-time geolocation proximity [158] to be displayed at step [1335] by the first mobile communication device [116] in a text format or in a map format. Also in those examples [1300] of the process, step [1325] may include the geolocation facility [156] being responsive to a processor command [122] of the first user [P1] for causing the indication of the real-time geolocation proximity [158] to be periodically updated and displayed at step [1335] by the first mobile communication device [116]. In examples [1300] of the process, step [1310] may include the processor [102] being responsive to a processor command [122] of the first user [P1] for establishing direct two-way communications, being represented by a dashed arrow [172], between the first and second mobile communication devices [116], [120]. In some of those examples [1300] of the process, the being responsive of the processor [102] to the processor command [122] of the first user [P1] for establishing the direct two-way communications between the first and second mobile communication devices [116], [120] at step [1310] may be subject to prior authorization by a processor command [124] from the second user [P2].

In some examples [1300] of the process, providing the processor [102] at step [1310] may include the account data-collection facility [160] being responsive in real-time to a processor command [124] of the second user [P2] for dynamically collecting at step [1330], as represented by the arrow [136], the real-time first user credentials information [138]. Further in those examples [100], step [1310] may include the processor [102] causing real-time gathering partner credentials [163] of the first user [P1], including the indication of the real-time geolocation proximity [158] and the real-time first user credentials information [138], to be displayed at step [1335] by the second mobile communication device [120]. In some examples [1300] of the process, step [1310] may include the processor [102] being responsive in real-time to a processor command [124] of the second user [P2] for causing the real-time gathering partner credentials [163] of the first user [P1] to be displayed at step [1335] by the second mobile communication device [120]. In some examples [1300] of the process, the processor [102] causing the real-time gathering partner credentials [163] of the first user [P1] to be displayed at step [1335] may include causing the indication of the real-time geolocation proximity [158] and the real-time first user credentials information [138] to be displayed at step [1335] as being integrated together by the second mobile communication device [120]. In further examples [1300] of the process, the processor [102] causing the real-time gathering partner credentials [163] of the first user [P1] to be displayed at step [1335] may include: causing a second marker [308] indicating a real-time second geolocation [310] of the second mobile communication device [120] to be displayed in step [1335] at a second position indicated by an arrow [312] on the second mobile communication device [120]; and may further include causing a first marker [302] indicating a real-time first geolocation [304] of the first mobile communication device [116] to be displayed in step [1335] at a first position indicated by an arrow [306] on the second mobile communication device [120]. In some of those further examples [1300] of the process, the processor [102] causing the indication of the real-time geolocation proximity [158] to be displayed at step [1335] may include causing the first marker [302] indicating the real-time first geolocation [304] to be displayed in step [1335] at the first position [306] on the second mobile communication device [120], and may further include causing the second marker [308] indicating the real-time second geolocation [310] to be displayed in step [1335] at the second position [312] on the second mobile communication device [120]. In others of those further examples [1300] of the process, the processor [102] causing the second marker [308] indicating the real-time second geolocation [310] of the second mobile communication device [120] to be displayed at step [1335] at the second position [312] on the second mobile communication device [120] may include causing the real-time first user credentials information [138] to be displayed in step [1335] at the first position [306]. In some examples [1300] of the process, step [1310] may include the processor [102] being responsive to a processor command [124] of the second user [P2] causing the real-time first user credentials information [138] or the real-time gathering partner credentials [163] of the first user [P1] to be blocked from being displayed at step [1335] by the second mobile communication device [120] unless the first account data [128] include a specific URI [132] of a specific Domain Name [134] being designated in a processor command [124] of the second user [P2]. In additional examples [1300] of the process, the processor [102] causing the real-time gathering partner credentials [163] of the first user [P1] to be displayed at step [1335] by the second mobile communication device [120] may be subject to prior authorization by a processor command [122] of the first user [P1]. In further examples [1300] of the process, the processor [102] causing the indication of the real-time geolocation proximity [158] to be displayed at step [1335] by the second mobile communication device [120] may be subject to prior authorization by a processor command [122] of the first user [P1]. In some examples [1300] of the process, providing the processor [102] at step [1310] may include, at step [1325], the geolocation facility [156] tracking a real-time first geolocation [304] of the first mobile communication device [116]. Further in those examples [1300] of the process, the geolocation facility [156] tracking the real-time first geolocation [304] of the first mobile communication device [116] at step [1325] may be subject to prior authorization by a processor command [122] of the first user [P1].

In additional examples [1300] of the process, the account data-collection facility [160] being responsive at step [1330] to the processor command [124] of the second user [P2] for the dynamically collecting, as represented by the arrow [136], the real-time first user credentials information [138], may be subject to prior authorization by a processor command [122] of the first user [P1]. In some of those additional examples [1300] of the process, the account data-collection facility [160] being subject at step [1330] to such prior authorization by the processor command [122] of the first user [P1] may enable the first user [P1] to select a tier [314] of the real-time first user credentials information [138] to be displayed on the first mobile communication device [116] at step [1335] from a selectable plurality of tiers [314], [316], [318] of the real-time first user credentials information [138]. In some of the additional examples [1300] of the process, the real-time first user credentials information [138] may at step [1330] include the tier [316] as including more information than may be included in the tier [314]; and, for example, the real-time first user credentials information [138] may at step [1330] further include the tier [318] as including more information than may be included in the tier [316].

In further examples [1300] of the process, step [1310] may include providing the processor [102] as executing processor commands [122] of the first user [P1] for registering and maintaining the first user account [110] with the first account data [128] as including a business description [165] of the first user [P1]. In some of those further examples [1300] of the process, providing the processor [102] in step [1310] for causing the real-time gathering partner credentials [163] of the first user [P1] to be displayed at step [1335] may include causing the business description [165] of the first user [P1] to be displayed in step [1335] by the second mobile communication device [120]. Also in some of those further examples [1300] of the process, step [1310] may include providing the processor [102] for executing the processor commands [122] for registering and maintaining the first user account [110] with the business description [165] of the first user [P1] as including a business description element [320], [322] being selected from a pre-defined listing of selectable business description elements [320], [322], displayed for selection by the first user [P1] in step [1335] on the first mobile communication device [116]. In examples [1300] of the process, step [1310] may include providing the processor [102] for executing the processor commands [122] for registering and maintaining the first user account [110] with the pre-defined listing of selectable business description elements [320], [322], as including (not shown) business sectors, knowledge bases, skills, business interests, professions, or business goals. As further examples [1300] of the process, step [1310] may include providing the processor [102] for executing the processor commands [122] for registering and maintaining the first user account [110] with the business description [165] of the first user [P1] as including a rating [324] by the first user [P1] as to their level of experience or interest in the selected business description element [320], [322]. In some examples [1300] of the process, step [1310] may further include the rating [324] by the first user [P1] as to their level of experience or interest in the selected business description element [320], [322], as being expressed as a numerical or alphabetical rating "X" on a corresponding numerical or alphabetical scale.

In examples [1300] of the process, step [1325] may include the geolocation facility [156] being responsive to a processor command [124] of the second user [P2] for causing the indication of the real-time geolocation proximity [158] between the first and first mobile communication devices [116], [120] to be displayed in step [1335] by the second mobile communication device [120]. Further in those examples [1300] of the process, step [1325] may include the geolocation facility [156] being responsive to the processor command [124] of the second user [P2] as causing the indication of the real-time geolocation proximity [158] to be displayed in step [1335] subject to the first and second mobile communication devices [116], [120] as being within a limited maximum proximity distance being represented by the arrow [326]. In some examples [1300] of the process, step [1325] may include the geolocation facility [156] causing the first unique username [150] of the first user [P1] to be displayed in step [1335] by the second mobile communication device [120] as being included in the indication of the real-time geolocation proximity [158]. Further in those examples [1300] of the process, step [1325] may include the geolocation facility [156] additionally causing the first unique username [150] and the business description [165] of the first user [P1] to be displayed at step [1335] by the second mobile communication device [120] as being included in the indication of the real-time geolocation proximity [158]. In additional examples [1300] of the process, step [1310] may include the processor [102] being responsive to a processor command [124] of the second user [P2] as causing the indication of the real-time geolocation proximity [158] to be displayed in step [1335] as being integrated together with, as examples: the business description [165] of the first user [P1]; or the business description element [320], [322] of the first user [P1]; or the business description element [320], [322] of the first user [P1] accompanied by the rating [324] by the first user [P1]. Further in those examples [1300] of the process, step [1310] may include the processor [102] being responsive to a processor command [124] of the second user [P2] for dynamically collecting in step [1330], as represented by the arrow [136], either the real-time first user credentials information [138], or the indication of the real-time geolocation proximity [158] which may as examples be displayed in step [1335] as being integrated together with the business description [165] of the first user [P1], the business description element [320], [322] of the first user [P1], and/or the rating [324] by the first user [P1]. Further in those examples [1300] of the process, step [1310] may include the processor [102] being responsive in real-time to a processor command [124] of the second user [P2] for causing to be displayed in step [1335] by the second mobile communication device [120], prior to the causing the real-time gathering partner credentials [163] of the first user [P1] to be displayed in step [1335], the indication of the real-time geolocation proximity [158] integrated with the business description [165] of the first user [P1], the business description element [320], [322] of the first user [P1], and/or the rating [324] by the first user [P1]. Additionally in those examples [1300] of the process, step [1325] may include the geolocation facility [156] being responsive to a processor command [124] of the second user [P2] for causing the indication of the real-time geolocation proximity [158] to be displayed in step [1335] by the second mobile communication device [120] in a text format or in a map format. Also in those examples [1300] of the process, step [1325] may include the geolocation facility [156] being responsive to a processor command [124] of the second user [P2] for causing the indication of the real-time geolocation proximity [158] to be periodically updated and displayed in step [1335] by the second mobile communication device [120]. In examples [1300] of the process, step [1310] may include the processor [102] being responsive to a processor command [124] of the second user [P2] for establishing direct two-way communications, being represented by a dashed arrow [172], between the first and second mobile communication devices [116], [120]. In some of those examples [1300] of the process, the being responsive of the processor [102] in step [1310] to the processor command [124] of the second user [P2] for establishing the direct two-way communications between the first and second mobile communication devices [116], [120] may be subject to prior authorization by a processor command [122] from the first user [P1].

In some examples [1300] of the process, step [1310] may include the processor [102] being responsive to a processor command [124] of the second user [P2] for selection of the another URI [140] of the another Domain Name [142]. In additional examples [1300] of the process, step [1310] may include the processor [102] being responsive to a processor command [124] of the second user [P2] for designating the another URI [140] of the another Domain Name [142] as being confidential. Also in those additional examples [1300] of the process, step [1310] may include the processor [102] being responsive to a processor command [124] by the second user [P2] causing access to real-time second user credentials information [146] posted at the confidential another URI [140] of the another Domain Name [142] to be subject to prior authorization by a processor command [124] of the second user [P2].

In further examples [1300] of the process, step [1310] may include the processor [102] as including an account data vetting facility [402] for performing a validation of the real-time second user credentials information [146]. As examples [1300] of the process, providing the processor [102] at step [1310] may include providing the processor [102] as being coupled with the account data vetting facility [402] as represented by an arrow [403]. In some of those further examples [1300] of the process, step [1310] may include the processor [102] requiring the second account data [130] to include an additional URI [404] of an additional Domain Name [406] as being designated to be accessed as represented by an arrow [408] for the dynamic collection of additional real-time second user credentials information [410]. Further in those examples [1300] of the process, step [1310] may include the processor [102] requiring the second account data [130] to include both the another URI [140] of the another Domain Name [142] and the additional URI [404] of the additional Domain Name [406] as being designated for the dynamic collection of the real-time second user credentials information [146], [410]. In other examples [1300] of the process, step [1310] may include the processor [102] requiring the another URI [140] of the another Domain Name [142] being designated for the dynamic collection of the real-time second user credentials information [146] to be another URI [140] of a third-party-controlled another Domain Name [142]. Further in those other examples [1300] of the process, step [1310] may include the processor [102] requiring the second account data [130] to include a plurality of URIs [140], [404] of third-party-controlled Domain Names [142], [406] being selected from a pre-defined listing of selectable URIs [140], [404] of Domain Names [142], [406] as being displayed for selection by the second user [P2] on the second mobile communication device [120]. In additional examples [1300] of the process, step [1310] may include the processor [102] blocking the second account data [130] from including any URI [140], [404] of a Domain Name [142], [406] matching a pre-defined listing of excluded URIs of Domain Names. Also in those further examples [1300] of the process, step [1310] may include the processor [102] as including the account data vetting facility [402] as additionally comparing the real-time second user credentials information [146] posted at the another Domain Name [142] with additional real-time second user credentials information [410] posted at the additional Domain Name [406]. In some of the further examples [1300] of the process, step [1310] may include the processor [102] including the account data vetting facility [402] as periodically collecting, and generating a historical record [412] of, the real-time second user credentials information [146] posted at the designated another Domain Name [142]; and as comparing the historical record [412] with the real-time second user credentials information [146] being collected in real-time. In some examples [1300] of the process, step [1310] may include providing the account data vetting facility [402] as being coupled with the historical record [412] as represented by the arrow [411]. In examples [1300] of the process, step [1310] may include the historical record [412] of the real-time second user credentials information [146] being stored by the data repository [104] as being included in the second account data [130] of the second user account [112]. In other examples [1300] of the process, step [1310] may include the processor [102] including the account data vetting facility [402] performing a validation of the second account data [130]. In some of those other examples [1300] of the process, step [1310] may include the processor [102] including the account data vetting facility [402] performing a validation of the another URI [140] of the another Domain Name [142] being designated for dynamic collection of the real-time second user credentials information [146]. As examples [1300] of the process, step [1310] may include the processor [102] including the account data vetting facility [402] as comparing, with a roster [414] of legitimate URIs [416], [418] of Domain Names, the another URI [140] of the another Domain Name [142] being designated for dynamic collection of the real-time second user credentials information [146]. As examples [1300] of the process, step [1310] may include providing the account data vetting facility [402] as being coupled with the roster [414] as represented by the arrow [413].

In some examples [1300] of the process, step [1310] may include the processor [102] being responsive to a processor command [122] of the first user [P1] for selection of the URI [132] of the Domain Name [134]. In additional examples [1300] of the process, step [1310] may include the processor [102] being responsive to a processor command [122] of the first user [P1] for designating the URI [132] of the Domain Name [134] as being confidential. Also in those additional examples [1300] of the process, step [1310] may include the processor [102] being responsive to a processor command [122] by the first user [P1] causing access to real-time first user credentials information [138] posted at the confidential URI [132] of the Domain Name [134] to be subject to prior authorization by a processor command [122] of the first user [P1].

In further examples [1300] of the process, step [1310] may include the processor [102] including an account data vetting facility [502] for performing a validation of the real-time first user credentials information [138]. As examples [1300] of the process, step [1310] may include the processor [102] as being coupled with the account data vetting facility [502] as represented by the arrow [503]. Step [1310] in some of those examples [1300] of the process may also include the account data vetting facility [402] performing the validation of the real-time second user credentials information [146]; and in those examples [1300], the account data vetting facilities [402], [502] may either be separate facilities or integrated together. In some of those further examples [1300] of the process, step [1310] may include the processor [102] requiring the first account data [128] to include a further URI [504] of a further Domain Name [506] as being designated to be accessed as represented by an arrow [508] for the dynamic collection of further real-time first user credentials information [510]. Further in those examples [1300] of the process, step [1310] may include the processor [102] requiring the first account data [128] to include both the URI [132] of the Domain Name [134] and the further URI [504] of the further Domain Name [506] as being designated for the dynamic collection of the real-time first user credentials information [138], [510]. In other examples [1300] of the process, step [1310] may include the processor [102] requiring the URI [132] of the Domain Name [134] being designated for the dynamic collection of the real-time first user credentials information [138] to be a URI [132] of a third-party-controlled Domain Name [134]. Further in those other examples [1300] of the process, step [1310] may include the processor [102] requiring the first account data [128] to include a plurality of URIs [132], [504] of third-party-controlled Domain Names [134], [506] being selected from a pre-defined listing of selectable URIs [132], [504] of Domain Names [134], [506] as being displayed by the first mobile communication device [116]. In additional examples [1300] of the process, step [1310] may include the processor [102] blocking the first account data [128] from including any URI [132], [504] of a Domain Name [134], [506] matching a pre-defined listing of excluded URIs of Domain Names. Also in those further examples [1300] of the process, step [1310] may include the processor [102] including the account data vetting facility [502] as additionally comparing the real-time first user credentials information [138] posted at the Domain Name [134] with further real-time first user credentials information [510] posted at the further Domain Name [506]. In some of the further examples [1300] of the process, step [1310] may include the processor [102] including the account data vetting facility [502] as periodically collecting, and generating a historical record [512] of, the real-time first user credentials information [138] posted at the designated Domain Name [134]; and comparing the historical record [512] with the real-time first user credentials information [138] being collected in real-time. As examples [1300] of the process, step [1310] may include the account data vetting facility [502] as being coupled with the historical record [512] as represented by the arrow [511]. In examples [1300] of the process, step [1310] may include the historical record [512] of the real-time first user credentials information [138] being stored by the data repository [104] at step [1320] as being included in the first account data [128] of the first user account [110]. In other examples [1300] of the process, step [1310] may include the processor [102] including the account data vetting facility [502] performing a validation of the first account data [128]. In some of those other examples [1300] of the process, step [1310] may include the processor [102] including the account data vetting facility [502] performing a validation of the URI [132] of the Domain Name [134] being designated for dynamic collection of the real-time first user credentials information [138]. As examples [1300] of the process, step [1310] may include the processor [102] including the account data vetting facility [502] as comparing, with a roster [514] of legitimate URIs [516], [518] of Domain Names, the URI [132] of the Domain Name [134] being designated for dynamic collection of the real-time first user credentials information [138]. As examples [1300] of the process, step [1310] may include the account data vetting facility as being coupled with the roster [514] as represented by the arrow [513].

In some examples [1300] of the process, step [1310] may include the processor [102] including a business networking facility [602] being responsive to a processor command [122] of the first user [P1] causing the business description [165] of the first user [P1] to be displayed by the second mobile communication device [120]. As examples [1300] of the process, step [1310] may include the processor [102] as being coupled with the business networking facility [602] as represented by the arrow [603]. Further in those examples [1300] of the process, step [1310] may include the business networking facility [602] causing the business description [165] of the first user [P1] to include the business description element [320], [322], being selected from the pre-defined listing of selectable business description elements [320], [322], as being displayed for selection by the first user [P1] on the first mobile communication device [116]. Additionally in those examples [1300] of the process, step [1310] may include the business networking facility [602] causing the business description [165] of the first user [P1] to be displayed with the pre-defined listing of selectable business description elements [320], [322], as including business sectors, knowledge bases, skills, business interests, professions, or business goals. Also in those additional examples [1300] of the process, step [1310] may include the business networking facility [602] being responsive to a processor command [122] by the first user [P1] for making subject to prior authorization, by another processor command [122] by the first user [P1], the causing the business description [165] of the first user [P1] to be displayed by the second mobile communication device [120].

In further examples [1300] of the process, step [1310] may include the processor [102] including another business networking facility [604] being responsive to a processor command [124] of the second user [P2] for causing the business description [164] of the second user [P2] to be displayed by the first mobile communication device [116]. As examples [1300] of the process, step [1310] may include the processor [102] as being coupled with the business networking facility [604] as represented by the arrow [605]. In other examples [1300] of the process (not shown), step [1310] may include the business networking facility [602] and the business networking facility [604] being integrated together. Also in the further examples [1300] of the process, step [1310] may include the business networking facility [604] causing the business description [164] of the second user [P2] to include the business description element [220],

[222], being selected from the pre-defined listing of selectable business description elements [220], [222], as being displayed for selection by the second user [P2] on the second mobile communication device [120]. Additionally in those examples [1300] of the process, step [1310] may include the business networking facility [604] causing the business description [164] of the second user [P2] to be displayed with the pre-defined listing of selectable business description elements [220], [222], as including business sectors, knowledge bases, skills, business interests, professions, or business goals. Also in those additional examples [1300] of the process, step [1310] may include the business networking facility [604] being responsive to a processor command [124] by the second user [P2] for making subject to prior authorization, by another processor command [124] by the second user [P2], the causing the business description [164] of the second user [P2] to be displayed by the first mobile communication device [116].

In additional examples [1300] of the process, step [1310] may include the processor [102] including a business agreement facility [702] being responsive to a processor command [122] of the first user [P1] for causing a business agreement form [706] for execution by the second user [P2] to be displayed by the second mobile communication device [120]. As examples [1300] of the process, step [1310] may include the processor [102] as being coupled with the business agreement facility [702] as represented by the arrow [705]. In some of the additional examples [1300] of the process, step [1310] may include the business agreement facility [702] causing the business agreement form [706] to be displayed by the first mobile communication device [116] upon execution by the second user [P2]. In some of the additional examples [1300] of the process, step [1310] may include the business agreement facility [702] storing the business agreement form [706] in the first account data [128] upon execution by the second user [P2]. Additionally, in some of the additional examples [1300] of the process, step [1310] may include the business agreement facility [702] storing the business agreement form [706] in the second account data [130] upon execution by the second user [P2]. Also in some of the additional examples [1300] of the process, step [1310] may include the business agreement facility [702] obtaining the business agreement form [706] from a business agreement forms database [710]. Further in some of the additional examples [1300] of the process, step [1310] may include the business agreement forms database [710] being coupled as represented by an arrow [714] with the business agreement facility [702]. In some of the additional examples [1300] of the process, step [1310] may include the business agreement forms database [710] as including (not shown): a partnership agreement form; or a non-disclosure agreement form; or a joint development agreement form; or a non-binding letter-of-intent agreement form; or a commercial purchase agreement form; or a consulting agreement form.

In additional examples [1300] of the process, step [1310] may include the processor [102] including a business agreement facility [704] being responsive to a processor command [124] of the second user [P2] for causing a business agreement form [708] for execution by the first user [P1] to be displayed by the first mobile communication device [116]. In some examples [1300] of the process, step [1310] may include the processor [102] as being coupled with the business agreement facility [704] as represented by the arrow [707]. In other examples [1300] of the process (not shown), step [1310] may include the business agreement facility [702] and the business agreement facility [704] being integrated together. In some of the additional examples [1300] of the process, step [1310] may include the business agreement facility [704] causing the business agreement form [708] to be displayed by the second mobile communication device [120] upon execution by the first user [P1]. In some of the additional examples [1300] of the process, step [1310] may include the business agreement facility [704] storing the business agreement form [708] in the second account data [130] upon execution by the first user [P1]. Additionally, in some of the additional examples [1300] of the process, step [1310] may include the business agreement facility [704] storing the business agreement form [708] in the first account data [128] upon execution by the first user [P1]. Also in some of the additional examples [1300] of the process, step [1310] may include the business agreement facility [704] obtaining the business agreement form [708] from a business agreement forms database [712]. In other examples [1300] of the process (not shown), step [1310] may include the business agreement forms database [710] and the business agreement forms database [712] being integrated together. Further in some of the additional examples [1300] of the process, step [1310] may include the business agreement forms database [712] being coupled as represented by an arrow [716] with the business agreement facility [704]. In some of the additional examples [1300] of the process, step [1310] may include the business agreement forms database [712] as including (not shown): a partnership agreement form; or a non-disclosure agreement form; or a joint development agreement form; or a non-binding letter-of-intent agreement form; or a commercial purchase agreement form; or a consulting agreement form.

In an example, the example [1300] of the implementation of the process for generation of real-time gathering partner credentials may be executed by utilizing a non-transitory computer storage medium having stored executable program instructions that direct the performance by a network-based computing system [100] having a processor [102] coupled with a data repository [104] to perform a process that includes the following steps. Step [1310] of the example [1300] of the process includes causing the processor [102] to provide a geolocation facility [156] and an account data-collection facility [160]. Step [1310] of the example [1300] of the process then includes causing the processor [102] to provide network-based access, as represented by an arrow [106], to a user interface [108] for registering and maintaining a first user account [110] of a first user [P1] and for registering and maintaining a second user account [112] of a second user [P2]. Step [1310] of the example [1300] of the process further includes causing the processor [102] to provide communication as represented by an arrow [114] with a first mobile communication device [116] being in the possession of the first user [P1] and to provide communication as represented by an arrow [118] with a second mobile communication device [120] being in the possession of the second user [P2]. Step [1310] of the example [1300] of the process also includes causing the processor [102] to execute processor commands, being represented by an arrow [122], of the first user [P1]; and to execute processor commands, being represented by an arrow [124], of the second user [P2]. Step [1315] of the example [1300] of the process includes causing the data repository [104] to be coupled as represented by an arrow [126] with the processor [102]. Step [1320] of the example [1300] of the process includes causing the data repository [104] to store first account data [128] of the first user account [110] and to store second account data [130] of the second user account [112]. In step [1320] of the example [1300] of the process, the first account data [128] is stored as including a Uniform Resource Identifier ("URI") [132] of a Domain Name [134] being designated to be accessed as represented by an arrow [136] for dynamic collection of real-time first user credentials information [138]. Further in step [1320] of the example [1300] of the process, the second account data [130] is stored as including another URI [140] of another Domain Name [142] being designated to be accessed as represented by an arrow [144] for dynamic collection of real-time second user credentials information [146]. Additionally in step [1320] of the example [1300] of the process, the first account data [128] is stored as being associated as represented by an arrow [148] with a first unique username [150] of the first user [P1], and the second account data [130] is stored as being associated as represented by an arrow [152] with a second unique username [154] of the second user [P2]. At step [1325] of the example [1300] of the process, the geolocation facility [156] is caused to determine an indication of a real-time geolocation proximity [158] between the first mobile communication device [116] and the second mobile communication device [120]. At step [1330] of the example [1300] of the process, the account data-collection facility [160] is caused to respond in real-time to a processor command [122] of the first user [P1] for dynamically collecting, as represented by the arrow [144], the real-time second user credentials information [146]. At step [1335] of the example [1300] of the process, the processor [102] causes real-time gathering partner credentials [162] of the second user [P2], including the indication of the real-time geolocation proximity [158] and the real-time second user credentials information [146], to be displayed by the first mobile communication device [116]. In some examples, the process [1300] may then end at step [1340]. In further examples, the example [1300] of the implementation of the process for generation of real-time gathering partner credentials may be executed by utilizing a non-transitory computer storage medium having stored executable program instructions that direct the performance by a network-based computing system [100] having a processor [102] coupled with a data repository [104] to perform a process that includes any combination of the further steps discussed herein in connection with FIG. 13.

Figure 14:
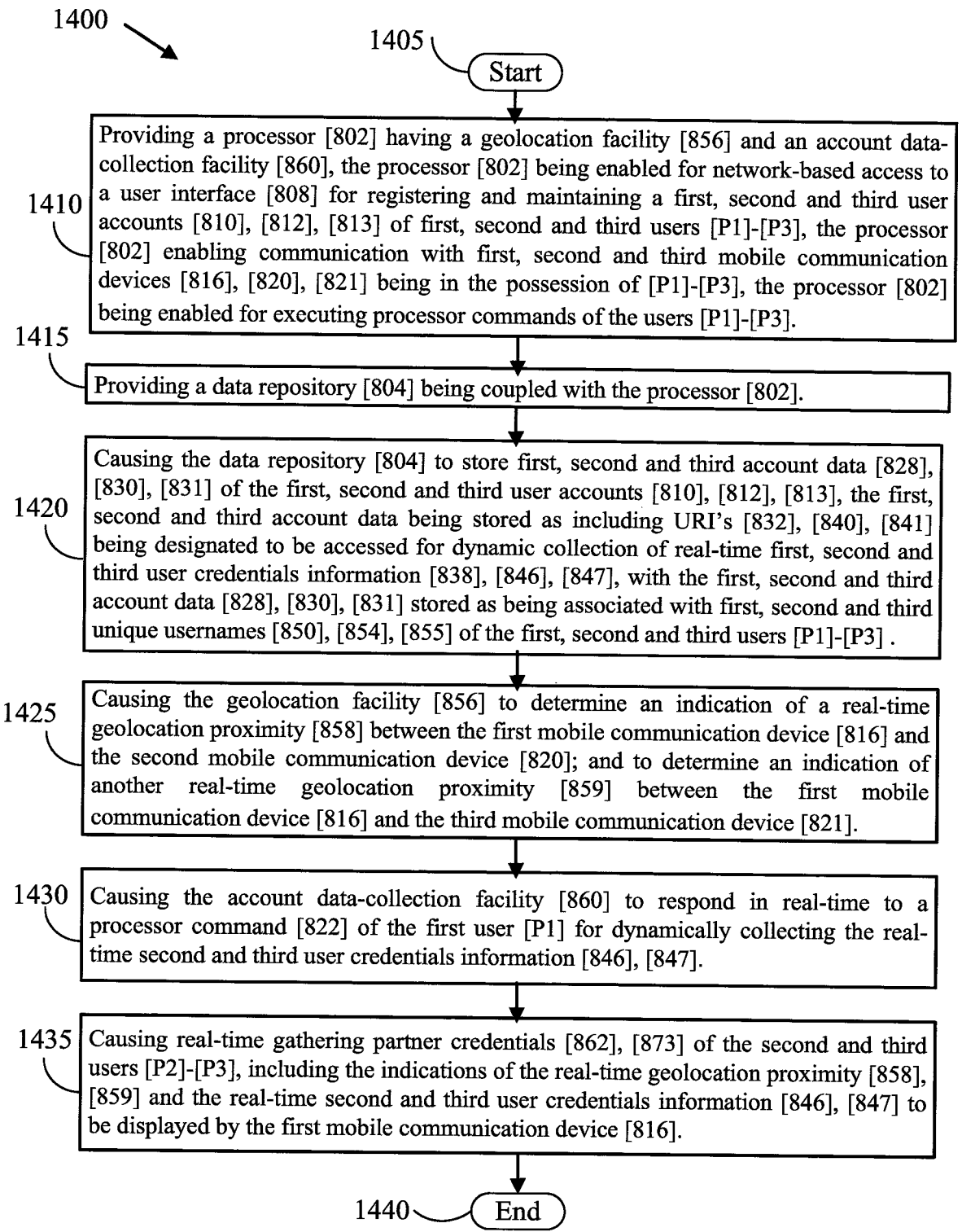
FIG. 14 is a flow chart showing examples [1400] of another implementation of a process for generation of real-time gathering partner credentials.

FIG. 14 is a flow chart showing examples [1400] of another implementation of a process for generation of real-time gathering partner credentials. In some examples, the process [1400] may include steps for providing some of the elements of the example [800] of the system as discussed in connection with FIGS. 8-12. However, it is understood throughout this specification that an example [1400] of a process for generation of real-time gathering partner credentials may include any combination of the features that are discussed herein in connection with the examples [100], [800] of systems for generation of real-time gathering partner credentials, or that are discussed herein in connection with the examples [1300] or [1400] of processes for generation of real-time gathering partner credentials. Accordingly, the entireties of the discussions herein of the examples [100], [800] of systems, and of the examples [1300] of the processes, are hereby incorporated in this discussion of the examples [1400] of the process for generation of real-time gathering partner credentials.

As shown in FIG. 14, the example [1400] of the implementation of the process for generation of real-time gathering partner credentials starts at step [1405], and then step [1410] includes providing a processor [802]. In the example [1400] of the process, providing the processor [802] includes providing a geolocation facility [856] and an account data-collection facility [860]. Step [1410] of the example [1400] of the process includes providing the processor [802] as being enabled for network-based access, as represented by an arrow [806], to a user interface [808] for registering and maintaining a first user account [810] of a first user [P1] and for registering and maintaining a second user account [812] of a second user [P2], and for registering and maintaining a third user account [813] of a third user [P3]. Step [1410] of the example [1400] of the process further includes providing the processor [802] as enabling communication as represented by an arrow [814] with a first mobile communication device [816] being in the possession of the first user [P1] and as enabling communication as represented by an arrow [818] with a second mobile communication device [820] being in the possession of the second user [P2] and as enabling communication as represented by an arrow [819] with a third mobile communication device [821] being in the possession of the third user [P3]. Step [1410] of the example [1400] of the process also includes providing the processor [802] as being enabled for executing processor commands, being represented by an arrow [822], of the first user [P1]; and for executing processor commands, being represented by an arrow [824], of the second user [P2]; and for executing processor commands, being represented by an arrow [825], of the third user [P3]. In the example [1400] of the process, step [1415] includes providing a data repository [804] being coupled as represented by an arrow [826] with the processor [802]. Further in the example [1400] of the process, step [1420] includes causing the data repository [804] to store first account data [828] of the first user account [810], and to store second account data [830] of the second user account [812], and to store third account data [831] of the third user account [813]. In the example [1400] of the process, step [1420] includes storing the first account data [828] as including a Uniform Resource Identifier ("URI") [832] of a Domain Name [834] being designated to be accessed as represented by an arrow [836] for dynamic collection at step [1430] of real-time first user credentials information [838]. Further in the example [1400] of the process, step [1420] includes storing the second account data [830] as including another URI [840] of another Domain Name [842] being designated to be accessed as represented by an arrow [844] for dynamic collection at step [1430] of real-time second user credentials information [846]. Additionally in the example [1400] of the process, step [1420] includes storing the third account data [831] as including a further URI [841] of a further Domain Name [843] being designated to be accessed as represented by an arrow [845] for dynamic collection at step [1430] of real-time third user credentials information [847]. In the example [1400] of the process, step [1420] includes storing the first account data [828] as being associated as represented by an arrow [848] with a first unique username [850] of the first user [P1], and includes storing the second account data [830] as being associated as represented by an arrow [852] with a second unique username [854] of the second user [P2], and includes storing the third account data [831] as being associated as represented by an arrow [853] with a third unique username [855] of the third user [P3]. In the example [1400] of the process, step [1425] includes the processor [802] causing the geolocation facility [856] to determine an indication of a real-time geolocation proximity [858] between the first mobile communication device [816] and the second mobile communication device [820], and to determine an indication of another real-time geolocation proximity [859] between the first mobile communication device [816] and the third mobile communication device [821]. At step [1410] in the example [1400] of the process, providing the processor [802] additionally includes providing the account data-collection facility [860] as being responsive in real-time to a processor command [822] of the first user [P1] for dynamically collecting at step [1430], as represented by the arrow [844], the real-time second user credentials information [846], and as being responsive in real-time to a processor command [822] of the first user [P1] for dynamically collecting at step [1430], as represented by the arrow [845], the real-time third user credentials information [847]. In the example [1400] of the process, step [1435] includes the processor [802] causing real-time gathering partner credentials [862] of the second user [P2], including the indication of the real-time geolocation proximity [858] and the real-time second user credentials information [846], to be displayed at step [1435] by the first mobile communication device [816]. In the example [1400] of the process, step [1435] further includes the processor [802] causing real-time gathering partner credentials [873] of the third user [P3], including the indication of the another real-time geolocation proximity [859] and the real-time third user credentials information [847], to be displayed at step [1435] by the first mobile communication device [816]. In some examples, the process [1400] may then end at step [1440].

It is understood throughout this specification that an example [1400] of the process may be carried out with any quantity of additional users [P4], [P5] . . . . As examples [1400] of the process, causing the data repository [804] to store the first account data [828] at step [1420] may include the URI of the Domain Name as being a Uniform Resource Locator ("URL") [832] of an Internet Domain Name [834] being designated to be accessed for dynamic collection of the real-time first user credentials information [838], and causing the data repository [804] to store the second account data [830] at step [1420] may include the another URI as being another URL [840] of another Internet Domain Name [842] being designated to be accessed for dynamic collection of the real-time second user credentials information [846]. In further examples [1400] of the process, step [1435] may include the processor [802] as causing the real-time gathering partner credentials [862] of the second user [P2], including the indication of the real-time geolocation proximity [858] and the real-time second user credentials information [846], to be displayed by the third mobile communication device [821]. In additional examples [1400] of the process, step [1435] may include the processor [802] as causing real-time gathering partner credentials [873] of the third user [P3], including the indication of the another real-time geolocation proximity [859] and the real-time third user credentials information [847], to be displayed by the second mobile communication device [820]. In other examples [1400] of the process, step [1435] may include the processor [802] as causing real-time gathering partner credentials [863] of the first user [P1], including the indication of the real-time geolocation proximity [858] and the real-time first user credentials information [838], to be displayed by the second mobile communication device [820]. As further examples [1400] of the process, step [1435] may include the processor [802] as causing additional real-time gathering partner credentials [875] of the first user [P1], including the indication of the real-time geolocation proximity [859] and the real-time first user credentials information [838], to be displayed by the third mobile communication device [821].

In some examples [1400] of the process, step [1410] may include the processor [802] being responsive in real-time to a processor command [822] of the first user [P1] for causing the real-time gathering partner credentials [862] of the second user [P2] to be displayed at step [1435] by the first mobile communication device [816]. In additional examples [1400] of the system, the processor [802] causing the real-time gathering partner credentials [862] of the second user [P2] to be displayed at step [1435] may include causing the indication of the real-time geolocation proximity [858] and the real-time second user credentials information [846] to be displayed as being integrated together at step [1435] by the first mobile communication device [816]. In further examples [1400] of the process, the processor [802] causing the real-time gathering partner credentials [862] of the second user [P2] to be displayed at step [1435] may include: causing a first marker [902] indicating a real-time first geolocation [904] of the first mobile communication device [816] to be displayed in step [1435] at a first position indicated by an arrow [906] on the first mobile communication device [816]; and may further include causing a second marker [908] indicating a real-time second geolocation [910] of the second mobile communication device [820] to be displayed in step [1435] at a second position indicated by an arrow [912] on the first mobile communication device [816]. In some of those further examples [1400] of the process, the processor [802] causing the indication of the real-time geolocation proximity [858] to be displayed in step [1435] may include causing the first marker [902] indicating the real-time first geolocation [904] to be displayed in step [1435] at the first position [906] on the first mobile communication device [816], and may further include causing the second marker [908] indicating the real-time second geolocation [910] to be displayed in step [1435] at the second position [912] on the first mobile communication device [816]. In others of those further examples [1400] of the process, the processor [802] causing the second marker [908] indicating the real-time second geolocation [910] of the second mobile communication device [820] to be displayed in step [1435] at the second position [912] on the first mobile communication device [816] may include causing the real-time second user credentials information [846] to be displayed in step [1435] at the second position [912].

In additional examples [1400] of the process, the processor [802] causing the real-time gathering partner credentials [862] of the second user [P2] to be displayed in step [1435] by the first mobile communication device [816] may be subject to prior authorization by a processor command [824] of the second user [P2]. In further examples [1400] of the process, the processor [802] causing the indication of the real-time geolocation proximity [858] to be displayed in step [1435] by the first mobile communication device [816] may be subject to prior authorization by a processor command [824] of the second user [P2]. In some examples [1400] of the process, providing the processor [802] at step [1410] may include causing the geolocation facility [856] at step [1430] to track a real-time second geolocation [910] of the second mobile communication device [820]. In additional examples [1400] of the process, the account data-collection facility [860] being responsive at step [1430] to the processor command [822] of the first user [P1] for the dynamically collecting, as represented by the arrow [844], the real-time second user credentials information [846], may be subject to prior authorization by a processor command [824] of the second user [P2]. In some of those additional examples [1400] of the process, the account data-collection facility [860] being subject at step [1430] to such prior authorization by the processor command [824] of the second user [P2] may enable the second user [P2] to select a tier [914] of the real-time second user credentials information [846] to be displayed at step [1435] from a selectable plurality of tiers [914], [916], [918] of the real-time second user credentials information [846].

In further examples [1400] of the process, step [1410] may include providing the processor [802] as being for executing processor commands [824] of the second user [P2] for registering and maintaining the second user account [812] with the second account data [830] as including a business description [864] of the second user [P2]. In some of those further examples [1400] of the process, providing the processor [802] as causing the real-time gathering partner credentials [862] of the second user [P2] to be displayed at step [1435] may include causing the business description [864] of the second user [P2] to be displayed at step [1435] by the first mobile communication device [816]. Also in some of those further examples [1400] of the process, step [1410] may include providing the processor [802] for executing the processor commands [824] for registering and maintaining the second user account [812] with the business description [864] of the second user [P2] as including a business description element [920], [922] being selected from a pre-defined listing of selectable business description elements [920], [922], displayed by the second mobile communication device [820]. In examples [1400] of the process, step [1410] may include providing the processor [802] for executing the processor commands [824] for registering and maintaining the second user account [812] with the pre-defined listing of selectable business description elements [920], [922], as including (not shown) business sectors, knowledge bases, skills, business interests, professions, or business goals. As further examples [1400] of the process, step [1410] may include providing the processor [802] for executing the processor commands [824] for registering and maintaining the second user account [812] with the business description [864] of the second user [P2] as including a rating [924] by the second user [P2] as to their level of experience or interest in the selected business description element [920], [922].

In examples [1400] of the process, step [1425] may include the geolocation facility [856] being responsive to a processor command [822] of the first user [P1] for causing the indication of the real-time geolocation proximity [858] between the first and second mobile communication devices [816], [820] to be displayed at step [1435] by the first mobile communication device [816]. Further in those examples [1400] of the process, step [1425] may include the geolocation facility [856] being responsive to the processor command [822] of the first user [P1] as causing the indication of the real-time geolocation proximity [858] to be displayed in step [1435] subject to the first and second mobile communication devices [816], [820] as being within a limited maximum proximity distance being represented by the arrow [926]. In some examples [1400] of the process, step [1425] may include the geolocation facility [856] causing the second unique username [854] of the second user [P2] to be displayed in step [1435] by the first mobile communication device [816] as being included in the indication of the real-time geolocation proximity [858]. Further in those examples [1400] of the process, step [1425] may include the geolocation facility [856] additionally causing the second unique username [854] and the business description [864] of the second user [P2] to be displayed in step [1435] by the first mobile communication device [816] as being included in the indication of the real-time geolocation proximity [858]. In additional examples [1400] of the process, step [1410] may include providing the processor [802] as being responsive to a processor command [822] of the first user [P1] causing the indication of the real-time geolocation proximity [858] to be displayed at step [1435] as being integrated together with, as examples: the business description [864] of the second user [P2]; or the business description element [920], [922] of the second user [P2]; or the business description element [920], [922] of the second user [P2] accompanied by the rating [924] by the second user [P2]. Further in those examples [1400] of the process, step [1410] may include providing the processor [802] as being responsive to a processor command [822] of the first user [P1] for dynamically collecting at step [1430], as represented by the arrow [844], either the real-time second user credentials information [846], or the indication of the real-time geolocation proximity [858], which may as examples be displayed at step [1435] as being integrated together with the business description [864] of the second user [P2], the business description element [920], [922] of the second user [P2], and/or the rating [924] by the second user [P2]. Further in those examples [1400] of the process, step [1410] may include providing the processor [802] being responsive in real-time to a processor command [822] of the first user [P1] for causing to be displayed at step [1435] by the first mobile communication device [816], prior to the causing the real-time gathering partner credentials [862] of the second user [P2] to be displayed at step [1435], the indication of the real-time geolocation proximity [858] integrated with the business description [864] of the second user [P2], the business description element [920], [922] of the second user [P2], and/or the rating [924] by the second user [P2]. Additionally in those examples [1400] of the process, step [1425] may include the geolocation facility [856] being responsive to a processor command [822] of the first user [P1] for causing the indication of the real-time geolocation proximity [858] to be displayed at step [1435] by the first mobile communication device [816] in a text format or in a map format. Also in those examples [1400] of the process, step [1425] may include the geolocation facility [856] being responsive to a processor command [822] of the first user [P1] for causing the indication of the real-time geolocation proximity [858] to be periodically updated and displayed in step [1435] by the first mobile communication device [816].

In some examples [1400] of the process, step [1435] may include the processor [802] being responsive in real-time to a processor command [824] of the second user [P2] for causing the real-time gathering partner credentials [863] of the first user [P1], including the indication of the real-time geolocation proximity [858] and the real-time first user credentials information [838], to be displayed by the second mobile communication device [820]. In additional examples [1400] of the process, the processor [802] causing the real-time gathering partner credentials [863] of the first user [P1] to be displayed in step [1435] may include causing the indication of the real-time geolocation proximity [858] and the real-time first user credentials information [838] to be displayed as being integrated together by the second mobile communication device [820]. In further examples [1400] of the process, the processor [802] causing the real-time gathering partner credentials [863] of the first user [P1] to be displayed in step [1435] may include: causing a second marker [1008] indicating a real-time second geolocation [1010] of the second mobile communication device [820] to be displayed in step [1435] at a second position indicated by an arrow [1012] on the second mobile communication device [820]; and may further include causing a first marker [1002] indicating a real-time first geolocation [1004] of the first mobile communication device [816] to be displayed in step [1435] at a first position indicated by an arrow [1006] on the second mobile communication device [820]. In some of those further examples [1400] of the process, the processor [802] causing the indication of the real-time geolocation proximity [858] to be displayed in step [1435] may include causing the second marker [1008] indicating the real-time second geolocation [1010] to be displayed in step [1435] at the second position [1012] on the second mobile communication device [820], and may further include causing the first marker [1002] indicating the real-time first geolocation [1004] to be displayed in step [1435] at the first position [1006] on the second mobile communication device [820]. In others of those further examples [1400] of the process, the processor [802] causing the first marker [1002] indicating the real-time first geolocation [1004] of the first mobile communication device [816] to be displayed in step [1435] at the first position [1006] on the second mobile communication device [820] may include causing the real-time first user credentials information [838] to be displayed at the first position [1006].

In additional examples [1400] of the process, the processor [802] causing the real-time gathering partner credentials [863] of the first user [P1] to be displayed in step [1435] by the second mobile communication device [820] may be subject to prior authorization by a processor command [822] of the first user [P1]. In further examples [1400] of the process, the processor [802] causing the indication of the real-time geolocation proximity [858] to be displayed in step [1435] by the second mobile communication device [820] may be subject to prior authorization by a processor command [822] of the first user [P1]. In some examples [1400] of the process, providing the processor [802] at step [1410] may include, at step [1425], the geolocation facility [856] as tracking a real-time first geolocation [1004] of the first mobile communication device [816]. In additional examples [1400] of the process, the account data-collection facility [860] being responsive in step [1430] to the processor command [824] of the second user [P2] for the dynamically collecting in step [1430], as represented by the arrow [836], the real-time first user credentials information [838], may be subject to prior authorization by a processor command [822] of the first user [P1]. In some of those additional examples [1400] of the process, the account data-collection facility [860] as being subject in step [1430] to such prior authorization by the processor command [822] of the first user [P1] may enable the first user [P1] to select a tier [1014] of the real-time first user credentials information [838] to be displayed in step [1435] from a selectable plurality of tiers [1014], [1016], [1018] of the real-time first user credentials information [838].

In further examples [1400] of the process, step [1410] may include the processor [802] being for executing processor commands [822] of the first user [P1] for registering and maintaining the first user account [810] with the first account data [828] in step [1420] as including a business description [865] of the first user [P1]. In some of those further examples [1400] of the process, the processor [802] causing the real-time gathering partner credentials [863] of the first user [P1] to be displayed in step [1435] may include causing the business description [865] of the first user [P1] to be displayed in step [1435] by the second mobile communication device [820]. Also in some of those further examples [1400] of the process, step [1410] may include the processor [802] being for executing the processor commands [822] for registering and maintaining the first user account [810] with the business description [865] of the first user [P1] as including a business description element [1020], [1022] being selected from a pre-defined listing of selectable business description elements [1020], [1022], displayed by the first mobile communication device [816]. In examples [1400] of the process, step [1410] may include the processor [802] being for executing the processor commands [822] for registering and maintaining the first user account [810] with the pre-defined listing of selectable business description elements [1020], [1022], as including (not shown) business sectors, knowledge bases, skills, business interests, professions, or business goals. As further examples [1400] of the process, step [1410] may include the processor [802] being for executing the processor commands [822] for registering and maintaining the first user account [810] with the business description [865] of the first user [P1] as including a rating [1024] by the first user [P1] as to their level of experience or interest in the selected business description element [1020], [1022].

In examples [1400] of the process, step [1425] may include the geolocation facility [856] being responsive to a processor command [824] of the second user [P2] for causing the indication of the real-time geolocation proximity [858] between the second and first mobile communication devices [816], [820] to be displayed by the second mobile communication device [820]. Further in those examples [1400] of the process, step [1425] may include the geolocation facility [856] being responsive to the processor command [824] of the second user [P2] as causing the indication of the real-time geolocation proximity [858] to be displayed subject to the second and first mobile communication devices [816], [820] as being within a limited maximum proximity distance being represented by the arrow [1026]. In some examples [1400] of the process, step [1425] may include the geolocation facility [856] causing the first unique username [850] of the first user [P1] to be displayed by the second mobile communication device [820] as being included in the indication of the real-time geolocation proximity [858]. Further in those examples [1400] of the process, step [1425] may include the geolocation facility [856] causing the first unique username [850] and the business description [865] of the first user [P1] to be displayed by the second mobile communication device [820] as being included in the indication of the real-time geolocation proximity [858]. In additional examples [1400] of the process, step [1410] may include the processor [802] being responsive to a processor command [824] of the second user [P2] as causing the indication of the real-time geolocation proximity [858] to be displayed as being integrated together with, as examples: the business description [865] of the first user [P1]; or the business description element [1020], [1022] of the first user [P1]; or the business description element [1020], [1022] of the first user [P1] accompanied by the rating [1024] by the first user [P1]. Further in those examples [1400] of the process, step [1410] may include the processor [802] being responsive to a processor command [824] of the second user [P2] for dynamically collecting, as represented by the arrow [836], either the real-time first user credentials information [838], or the indication of the real-time geolocation proximity [858], which may as examples be displayed as being integrated together with the business description [865] of the first user [P1], the business description element [1020], [1022] of the first user [P1], and/or the rating [1024] by the first user [P1]. Further in those examples [1400] of the process, step [1410] may include the processor [802] being responsive in real-time to a processor command [824] of the second user [P2] for causing to be displayed by the second mobile communication device [820], prior to the causing the real-time gathering partner credentials [863] of the first user [P1] to be displayed in step [1435], the indication of the real-time geolocation proximity [858] integrated with the business description [865] of the first user [P1], the business description element [1020], [1022] of the first user [P1], and/or the rating [1024] by the first user [P1]. Additionally in those examples [1400] of the process, step [1425] may include the geolocation facility [856] being responsive to a processor command [824] of the second user [P2] for causing the indication of the real-time geolocation proximity [858] to be displayed by the second mobile communication device [820] in a text format or in a map format. Also in those examples [1400] of the process, step [1425] may include the geolocation facility [856] being responsive to a processor command [824] of the second user [P2] for causing the indication of the real-time geolocation proximity [858] to be periodically updated and displayed by the second mobile communication device [820].

In some examples [1400] of the process, step [1410] may include the processor [802] being responsive in real-time to a processor command [825] of the third user [P3] for causing the real-time gathering partner credentials [863] of the first user [P1] to be displayed by the third mobile communication device [821]. In additional examples [1400] of the process, the processor [802] as causing the real-time gathering partner credentials [863] of the first user [P1] to be displayed in step [1435] may include causing the indication of the real-time geolocation proximity [858] and the real-time first user credentials information [838] to be displayed as being integrated together by the third mobile communication device [821]. In further examples [1400] of the process, the processor [802] as causing the real-time gathering partner credentials [863] of the first user [P1] to be displayed in step [1435] may include: causing a third marker [1108] indicating a real-time third geolocation [1110] of the third mobile communication device [821] to be displayed in step [1435] at a third position indicated by an arrow [1112] on the third mobile communication device [821]; and may further include causing a first marker [1102] indicating a real-time first geolocation [1104] of the first mobile communication device [816] to be displayed in step [1435] at a first position indicated by an arrow [1106] on the third mobile communication device [821]. In some of those further examples [1400] of the process, the processor [802] as causing the indication of the real-time geolocation proximity [858] to be displayed in step [1435] may include causing the third marker [1108] indicating the real-time third geolocation [1110] to be displayed in step [1435] at the third position [1112] on the third mobile communication device [821], and may further include causing the first marker [1102] indicating the real-time first geolocation [1104] to be displayed in step [1435] at the first position [1106] on the third mobile communication device [821]. In others of those further examples [1400] of the process, the processor [802] as causing the first marker [1102] indicating the real-time first geolocation [1104] of the first mobile communication device [816] to be displayed in step [1435] at the first position [1106] on the third mobile communication device [821] may include causing the real-time first user credentials information [838] to be displayed in step [1435] at the first position [1106].

In additional examples [1400] of the process, the processor [802] causing the real-time gathering partner credentials [863] of the first user [P1] to be displayed in step [1435] by the third mobile communication device [821] may be subject to prior authorization by a processor command [822] of the first user [P1]. In further examples [1400] of the process, the processor [802] causing the indication of the real-time geolocation proximity [858] to be displayed in step [1435] by the third mobile communication device [821] may be subject to prior authorization by a processor command [822] of the first user [P1]. In some examples [1400] of the process, providing the processor [802] at step [1410] may include, in step [1425], the geolocation facility [856] as tracking a real-time first geolocation [1104] of the first mobile communication device [816]. In additional examples [1400] of the process, the account data-collection facility [860] being responsive to the processor command [825] of the third user [P3] for the dynamically collecting, in step [1430] as represented by the arrow [836], the real-time first user credentials information [838], may be subject to prior authorization by a processor command [822] of the first user [P1]. In some of those additional examples [1400] of the process, the account data-collection facility [860] as being subject in step [1430] to such prior authorization by the processor command [822] of the first user [P1] may enable the first user [P1] to select a tier [1014] of the real-time first user credentials information [838] to be displayed from a selectable plurality of tiers [1014], [1016], [1018] of the real-time first user credentials information [838].

In further examples [1400] of the process, step [1410] may include the processor [802] being for executing processor commands [822] of the first user [P1] for registering and maintaining the first user account [810] with the first account data [828] as including a business description [865] of the first user [P1]. In some of those further examples [1400] of the process, the processor [802] as causing the real-time gathering partner credentials [863] of the first user [P1] to be displayed in step [1435] may include causing the business description [865] of the first user [P1] to be displayed in step [1435] by the third mobile communication device [821]. Also in some of those further examples [1400] of the process, step [1410] may include the processor [802] being for executing the processor commands [822] for registering and maintaining the first user account [810] with the business description [865] of the first user [P1] as including a business description element [1020], [1022] being selected from a pre-defined listing of selectable business description elements [1020], [1022], displayed by the first mobile communication device [816]. In examples [1400] of the process, step [1410] may include the processor [802] being for executing the processor commands [822] for registering and maintaining the first user account [810] with the pre-defined listing of selectable business description elements [1020], [1022], as including (not shown) business sectors, knowledge bases, skills, business interests, professions, or business goals. As further examples [1400] of the process, step [1410] may include the processor [802] being for executing the processor commands [822] for registering and maintaining the first user account [810] with the business description [865] of the first user [P1] as including a rating [1024] by the first user [P1] as to their level of experience or interest in the selected business description element [1020], [1022]. In further examples [1400] of the process, step [1410] may include the processor [802] being enabled for executing processor commands [825] of the third user [P3] for registering and maintaining the third user account [813] with the third account data [831] as including a business description [871] of the third user [P3]. Also in some of those further examples [1400] of the process, step [1410] may include the processor [802] as being enabled for executing the processor commands [825] for registering and maintaining the third user account [813] with the business description [871] of the third user [P3] as including a business description element being selected from a pre-defined listing of selectable business description elements. In examples [1400] of the process, step [1410] may include the processor [802] as being enabled for executing the processor commands [825] for registering and maintaining the third user account [813] with the pre-defined listing of selectable business description elements as including (not shown) business sectors, knowledge bases, skills, business interests, professions, or business goals. As further examples [1400] of the process, step [1410] may include the processor [802] as being enabled for executing the processor commands [825] for registering and maintaining the third user account [813] with the business description [871] of the third user [P3] as including a rating by the third user [P3] as to their level of experience or interest in the selected business description element.

In examples [1400] of the process, step [1425] may include the geolocation facility [856] being responsive to a processor command [825] of the third user [P3] for causing the indication of the real-time geolocation proximity [859] between the third and first mobile communication devices [816], [821] to be displayed in step [1435] by the third mobile communication device [821]. Further in those examples [1400] of the process, step [1425] may include the geolocation facility [856] being responsive to the processor command [825] of the third user [P3] as causing the indication of the real-time geolocation proximity [859] to be displayed subject to the third and first mobile communication devices [816], [821] as being within a limited maximum proximity distance being represented by the arrow [1126]. In some examples [1400] of the process, step [1425] may include the geolocation facility [856] causing the first unique username [850] of the first user [P1] to be displayed by the third mobile communication device [821] as being included in the indication of the real-time geolocation proximity [859]. Further in those examples [1400] of the process, step [1425] may include the geolocation facility [856] causing the first unique username [850] and the business description [865] of the first user [P1] to be displayed by the third mobile communication device [821] as being included in the indication of the real-time geolocation proximity [859]. In additional examples [1400] of the process, step [1410] may include the processor [802] being responsive to a processor command [825] of the third user [P3] as causing the indication of the real-time geolocation proximity [859] to be displayed as being integrated together with, as examples: the business description [865] of the first user [P1]; or the business description element [1020], [1022] of the first user [P1]; or the business description element [1020], [1022] of the first user [P1] accompanied by the rating [1024] by the first user [P1]. Further in those examples [1400] of the process, step [1410] may include the processor [802] being responsive to a processor command [825] of the third user [P3] for dynamically collecting, as represented by the arrow [836], either the real-time first user credentials information [838], or the indication of the real-time geolocation proximity [859], which may as examples be displayed in step [1435] as being integrated together with the business description [865] of the first user [P1], the business description element [1020], [1022] of the first user [P1], and/or the rating [1024] by the first user [P1]. Further in those examples [1400] of the process, step [1410] may include the processor [802] being responsive in real-time to a processor command [825] of the third user [P3] for causing to be displayed in step [1435] by the third mobile communication device [821], prior to the causing the real-time gathering partner credentials [863] of the first user [P1] to be displayed in step [1435], the indication of the real-time geolocation proximity [859] integrated with the business description [865] of the first user [P1], the business description element [1020], [1022] of the first user [P1], and/or the rating [1024] by the first user [P1]. Additionally in those examples [1400] of the process, step [1425] may include the geolocation facility [856] being responsive to a processor command [825] of the third user [P3] for causing the indication of the real-time geolocation proximity [859] to be displayed by the third mobile communication device [821] in a text format or in a map format. Also in those examples [1400] of the process, step [1425] may include the geolocation facility [856] being responsive to a processor command [825] of the third user [P3] for causing the indication of the real-time geolocation proximity [859] to be periodically updated and displayed in step [1435] by the third mobile communication device [821].

In further examples [1400] of the process, step [1410] may include the processor [802] including an account data vetting facility (not shown) for performing at step [1430]: a validation of the real-time first user credentials information [838]; and a validation of the real-time second user credentials information [846]; and a validation of the real-time third user credentials information [847].

In some examples [1400] of the process, step [1410] may include the processor [802] including a business meeting arrangement facility [1202] for enabling communications being represented by arrows [822], [824] between the first user [P1] and the second user [P2] of an invitation [1204] to attend a potential business meeting. In further examples [1400] of the process, step [1410] may include the processor [802] including the business meeting arrangement facility [1202] enabling communications being represented by arrows [822], [825] between the first user [P1] and the third user [P3] of an invitation [1205] to attend a potential business meeting. In additional examples [1400] of the process, step [1410] may include the processor [802] including the business meeting arrangement facility [1202] enabling communications being represented by arrows [824], [825] between the second user [P2] and the third user [P3] of an invitation [1207] to attend a potential business meeting.

In some examples [1400] of the process, step [1410] may include the processor [802] including a business referral facility [1206] being responsive to a processor command [822] of the first user [P1] for causing an introduction [1208] of the second user [P2] to a third user [P3] to be displayed by the second mobile communication device [820]. Also in those further examples [1400] of the process, step [1410] may include the business referral facility [1206] causing the introduction [1208] to include a personalized recommendation [1210] for a business referral discussion between the second user [P2] and the third user [P3]. In the further examples [1400] of the process, step [1415] may include the data repository [804] storing third account data [831] of the third user [P3] including contact information [1212] of the third user [P3]. Additionally in the examples [1400] of the process, step [1410] may include the processor [802] being responsive to a processor command [822] of the first user [P1] for causing the contact information [1212] of the third user [P3] to be displayed by the second mobile communication device [820]. In some examples [1400] of the process, in addition to being responsive to a processor command [822] of the first user [P1] for causing the introduction [1208] to be displayed by the second mobile communication device [820], step [1410] may include the business referral facility [1206] causing a commission payment commitment [1214] for execution by the second user [P2] to be displayed by the second mobile communication device [820]. In further examples [1400] of the process, in addition to being responsive to a processor command [822] of the first user [P1] for causing the introduction [1208] to be displayed by the second mobile communication device [820], step [1410] may include the business referral facility [1206] causing the commission payment commitment [1214] to be displayed by the first mobile communication device [816] upon execution by the second user [P2]; and storing the commission payment commitment [1214] in the first account data [828] upon execution by the second user [P2].

In further examples [1400] of the process, step [1410] may include the processor [802] including the business referral facility [1206] being responsive to a processor command [824] of the second user [P2] for causing an introduction [1216] of the first user [P1] to the third user [P3] to be displayed by the third mobile communication device [821]. Also in those further examples [1400] of the process, step [1410] may include the business referral facility [1206] causing the introduction [1216] to include a personalized recommendation [1218] for a business referral discussion between the first user [P1] and the third user [P3]. In the further examples [1400] of the process, step [1415] may include the data repository [804] storing third account data [831] of the third user [P3] including the contact information [1212] of the third user [P3]. Additionally in the examples [1400] of the process, step [1410] may include the processor [802] being responsive to a processor command [824] of the second user [P2] for causing the contact information [1212] of the third user [P3] to be displayed by the first mobile communication device [816]. In some examples [1400] of the process, in addition to being responsive to a processor command [824] of the second user [P2] for causing the introduction [1216] to be displayed by the third mobile communication device [821], step [1410] may include the business referral facility [1206] causing a commission payment commitment [1220] for execution by the first user [P1] to be displayed by the first mobile communication device [816]. In further examples [1400] of the process, in addition to being responsive to a processor command [824] of the second user [P2] for causing the introduction [1216] to be displayed by the first mobile communication device [816], step [1410] may include the business referral facility [1206] causing the commission payment commitment [1220] to be displayed by the second mobile communication device [820] upon execution by the first user [P1]; and storing the commission payment commitment [1220] in the second account data [830] upon execution by the first user [P1].

In some examples [1400] of the process, step [1420] may include the URI [832] of the Domain Name [834] as being designated to also be accessed for collection of contact information [1213] of the first user [P1], and step [1420] may further include the another URI [840] of the another Domain Name [842] as being designated to also be accessed for collection of contact information [1215] of the second user [P2], and step [1420] may additionally include the further URI [841] of the further Domain Name [843] as being designated to also be accessed for collection of contact information [1212] of the third user [P3]. In further examples [1400] of the process, step [1430] may include the account data-collection facility [860] as being responsive to a processor command [822] of the first user [P1] for collecting the contact information [1215] of the second user [P2] and the contact information [1212] of the third user [P3], and step [1430] may include the account data-collection facility [860] as being responsive to a processor command [824] of the second user [P2] for collecting the contact information [1213] of the first user [P1] and the contact information [1212] of the third user [P3], and step [1430] may include the account data-collection facility [860] as being responsive to a processor command [825] of the third user [P3] for collecting the contact information [1213] of the first user [P1] and the contact information [1215] of the second user [P2]. In additional examples [1400] of the process, step [1415] may include the data repository [804] as being for: storing third account data [831] of the third user [P3] including contact information [1212] of the third user [P3]; and storing first account data [828] of the first user [P1] including contact information [1213] of the first user [P1]. Further in those examples [1400] of the process, step [1415] may include the data repository [804] as being for storing second account data [830] of the second user [P2] including contact information [1215] of the second user [P2]. In those examples [1400] of the process, step [1410] may include the processor [802] as being responsive to a processor command [822] of the first user [P1] or to a processor command [824] of the second user [P2] or to a processor command [825] of the third user [P3], for causing the contact information [1212] of the third user [P3] or for causing the contact information [1213] of the first user [P1] or for causing the contact information [1215] of the second user [P2] to be received by the first mobile communication device [816] or by the second mobile communication device [820] or by the third mobile communication device [821]. Further in those examples [1400] of the process, step [1410] may include the processor [802] as being responsive to a processor command [822] of the first user [P1] or to a processor command [824] of the second user [P2] or to a processor command [825] of the third user [P3], for causing the contact information [1212], [1213], and/or [1215] to be updated. In those examples [1400] of the process, step [1410] may include the processor [802] as being responsive to a processor command [822], [824], [825] for causing such contact information [1212], [1213], and/or [1215] to be updated on an ongoing periodic basis, for example, whenever the contact information [1212], [1213], [1215] is updated in the account data [828], [830], [831] as stored in the data repository [804]. In some examples [1400] of the process, step [1410] may include the processor [802] as being responsive to a processor command [822] of the first user [P1] or to a processor command [824] of the second user [P2] or to a processor command [825] of the third user [P3], for causing the contact information [1212], [1213], and/or [1215] to be categorized into a defined group, such as, for example, a group being defined by a user [P1], [P2], [P3]. Further in those examples [1400] of the process, step [1410] may include the processor [802] as being responsive to a processor command [822] of the first user [P1] or to a processor command [824] of the second user [P2] or to a processor command [825] of the third user [P3], for causing a message, announcement, or other information to be sent to one or more users [P1], [P2], [P3] being included in such a categorized group.

In an example, the example [1400] of the implementation of the process for generation of real-time gathering partner credentials may be executed by utilizing a non-transitory computer storage medium having stored executable program instructions that direct the performance by a network-based computing system [800] having a processor [802] coupled with a data repository [804] to perform a process that includes the following steps. Step [1410] of the example [1400] of the process includes causing the processor [802] to provide a geolocation facility [856] and an account data-collection facility [860]. Step [1410] of the example [1400] of the process then includes causing the processor [802] to provide network-based access, as represented by an arrow [806], to a user interface [808] for registering and maintaining a first user account [810] of a first user [P1] and for registering and maintaining a second user account [812] of a second user [P2], and for registering and maintaining a third user account [813] of a third user [P3]. Step [1410] of the example [1400] of the process further includes causing the processor [802] to provide communication as represented by an arrow [814] with a first mobile communication device [816] being in the possession of the first user [P1] and to provide communication as represented by an arrow [818] with a second mobile communication device [820] being in the possession of the second user [P2] and to provide communication as represented by an arrow [819] with a third mobile communication device [821] being in the possession of the third user [P3]. Step [1410] of the example [1400] of the process also includes causing the processor [802] to execute processor commands, being represented by an arrow [822], of the first user [P1]; and to execute processor commands, being represented by an arrow [824], of the second user [P2]; and to execute processor commands, being represented by an arrow [825], of the third user [P3]. Step [1415] of the example [1400] of the process includes causing the data repository [804] to be coupled as represented by an arrow [826] with the processor [802]. Step [1420] of the example [1400] of the process includes causing the data repository [804] to store first account data [828] of the first user account [810], and to store second account data [830] of the second user account [812] and to store third account data [831] of the third user account [813]. In step [1420] of the example [1400] of the process, the first account data [828] is stored as including a Uniform Resource Identifier ("URI") [832] of a Domain Name [834] being designated to be accessed as represented by an arrow [836] for dynamic collection of real-time first user credentials information [838]. Further in step [1420] of the example [1400] of the process, the second account data [830] is stored as including another URI [840] of another Domain Name [842] being designated to be accessed as represented by an arrow [844] for dynamic collection of real-time second user credentials information [846]. Additionally in step [1420] of the example [1400] of the process, the third account data [831] is stored as including another URI [841] of a further Domain Name [843] being designated to be accessed as represented by an arrow [845] for dynamic collection of real-time third user credentials information [847]. Additionally in step [1420] of the example [1400] of the process, the first account data [828] is stored as being associated as represented by an arrow [848] with a first unique username [850] of the first user [P1], and the second account data [830] is stored as being associated as represented by an arrow [852] with a second unique username [854] of the second user [P2], and the third account data [831] is stored as being associated as represented by an arrow [853] with a third unique username [855] of the third user [P3]. At step [1425] of the example [1400] of the process, the geolocation facility [856] is caused to determine an indication of a real-time geolocation proximity [858] between the first mobile communication device [816] and the second mobile communication device [820], and to determine an indication of another real-time geolocation proximity [898] between the first mobile communication device [816] and the third mobile communication device [821]. At step [1430] of the example [1400] of the process, the account data-collection facility [860] is caused to respond in real-time to a processor command [822] of the first user [P1] for dynamically collecting, as represented by the arrow [844], the real-time second user credentials information [846], and is caused to respond in real-time to a processor command [822] of the first user [P1] for dynamically collecting, as represented by the arrow [845], the real-time third user credentials information [847]. At step [1435] of the example [1400] of the process, the processor [802] causes real-time gathering partner credentials [862] of the second user [P2], including the indication of the real-time geolocation proximity [858] and the real-time second user credentials information [846], to be displayed by the first mobile communication device [816]. At step [1435] of the example [1400] of the process, the processor [802] further causes real-time gathering partner credentials [873] of the third user [P3], including the indication of the another real-time geolocation proximity [859] and the real-time third user credentials information [847], to be displayed by the first mobile communication device [816]. In some examples, the process [1400] may then end at step [1440]. In further examples, the example [1400] of the implementation of the process for generation of real-time gathering partner credentials may be executed by utilizing a non-transitory computer storage medium having stored executable program instructions that direct the performance by a network-based computing system [800] having a processor [802] coupled with a data repository [804] to perform a process that includes any combination of the further steps discussed herein in connection with FIG. 14.

The examples [100], [800] of systems, and the examples [1300], [1400] of processes may generally be utilized in end-use applications for systems where there is a need for information combining the identification of people who happen to be in real-time geolocation proximity together with business credentials information about such people, being collected in real-time from on-line sources for increased reliability. Since the business credentials information is obtained on a real-time basis from on-line sources, its reliability is increased because false or misleading on-line information may tend to damage the professional business reputation of the offending person. The real-time gathering partner credentials information provided herein may be useful to a person seeking safe, worthwhile, spontaneous professional interaction with strangers. In accordance with the examples [100], [800] of systems, and the examples [1300], [1400] of processes, a person can obtain real-time gathering partner credentials information regarding strangers who happen to be nearby "right now", and may be more likely to utilize such information while such strangers remain nearby, as being both trustworthy and timely.

While the present invention has been disclosed in a presently defined context, it will be recognized that the present teachings may be adapted to a variety of contexts consistent with this disclosure and the claims that follow. For example, the lighting systems shown in the figures and discussed above can be adapted in the spirit of the many optional parameters described.

We claim:

1. A system for generation of real-time gathering partner credentials, comprising:
    a processor providing network-based access to a user interface for registering and maintaining a first user account of a first user and for registering and maintaining a second user account of a second user, the processor being in communication with a first mobile communication device being in the possession of the first user and in communication with a second mobile communication device being in the possession of the second user, and the processor being for executing processor commands of the first user and for executing processor commands of the second user;

a data repository being coupled with the processor for storing first account data of the first user account and for storing second account data of the second user account, the first account data including a Uniform Resource Identifier ("URI") of a Domain Name being designated to be accessed for dynamic collection of real-time first user credentials information and the second account data including another URI of another Domain Name being designated to be accessed for dynamic collection of real-time second user credentials information, the first account data being associated with a first unique username of the first user and the second account data being associated with a second unique username of the second user;

wherein the processor includes a geolocation facility for determining an indication of a real-time geolocation proximity between the first mobile communication device and the second mobile communication device;

wherein the processor includes an account data-collection facility being responsive in real-time to a processor command of the first user for dynamically collecting the real-time second user credentials information; and wherein the processor is for causing real-time gathering partner credentials of the second user, including the indication of the real-time geolocation proximity and the real-time second user credentials information, to be displayed by the first mobile communication device.

2. The system of claim 1, wherein the processor is responsive in real-time to a processor command of the first user for causing the real-time gathering partner credentials of the second user to be displayed by the first mobile communication device.

3. The system of claim 1, wherein the processor causing the real-time gathering partner credentials of the second user to be displayed includes the processor causing the indication of the real-time geolocation proximity and the real-time second user credentials information to be displayed as integrated together by the first mobile communication device.

4. The system of claim 1, wherein the processor causing the real-time gathering partner credentials of the second user to be displayed includes the processor causing a first marker indicating a real-time first geolocation of the first mobile communication device to be displayed at a first position on the first mobile communication device, and further includes the processor causing a second marker indicating a real-time second geolocation of the second mobile communication device to be displayed at a second position on the first mobile communication device.

5. The system of claim 4, wherein the processor causing the indication of the real-time geolocation proximity to be displayed includes the processor causing the first marker indicating the real-time first geolocation to be displayed at the first position on the first mobile communication device, and further includes the processor causing the second marker indicating the real-time second geolocation to be displayed at the second position on the first mobile communication device.

6. The system of claim 5, wherein the processor causing the second marker indicating the real-time second geolocation of the second mobile communication device to be displayed at the second position on the first mobile communication device includes the processor causing the real-time second user credentials information to be displayed at the second position.

7. The system of claim 1, wherein the account data-collection facility being responsive to the processor command of the first user for the dynamically collecting the real-time second user credentials information is subject to prior authorization by a processor command of the second user.

8. The system of claim 7, wherein the account data-collection facility being subject to the prior authorization by the processor command of the second user for the dynamically collecting the real-time second user credentials information further enables the second user to select a tier of the real-time second user credentials information to be displayed from a selectable plurality of tiers of the real-time second user credentials information.

9. The system of claim 1, wherein the processor is further for executing processor commands of the second user for registering and maintaining the second user account with the second account data as including a business description of the second user.

10. The system of claim 9, wherein the processor causing the real-time gathering partner credentials of the second user to be displayed includes the processor causing the business description of the second user to be displayed by the first mobile communication device.

11. The system of claim 9, wherein the processor is for executing the processor commands for registering and maintaining the second user account with the business description of the second user as including a business description element being selected from a pre-defined listing of selectable business description elements displayed by the second mobile communication device.

12. The system of claim 11, wherein the processor is for executing the processor commands for registering and maintaining the second user account with the pre-defined listing of selectable business description elements as including business sectors, knowledge bases, skills, business interests, professions, or business goals.

13. The system of claim 11, wherein the processor is for executing the processor commands for registering and maintaining the second user account with the business description as including a rating by the second user as to their level of experience or interest in the selected business description element.

14. The system of claim 1, wherein the geolocation facility is responsive to a processor command of the first user for causing the indication of the real-time geolocation proximity between the first and second mobile communication devices to be displayed by the first mobile communication device.

15. The system of claim 14, wherein the geolocation facility is further responsive to the processor command of the first user causing the indication of the real-time geolocation proximity to be displayed subject to the first and second mobile communication devices being within a limited maximum proximity distance.

16. The system of claim 1, wherein the processor is responsive to a processor command of the first user for dynamically collecting the real-time second user credentials information or the indication of the real-time geolocation proximity.

17. The system of claim 1, wherein the processor is responsive in real-time to a processor command of the first user for causing to be displayed by the first mobile communication device, prior to the causing the real-time gathering partner credentials of the second user to be displayed, the indication of the real-time geolocation proximity integrated with a business description of the second user.

18. The system of claim 1, wherein the data repository is further for storing the third account data of the third user as including contact information of the third user.

19. The system of claim 18, wherein the processor is responsive to a processor command of the first user for causing the contact information of the third user to be displayed by the second mobile communication device.

20. The system of claim 1, wherein the URI of the Domain Name is designated to also be accessed for collection of contact information of the first user, and wherein the another URI of the another Domain Name is designated to also be accessed for collection of contact information of the second user.

21. The system of claim 20, wherein the account data-collection facility is responsive to a processor command of the first user for collecting the contact information of the second user, and wherein the account data-collection facility is responsive to a processor command of the second user for collecting the contact information of the first user.

22. The system of claim 21, wherein the data repository is for: storing the first account data of the first user as including the contact information of the first user; and storing the second account data of the second user as including the contact information of the second user.

23. The system of claim 1, wherein the processor includes the account data-collection facility being responsive in real-time to a processor command of the second user for dynamically collecting the real-time first user credentials information;
wherein the processor is for causing real-time gathering partner credentials of the first user, including the indication of the real-time geolocation proximity and the real-time first user credentials information, to be displayed by the second mobile communication device;
wherein the processor provides network-based access to the user interface for registering and maintaining a third user account of a third user, the processor being in communication with a third mobile communication device being in the possession of the third user, and the processor being for executing processor commands of the third user;
wherein the data repository is further for storing third account data of the third user account, the third account data including a further URI of a further Domain Name being designated to be accessed for dynamic collection of real-time third user credentials information, the third account data being associated with a third unique username of the third user;
wherein the geolocation facility is for determining an indication of another real-time geolocation proximity between the first mobile communication device and the third mobile communication device;
wherein the account data-collection facility is responsive in real-time to a processor command of the first user for dynamically collecting the real-time third user credentials information;
wherein the processor is for causing real-time gathering partner credentials of the third user, including the indication of the another real-time geolocation proximity and the real-time third user credentials information, to be displayed by the first mobile communication device;

wherein the URI of the Domain Name is designated to also be accessed for collection of contact information of the first user;
wherein the another URI of the another Domain Name is designated to also be accessed for collection of contact information of the second user; and
wherein the further URI of the further Domain Name is designated to also be accessed for collection of contact information of the third user.

24. The system of claim 23, wherein the account data-collection facility is responsive to a processor command of the first user for collecting the contact information of the second user and of the third user, and wherein the account data-collection facility is responsive to a processor command of the second user for collecting the contact information of the first user and of the third user, and wherein the account data-collection facility is responsive to a processor command of the third user for collecting the contact information of the first user and of the second user.

25. The system of claim 24, wherein the data repository is for: storing first account data of the first user including the contact information of the first user; and storing second account data of the second user including the contact information of the second user; and storing third account data of the third user including the contact information of the third user.

26. The system of claim 23, wherein the processor is responsive to a processor command of the first user or to a processor command of the second user or to a processor command of the third user, for causing the contact information of the first user or for causing the contact information of the second user or for causing the contact information of the third user to be received by the first mobile communication device or by the second mobile communication device or by the third mobile communication device.

27. The system of claim 23, wherein the processor is responsive to a processor command of the first user or to a processor command of the second user or to a processor command of the third user, for causing the contact information of the first, second or third user to be updated.

28. The system of claim 23, wherein the processor is responsive to a processor command of the first user or to a processor command of the second user or to a processor command of the third user, for causing the contact information of the first, second or third user to be automatically updated on an ongoing periodic basis.

29. The system of claim 23, wherein the processor is responsive to a processor command of the first user or to a processor command of the second user or to a processor command of the third user, for causing the contact information of the first, second or third user to be categorized into a defined group.

30. The system of claim 29, wherein the processor is responsive to a processor command of the first user or to a processor command of the second user or to a processor command of the third user, for causing a message, announcement, or other information to be sent, utilizing the contact information, to the users being included in such a categorized group.

31. A process for generation of real-time gathering partner credentials, comprising:
providing a processor having a geolocation facility and an account data-collection facility, the processor being enabled for network-based access to a user interface for registering and maintaining a first user account of a first user and a second user account of a second user, the processor enabling communication with a first mobile communication device in the possession of the first user and enabling communication with a second mobile communication device in the possession of the second user, the processor further being enabled for executing processor commands of the first user and for executing processor commands of the second user, providing a data repository being coupled with the processor;

causing the data repository to store first account data of the first user account and to store second account data of the second user account, the first account data including a Uniform Resource Identifier ("URI") of a Domain Name being designated to be accessed for dynamic collection of real-time first user credentials information and the second account data including another URI of another Domain Name being designated to be accessed for dynamic collection of real-time second user credentials information, the first account data being associated with a first unique username of the first user and the second account data being associated with a second unique username of the second user;

causing the geolocation facility to determine an indication of a real-time geolocation proximity between the first mobile communication device and the second mobile communication device;

causing the account data-collection facility to respond in real-time to a processor command of the first user for dynamically collecting the real-time second user credentials information; and causing real-time gathering partner credentials of the second user, including the indication of the real-time geolocation proximity and the real-time second user credentials information, to be displayed by the first mobile communication device.

32. A non-transitory computer storage medium having stored executable program instructions that direct the performance by a network-based computing system having a processor coupled with a data repository to perform a process that comprises:

causing the processor to provide a geolocation facility and an account data-collection facility;

causing the processor to provide network-based access to a user interface for registering and maintaining a first user account of a first user and a second user account of a second user;

causing the processor to provide communication with a first mobile communication device in the possession of the first user and to provide communication with a second mobile communication device in the possession of the second user;

causing the processor to execute processor commands of the first user and of the second user;

causing the data repository to be coupled with the processor;

causing the data repository to store first account data of the first user account and to store second account data of the second user account, the first account data including a Uniform Resource Identifier ("URI") of a Domain Name being designated to be accessed for dynamic collection of real-time first user credentials information and the second account data including another URI of another Domain Name being designated to be accessed for dynamic collection of real-time second user credentials information, the first account data being associated with a first unique username of the first user and the second account data being associated with a second unique username of the second user;

causing the geolocation facility to determine an indication of a real-time geolocation proximity between the first mobile communication device and the second mobile communication device;

causing the account data-collection facility to respond in real-time to a processor command of the first user for dynamically collecting the real-time second user credentials information; and causing real-time gathering partner credentials of the second user, including the indication of the real-time geolocation proximity and the real-time second user credentials information, to be displayed by the first mobile communication device.

\* \* \* \* \*